H. A. MARTIN.
RAILROAD TICKET ISSUING MACHINE.
APPLICATION FILED FEB. 6, 1915. RENEWED MAY 29, 1919.
1,309,954.
Patented July 15, 1919.
22 SHEETS—SHEET 1.
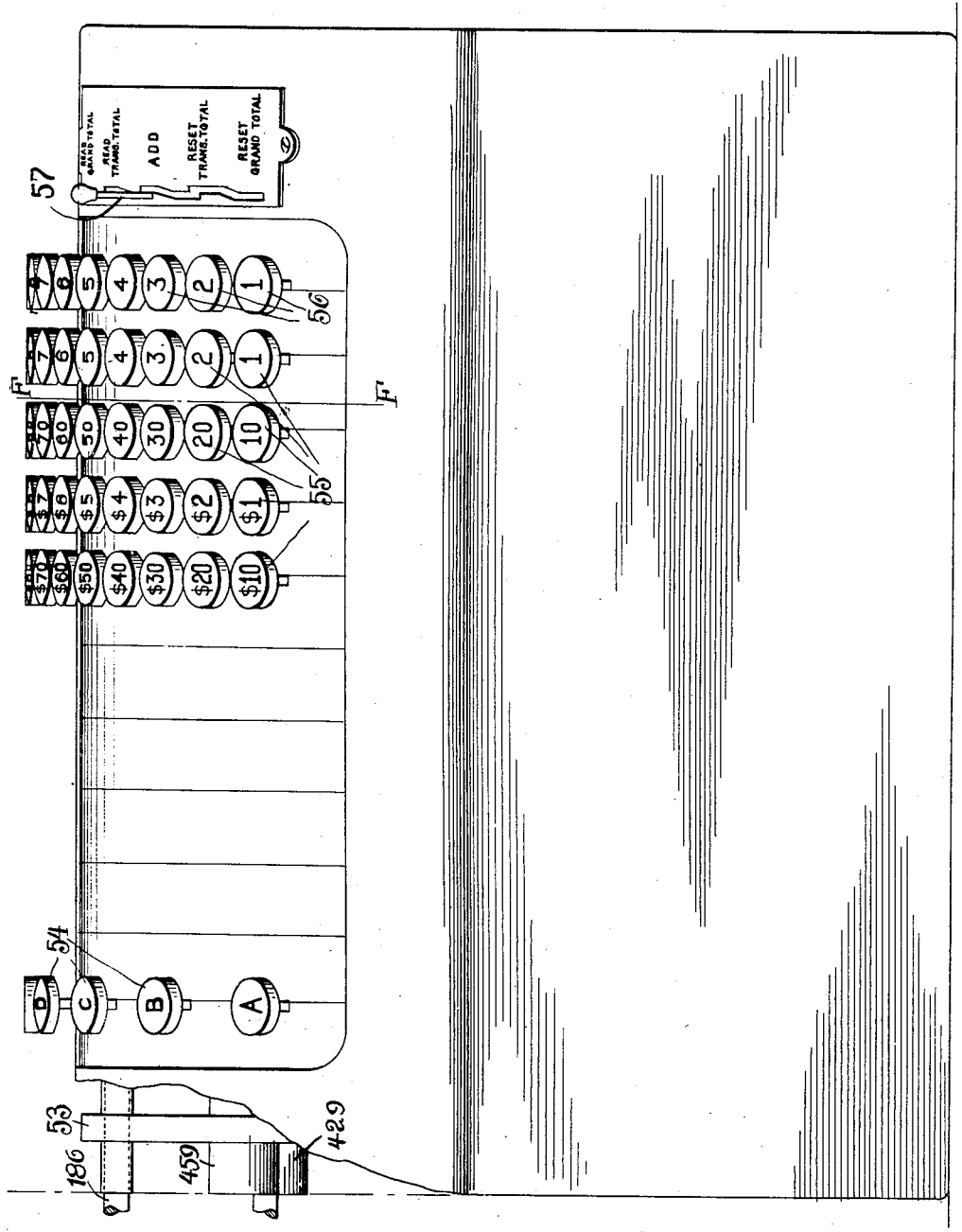
Witnesses
C. Klostermann
H. W. Lindsey Jr.
Inventor
Haakon A. Martin
by R. S. Glass
Carl Beust
Attorneys

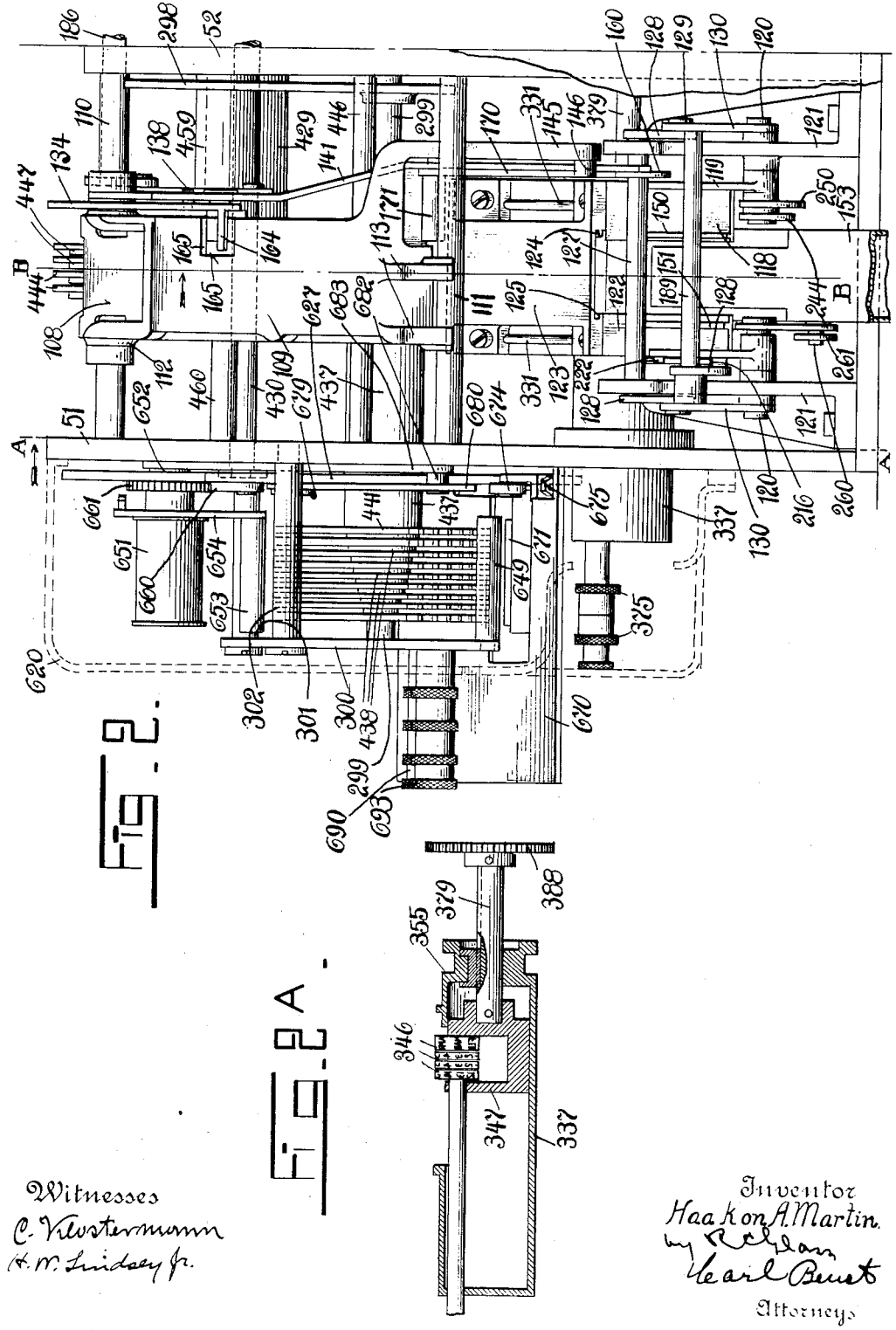

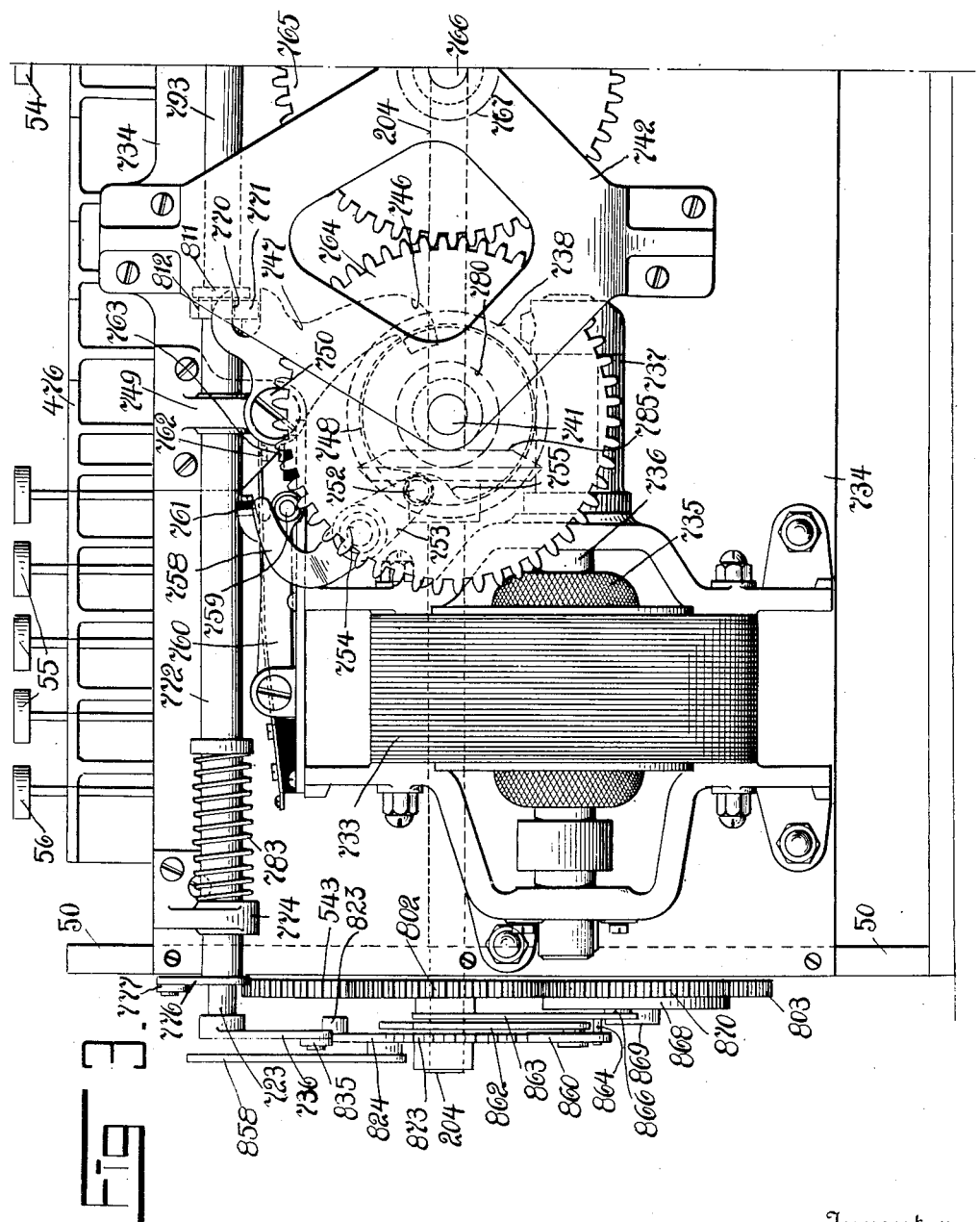

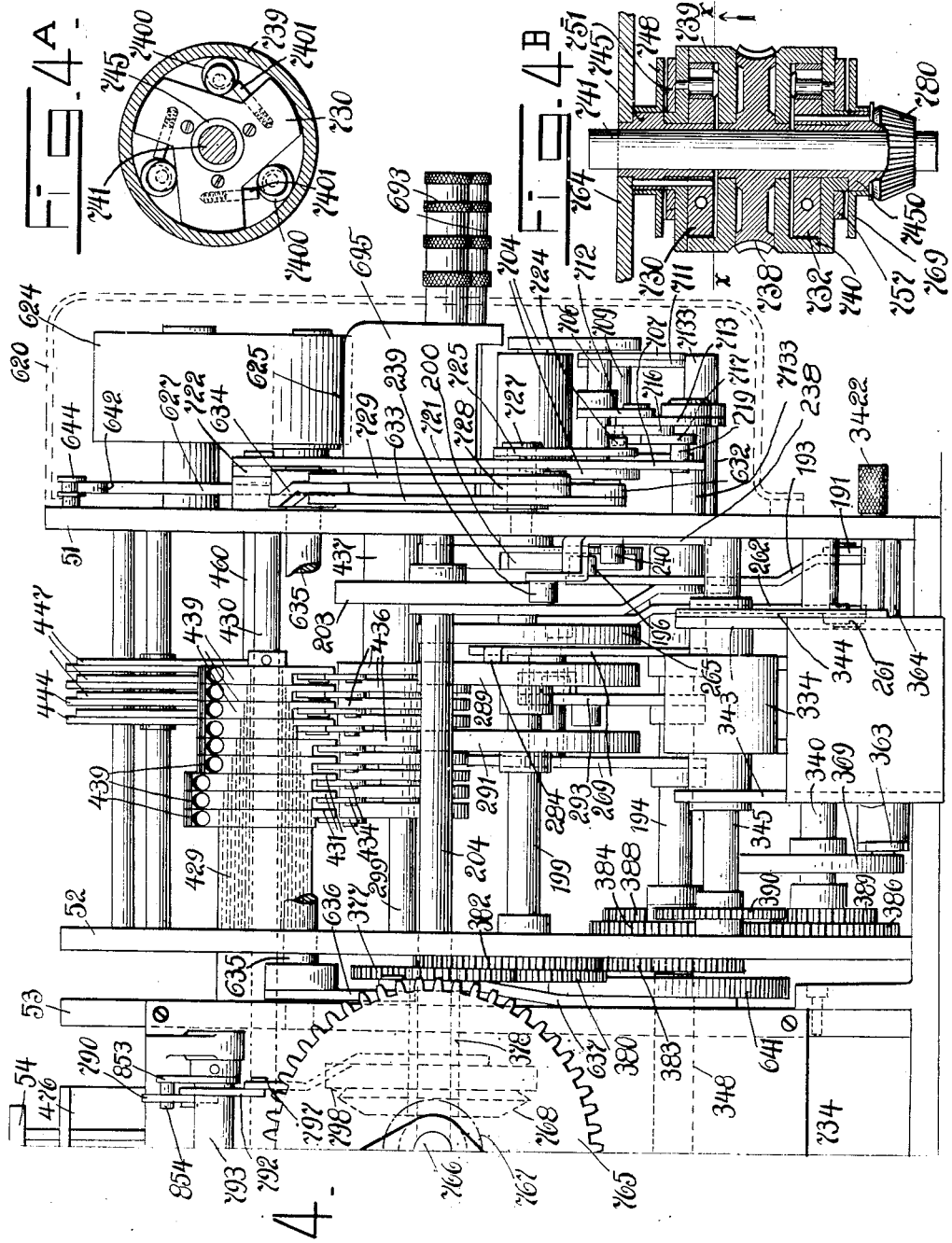

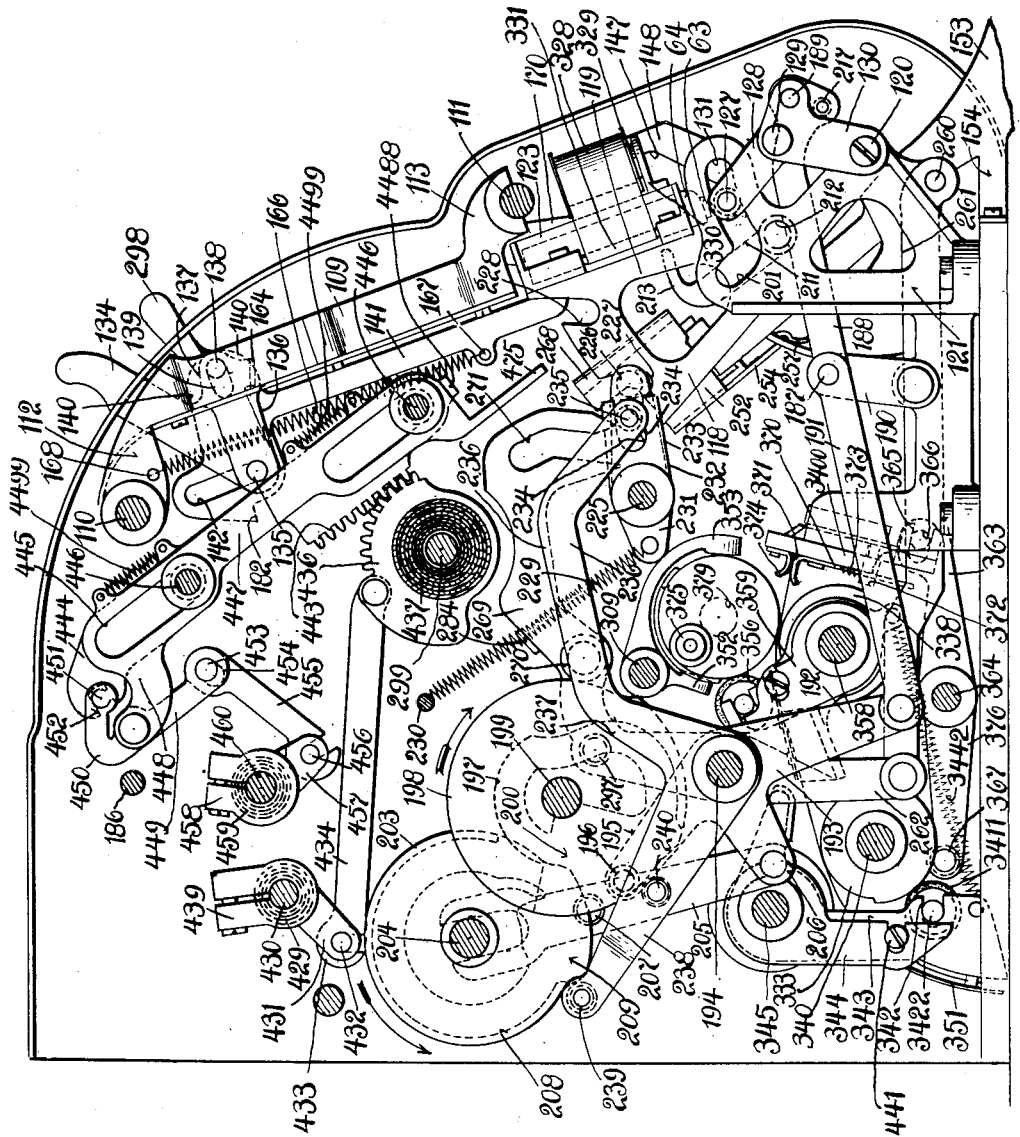

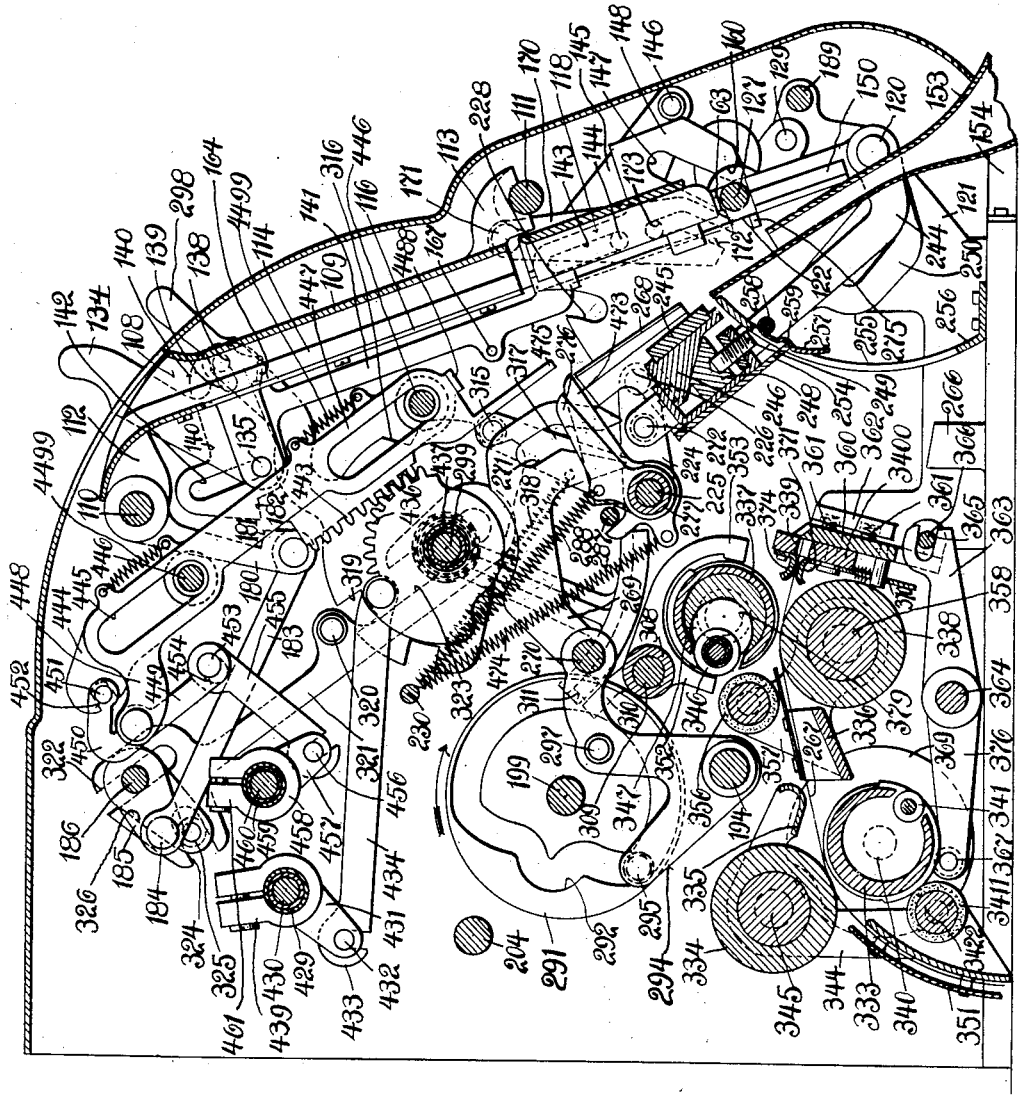

H. A. MARTIN.
RAILROAD TICKET ISSUING MACHINE.
APPLICATION FILED FEB. 6, 1915. RENEWED MAY 29, 1919.
1,309,954.
Patented July 15, 1919.
22 SHEETS—SHEET 7.
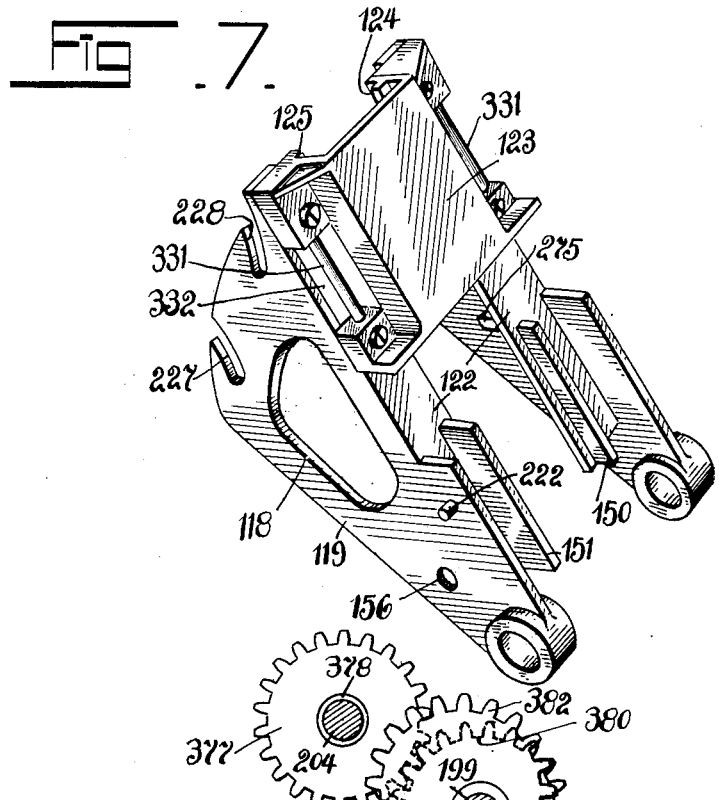
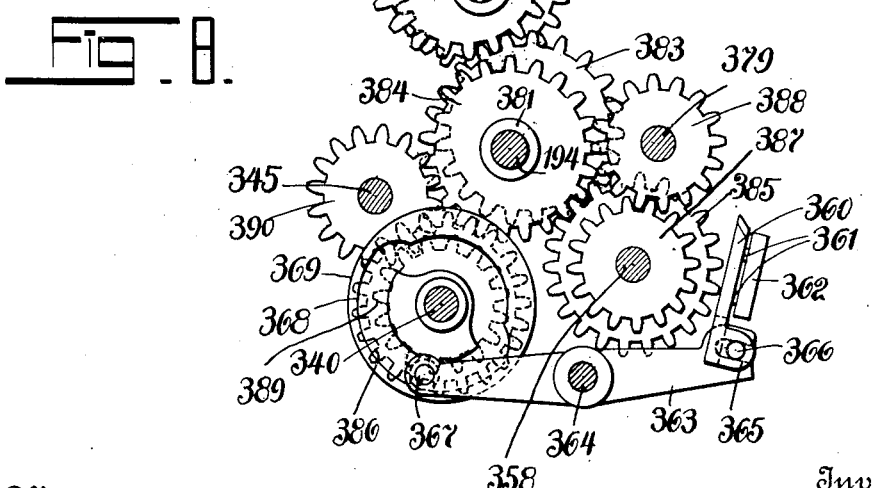
Witnesses
C. Klostermann
H. W. Lindsey Jr.
Inventor
Haakon A. Martin
Attorneys

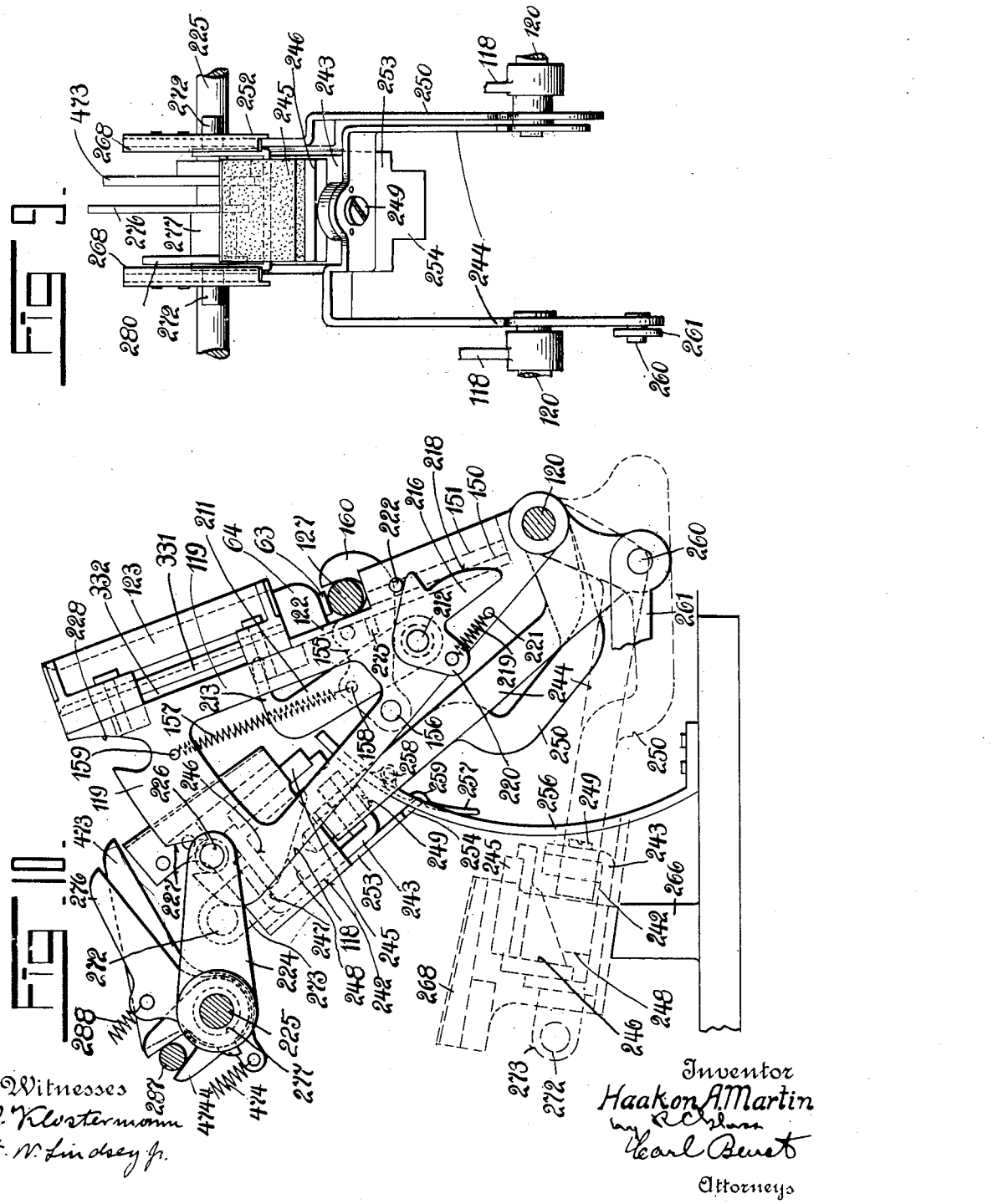

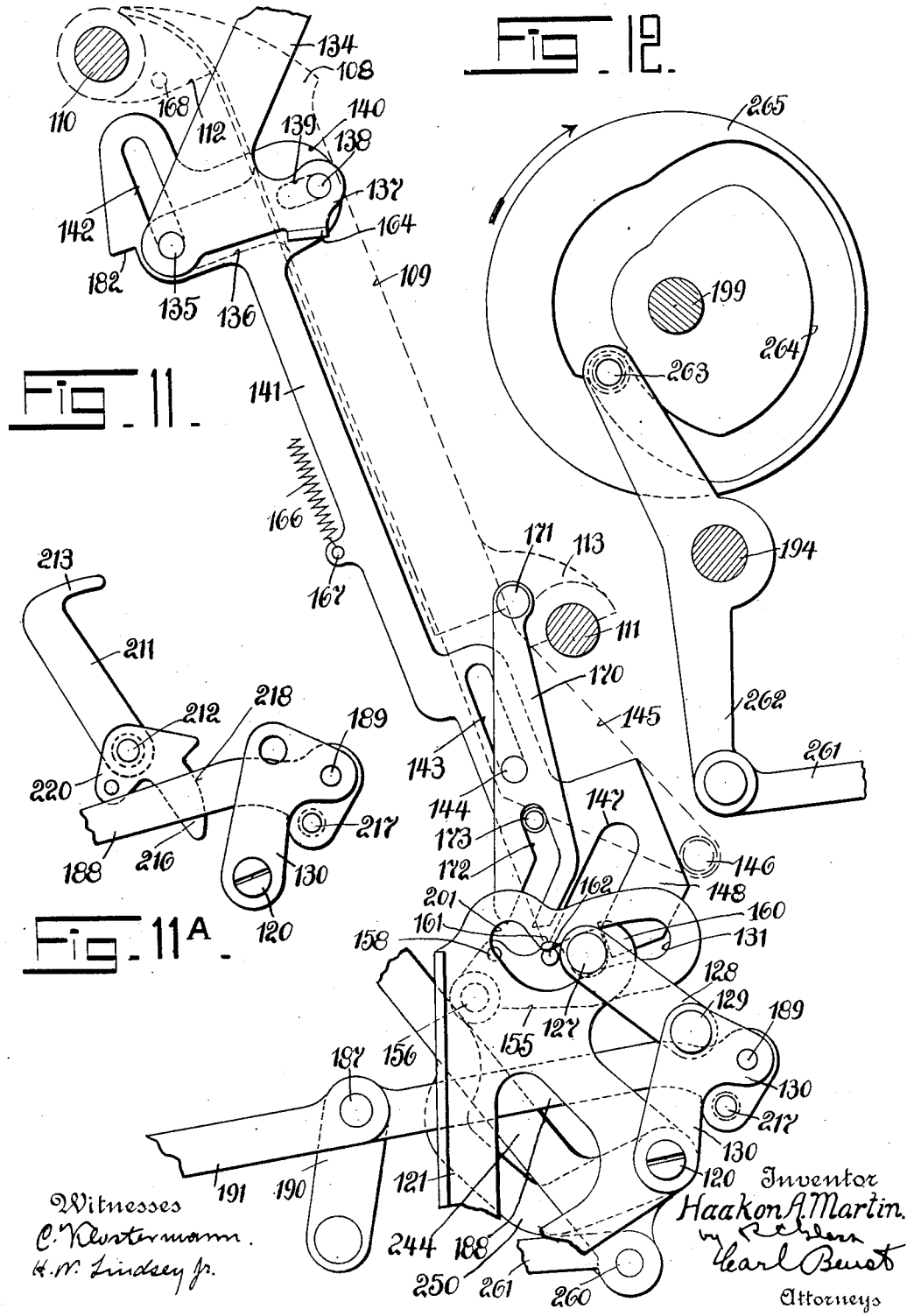

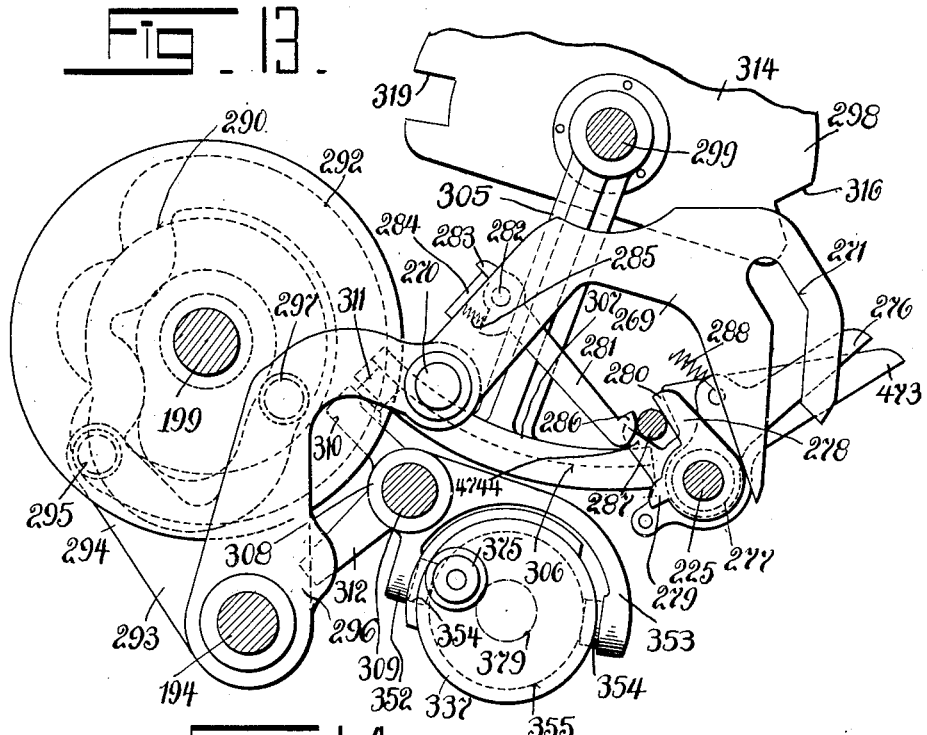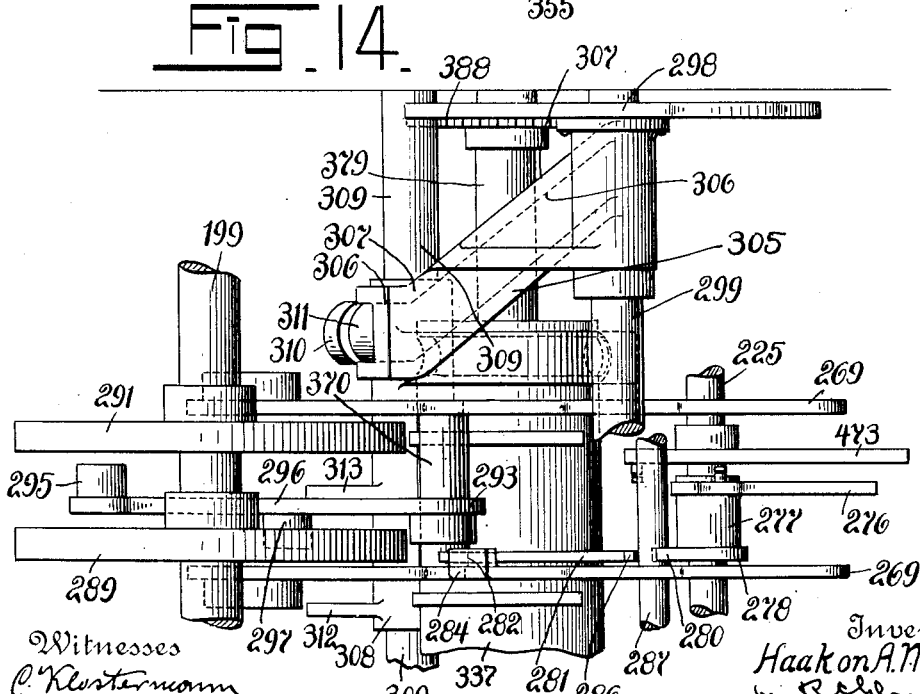

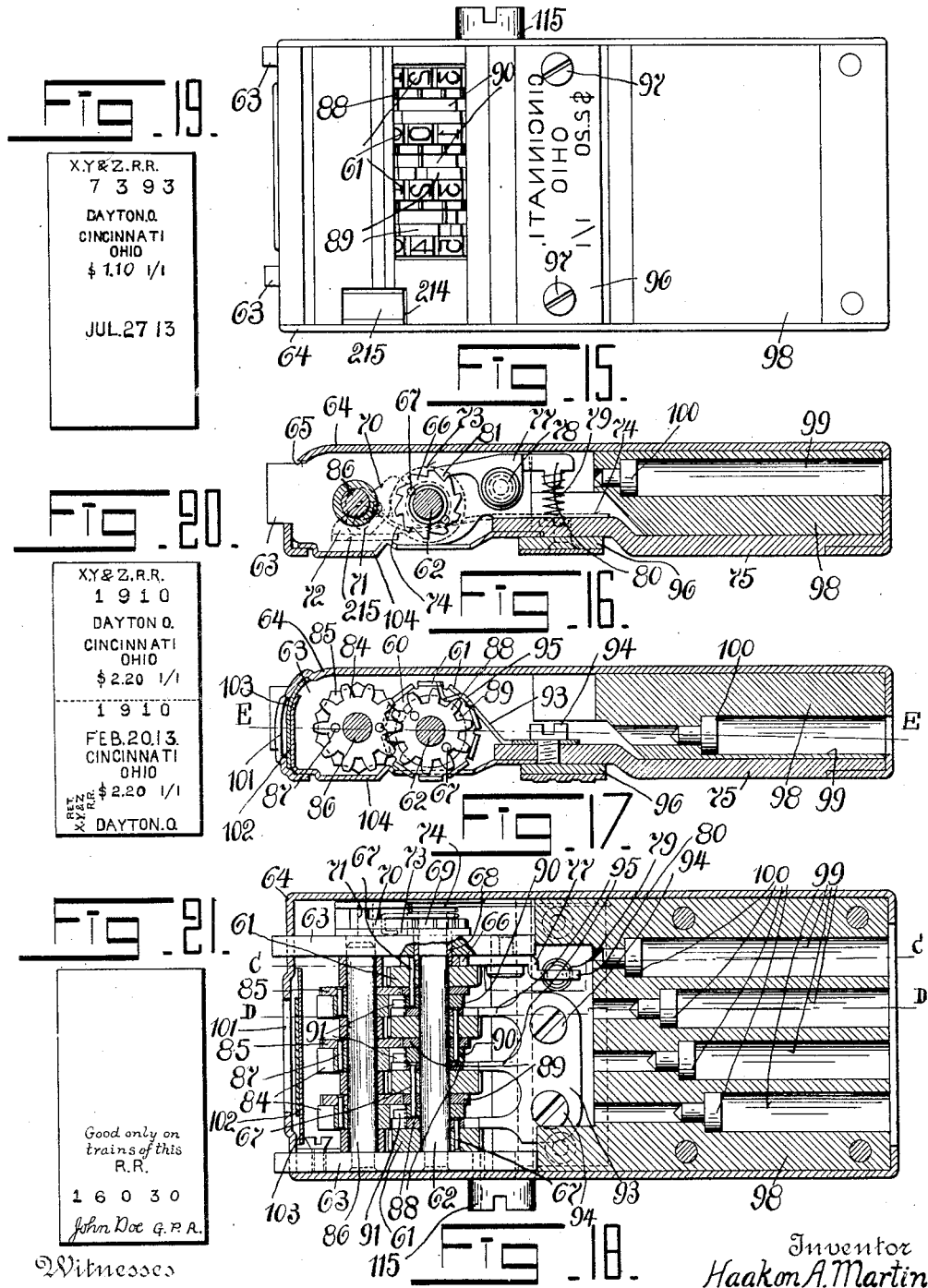

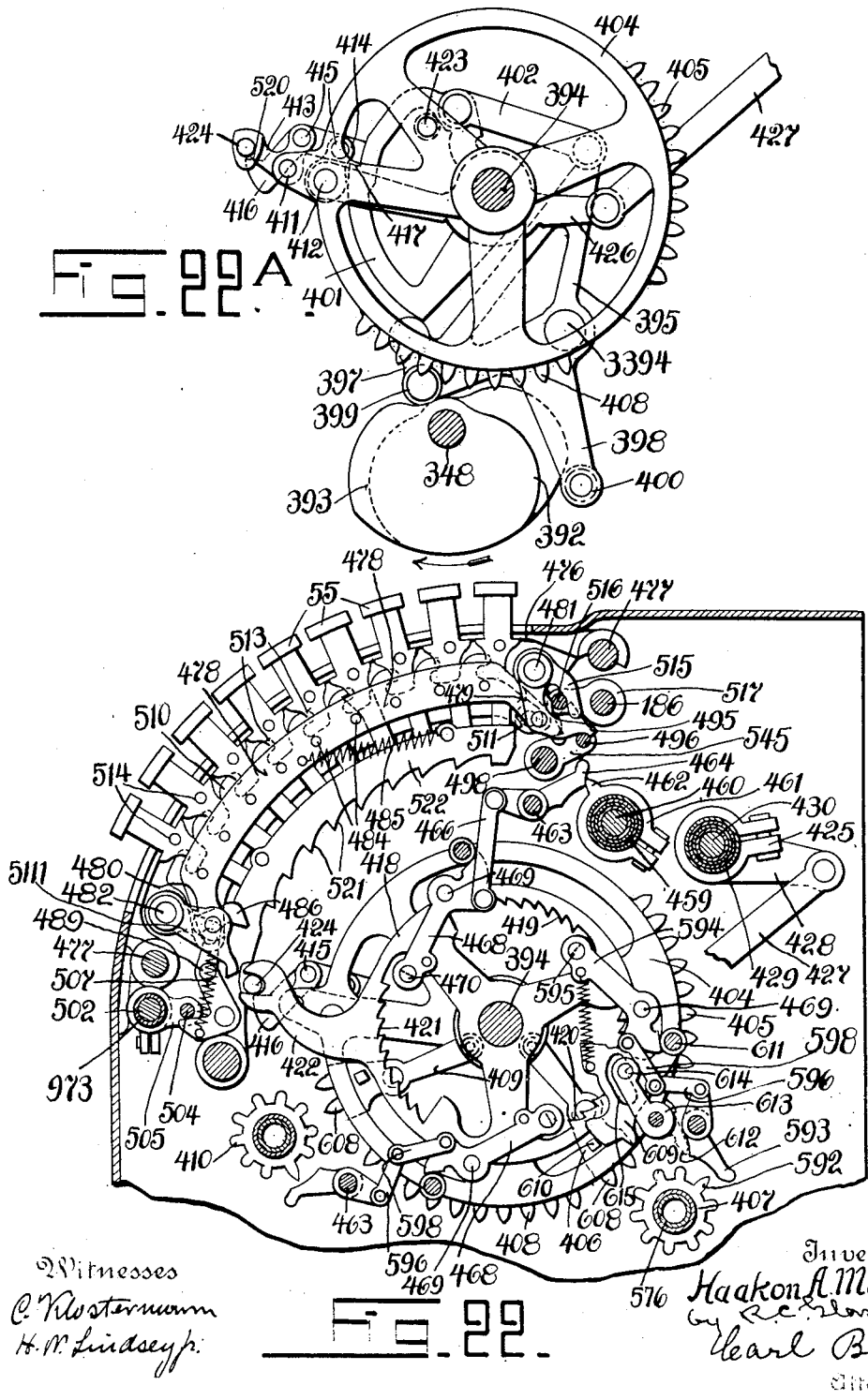

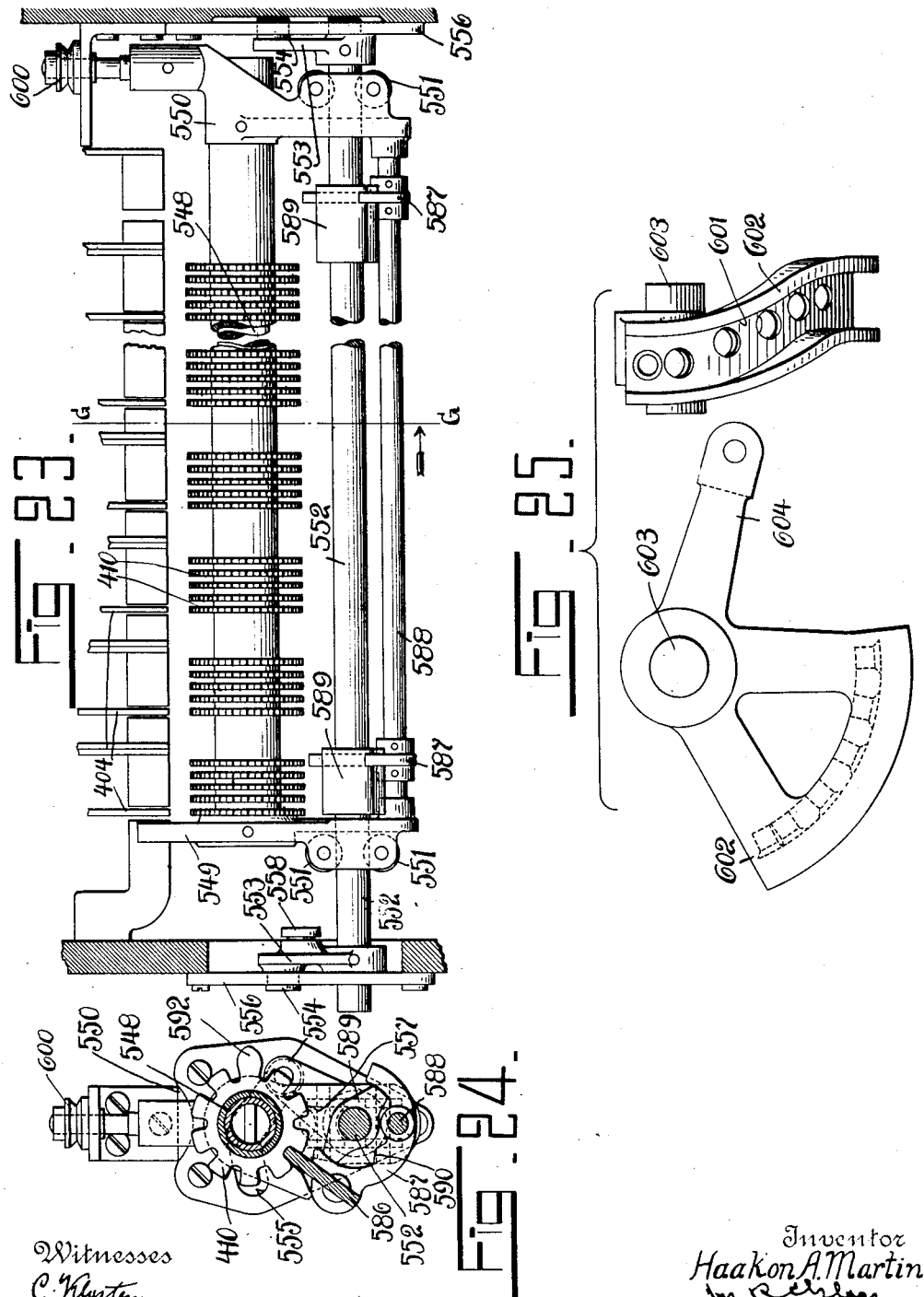

H. A. MARTIN.
RAILROAD TICKET ISSUING MACHINE.
APPLICATION FILED FEB. 6, 1915. RENEWED MAY 29, 1919.
1,309,954.
Patented July 15, 1919.
22 SHEETS—SHEET 14.
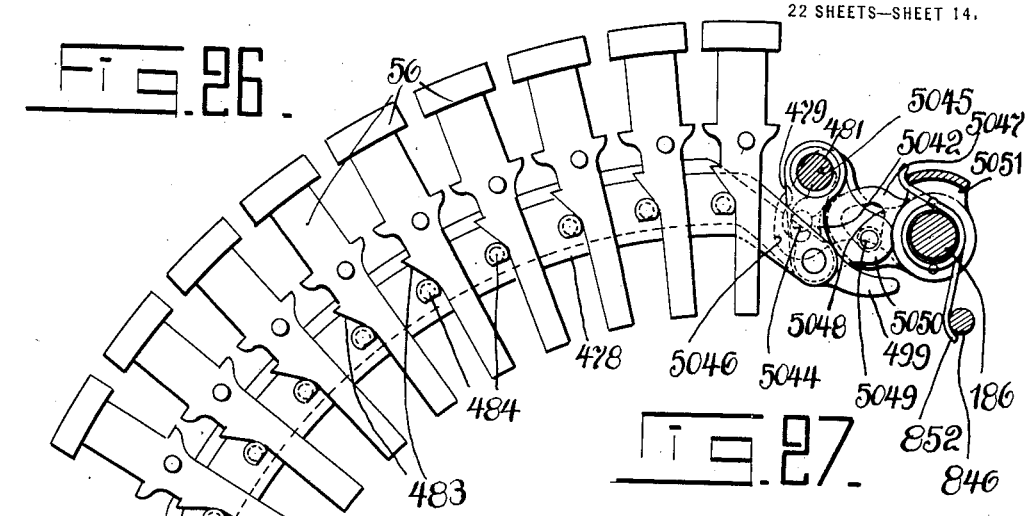
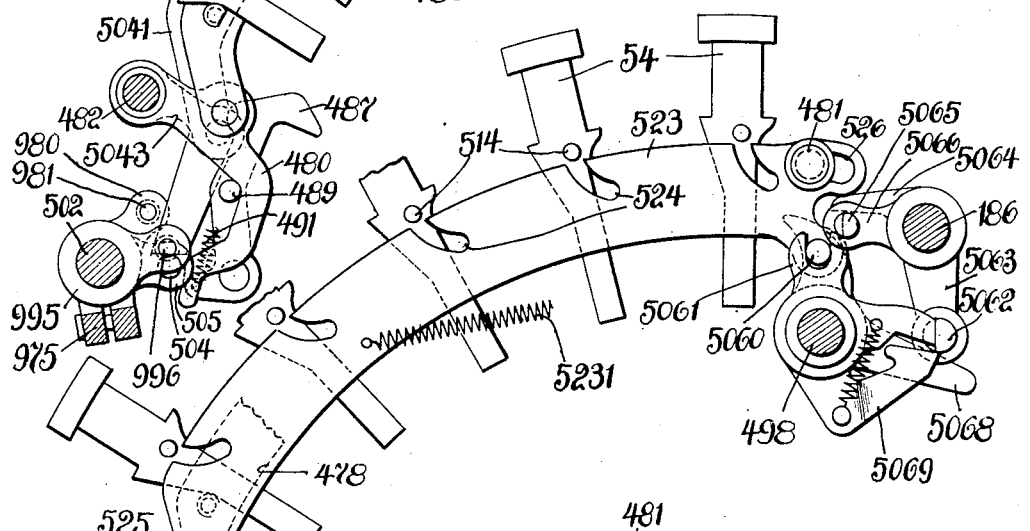
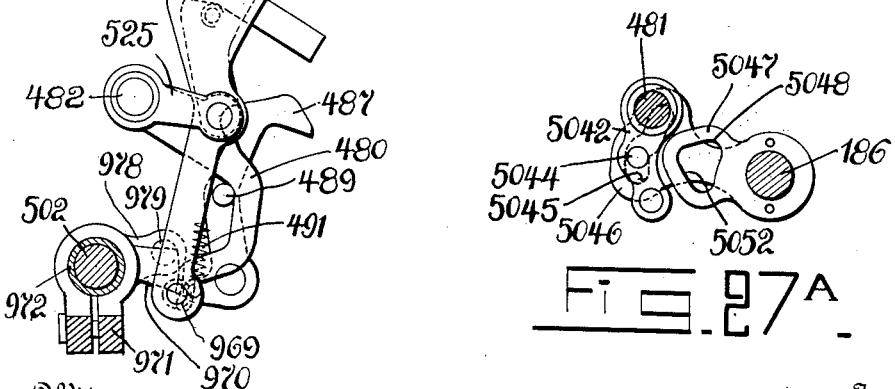
Witnesses
C. Klostermann
H. M. Lindsey Jr.
Inventor
Haakon A. Martin
by R. Ellan
Carl Benst
Attorneys

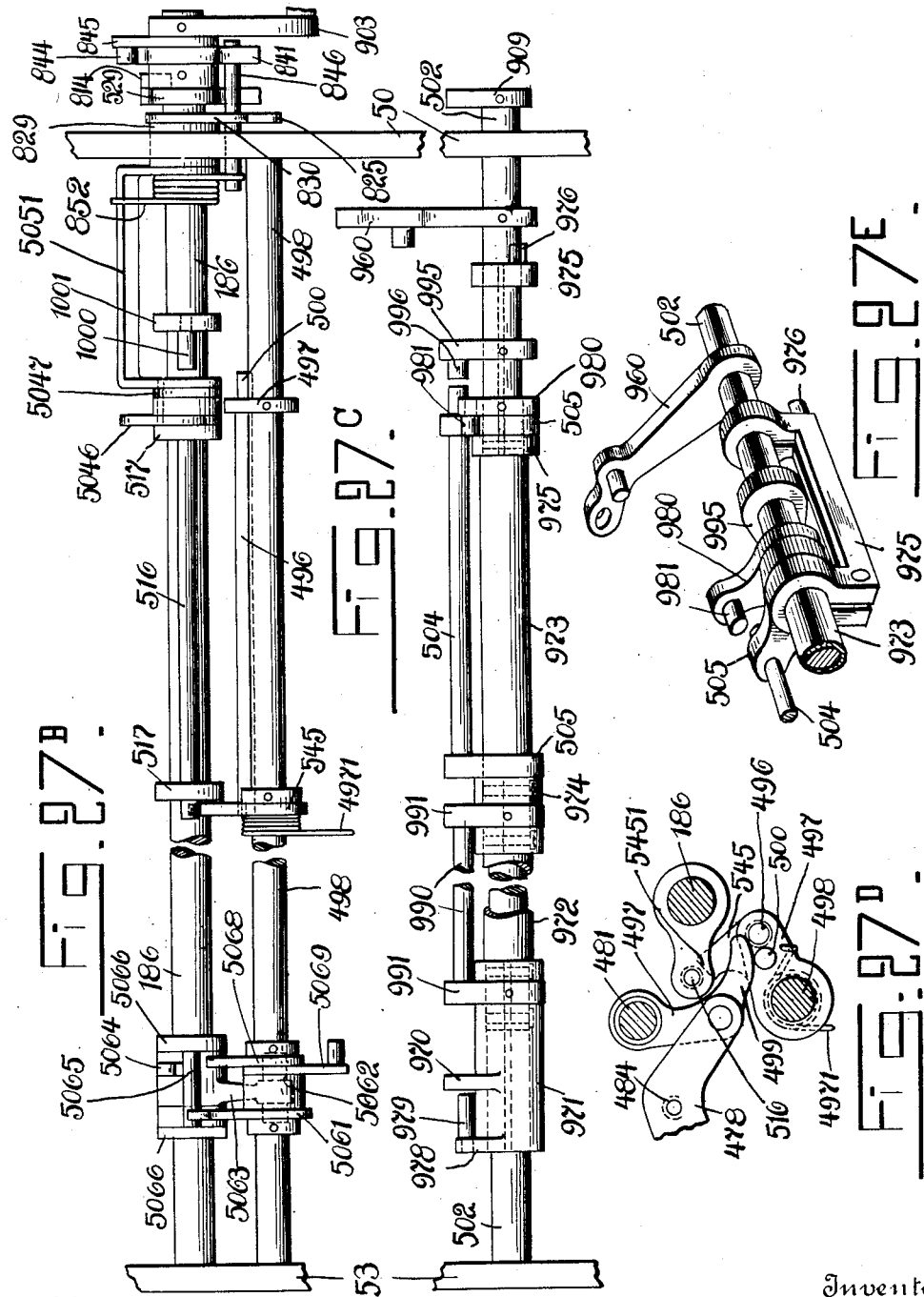

H. A. MARTIN.
RAILROAD TICKET ISSUING MACHINE.
APPLICATION FILED FEB. 6, 1915. RENEWED MAY 29, 1919.

1,309,954.

Patented July 15, 1919.
22 SHEETS—SHEET 16.

Witnesses
C. Klostermann
H. W. Lindsey Jr.

Inventor
Haakon A Martin
Carl Burst
Attorneys

H. A. MARTIN.
RAILROAD TICKET ISSUING MACHINE.
APPLICATION FILED FEB. 6, 1915. RENEWED MAY 29, 1919.
1,309,954.
Patented July 15, 1919.
22 SHEETS—SHEET 17.
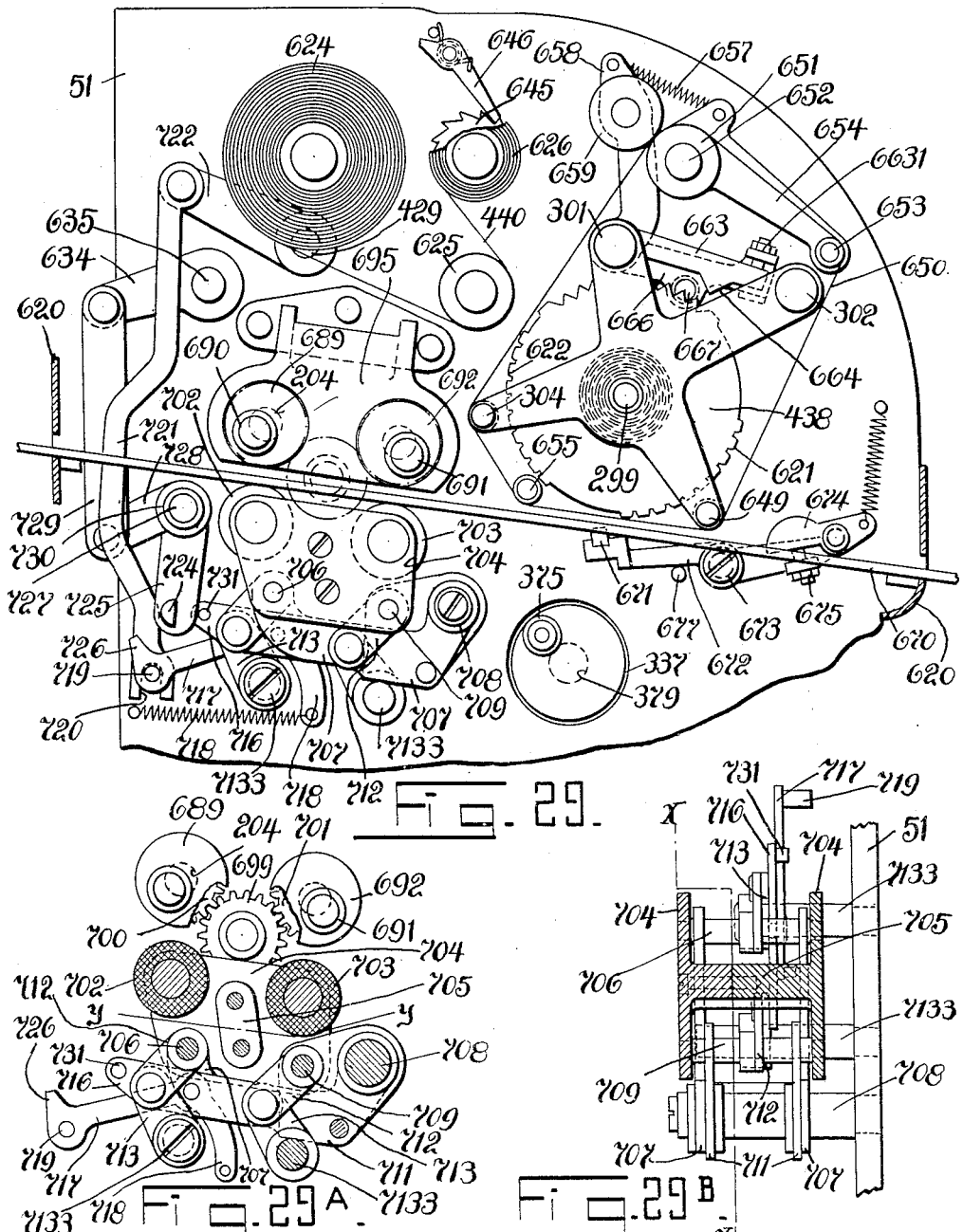

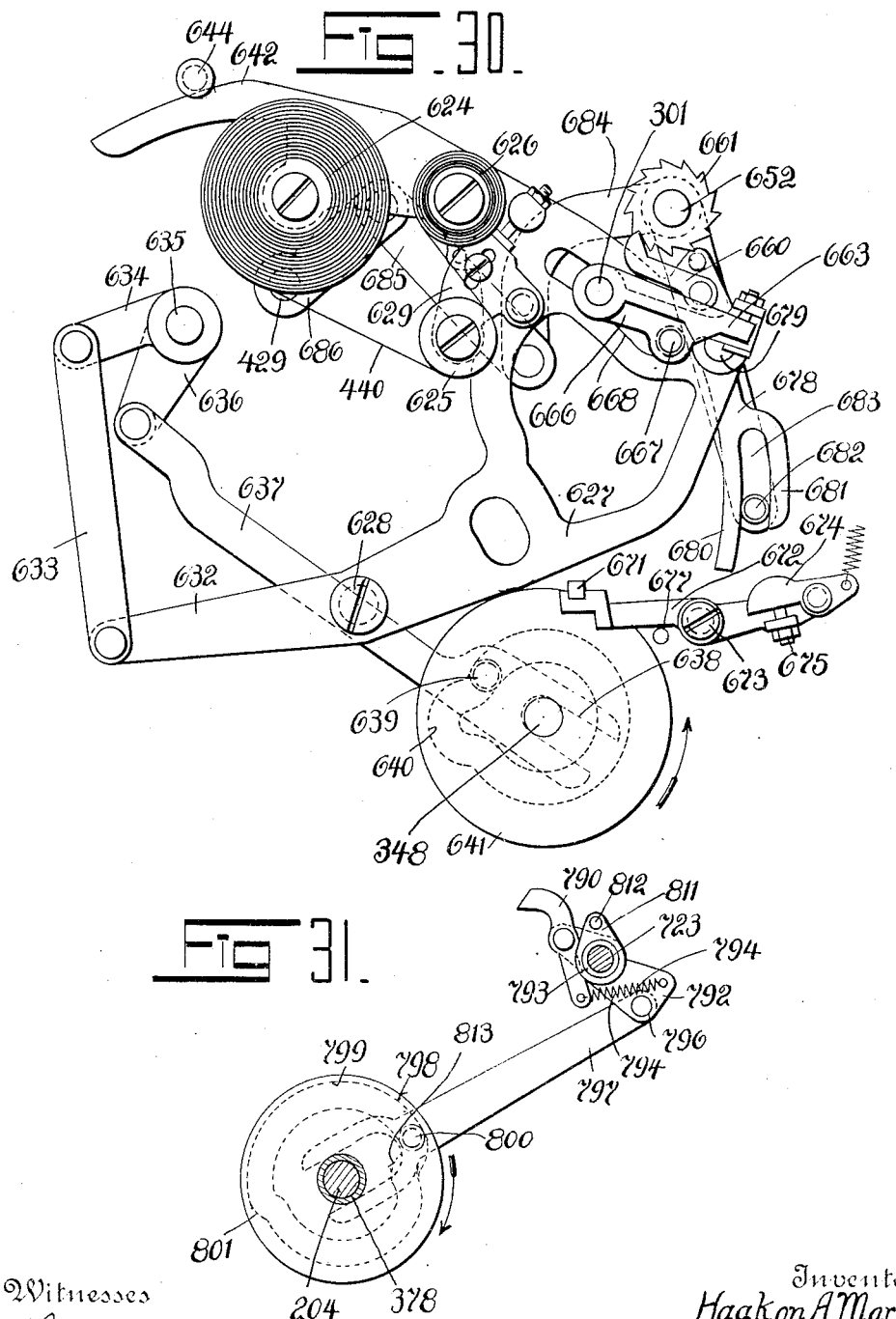

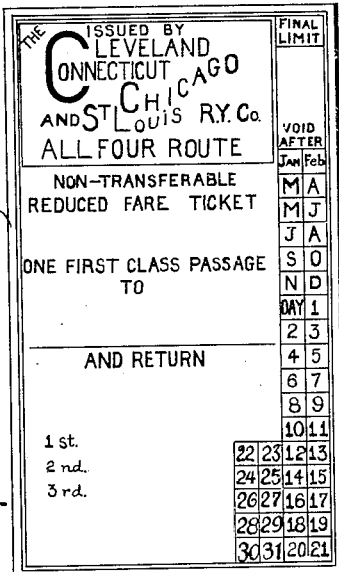
Fig. 32.
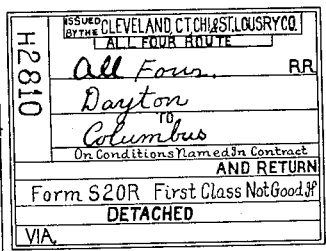
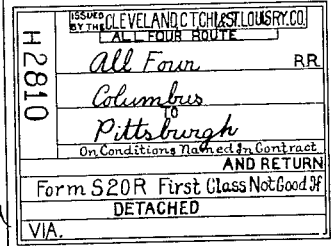
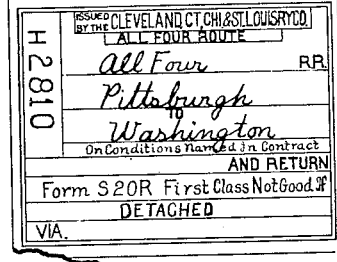
Fig. 33.

H. A. MARTIN.
RAILROAD TICKET ISSUING MACHINE.
APPLICATION FILED FEB. 6, 1915. RENEWED MAY 29, 1919.

1,309,954.

Patented July 15, 1919.
22 SHEETS—SHEET 20.

Witnesses
C. Klostermann
H. N. Lindsey Jr.

Inventor
Haakon A. Martin.
by
Carl Berst
Attorneys

H. A. MARTIN.
RAILROAD TICKET ISSUING MACHINE.
APPLICATION FILED FEB. 6, 1915. RENEWED MAY 29, 1919.

1,309,954. Patented July 15, 1919.

Witnesses
C. Klostermann
H. W. Lindsey Jr.

Inventor
Haakon A. Martin
by
Carl Benst
Attorneys

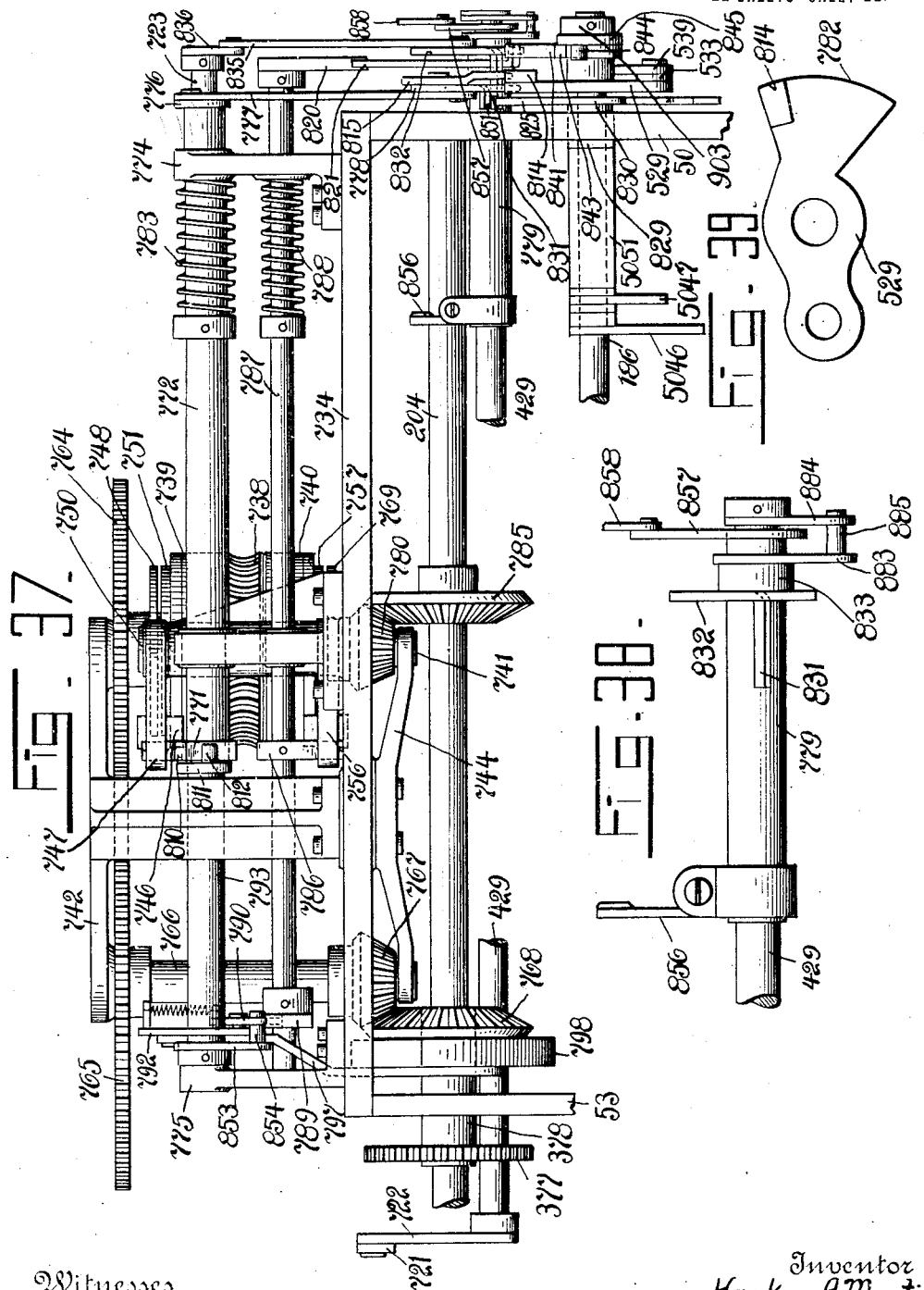

UNITED STATES PATENT OFFICE.

HAAKON A. MARTIN, OF CHRISTIANIA, NORWAY, ASSIGNOR TO THE NATIONAL CASH REGISTER COMPANY, OF DAYTON, OHIO, A CORPORATION OF OHIO. (INCORPORATED IN 1906.)

RAILROAD-TICKET-ISSUING MACHINE.

1,309,954.     Specification of Letters Patent.     Patented July 15, 1919.

Application filed February 6, 1915, Serial No. 6,490. Renewed May 29, 1919. Serial No. 300,773.

*To all whom it may concern:*

Be it known that I, HAAKON A. MARTIN, a citizen of the United States, residing at Christiania, Norway, have invented certain new and useful Improvements in Railroad-Ticket-Issuing Machines, of which I declare the following to be a full, clear, and exact description.

This invention relates to ticket issuing machines and has more particular relation to that class of ticket issuing machines adapted for use in issuing tickets for railroad and steamship lines or analogous uses.

The general object of this invention is to provide an efficient machine for use in railroad stations to issue different classes of local tickets good only between the station at which the machine is located and other established stations traversed by the different railroad lines, to validate coupon tickets, and accumulate automatically the total of the fares of the tickets issued and validated. It will be seen readily that the invention in its present embodiment is capable of other uses such, for instance, as on steamship lines, ferry lines, and lines of local travel, etc. In modified form the invention as a whole and also various parts thereof are capable of a large number of other uses such as in cash and credit registers, adding and calculating machines, ticket printing and issuing machines, voting machines, bank machines and a large number of other analogous or similar machines. The invention as a whole or any part of the same is capable of use therefore in other embodiments without constituting departure from the scope of the present invention.

One of the principal objects of the invention is to provide an improved, compact and efficient machine which will enable the printing and issuing of local tickets for any one of a large number of stations and for automatically controlling the registering of the value of the tickets issued to all of the stations, and the registering of the number of tickets issued to each station. The mechanism of the machine for printing and issuing these tickets will be called herein the "local printer," as the tickets issued by this mechanism are to established stations comparatively near the issuing station. The printing of the name of destination stations as well as the consecutive numbers of tickets of their particular classes is performed by destination devices which are in the form of detachable matrices separably inserted into the local printer, one of these devices for each class being provided for each station taken care of by the local printer. The destination devices are so constructed as to control the totalizing mechanism, the use of keys for this purpose being dispensed with, when the local printer is operated. In some inventions relating to railroad ticket machines non-detachable destination devices are provided but such constructions, while performing their functions in a wholly efficient manner, are rather large and require complicated selecting mechanism which necessarily raises the cost of manufacture. So far as is known by applicant he is the first to construct the destination devices so that they are normally detached from the machine and carry means for registering the number of tickets issued thereby and also are adapted to control the registering mechanism of the machine for registering the total value of the tickets issued. By this construction applicant has eliminated the necessity of providing selecting mechanism as well as the necessity of operating amount keys to control the registering of the value of the tickets when local tickets are issued.

Another object of the invention is to provide the machine with printing mechanism for printing the date and amount on coupon tickets, this mechanism being operated by the same means as is employed for operating the local printer. This printing mechanism, for the sake of convenience will be termed herein as the "validating printer" as it performs the function of printing on the coupon tickets of a previously made-up form to make them ready for use. The tickets validated by the validating printer are called "coupon tickets" herein, as they comprise a series of attached skeleton coupons each coupon being good between certain stations along the route of travel. It is understood of course, that the coupon tickets validated by the validating printer are for only those stations or destinations which are not provided for in the local printer, these stations usually being farther distant from the issuing station than those stations taken care of by the local printer. The value of the tickets issued by the local printer, as well as the value of tickets validated by the validating printer is printed on a detail strip by the validating printer. The initial of the ticket seller validating the ticket and the fare charged for the ticket is printed upon the first coupon of a coupon ticket this coupon being retained by the passenger so the conductor as well as the passenger can see how much was charged for the ticket and who validated the ticket and thus prevent overcharging.

A further object of the invention is so to control the differential mechanism of the totalizing mechanism that the value of the tickets validated by the validating printer will be totalized with the value of tickets printed and issued by the local printer. To this end the differential mechanism for the totalizing mechanism is controlled by amount keys when the validating printer validates a coupon ticket but is controlled by the inserted destination device when the local printer prints and issues a local ticket. It is obvious that such a construction is very valuable as the machine totalizes the value of all the tickets issued at the issuing station. Heretofore railroad ticket machines have been designed to take care of only the local tickets, no means being provided for validating coupon tickets. Such machines obviously take care of but a portion of the business of a railroad station. Applicant's invention on the other hand contemplates a performance of this function of taking care of all the business by a single machine and thereby practically eliminates errors and overcharges in the issuing of coupon as well as local tickets. The machine in the preferred form disclosed herein is not only designed to keep a total of the value of all the tickets issued and validated but is provided with individual totalizers one for each ticket seller. It will be obvious from the description of the totalizing mechanism that the individual totalizers may be assigned to the different railroad companies where a machine is used at a "union station" or that additional totalizers may be provided for this purpose. It will also be evident that special totalizers may be employed for segregating the total value of all coupon tickets validated and the total value of the local tickets printed and issued. It, therefore, is not intended to limit the invention to use with special totalizers assigned to the ticket sellers.

It is also one of the objects of this invention to design the operating mechanism and the controlling means therefor, so that the local printer is operated only when a local ticket is to be issued and to give the validating printer a number of cycles of movement corresponding to the number of coupons comprising the ticket to be printed thereon by the validating printer. The differential mechanism for the totalizing mechanism and the local printer is given but one cycle of operation when a local ticket is to be issued but when a coupon ticket is to be validated the differential mechanism is given but one cycle of operation and the validating printer is given a number of cycles of operation so that each coupon of the ticket will be validated.

Another object of the invention is to provide means in the local printer so that it is capable of issuing either round trip or one way tickets. To accomplish this result the local printer is provided with a manipulative device for controlling the adjustment of an electro in the local printer so that the electro may print part of the data for a one way ticket or a round trip ticket. When a one way ticket is issued, but one impression is taken from the inserted one way destination device to print the consecutive number and the place of destination. When a round trip ticket is issued, however, a duplicate impression is taken from the round trip destination device to print on the return portion of the ticket.

The fares charged for the local tickets issued or the coupon tickets validated, are printed on a detail strip positioned in the validating printer but the present invention is not provided with a means for consecutively printing the total number of local tickets issued by each destination device on a detail strip or other record material for auditing purposes. For this reason this machine is part of an auditing system which to be absolutely complete requires a separate machine for making such a record from the inserted consecutive numbering devices of the destination devices as the latter are passed through the machine. This machine however, is not described in the present application as it forms no part of the present invention and has been shown in my Patent No. 1,261,147, dated April 2, 1918, based on an application filed June 20, 1914. It is obvious however, that the use of the present invention as just above stated is merely a preferred use and not a limitation of the scope of the invention as the latter is capable of use as a whole or in part in a single machine also embodying the auditing feature without departing from the spirit of the invention.

With these and incidental objects in view, the invention consists in certain novel features of construction and combinations of parts, the essential elements of which are set forth in appended claims, and a preferred form of embodiment of which is hereinafter described with reference to the drawings which accompany and form part of the specification.

Of the said drawings,—

Figures 1 and 2, combined, constitute a front elevation of the entire machine embodying the present invention, part of the cabinet being broken away to expose the mechanism of the local and validating printers to view.

Fig. 2ᴬ is a detail sectional view through the adjustable electro in the local printer.

Figs. 3 and 4, combined, constitute a rear elevation of the machine shown in Figs. 1 and 2 and having the cabinet removed.

Figs. 4ᴬ and 4ᴮ are detail sectional views taken through the motor clutch mechanism, Fig. 4ᴮ being a horizontal section and Fig. 4ᴬ being taken on the line X—X in Fig. 4ᴮ.

Fig. 5 is a transverse vertical section through the local printer taken on the line A—A in Fig. 2 and looking to the right.

Fig. 6 is a transverse vertical section through the local printer, taken on the line B—B of Fig. 2, looking to the right.

Fig. 7 is a full sized perspective view of the rock frame for carrying the inserted destination device into position for controlling the differential mechanism for the totalizing mechanism.

Fig. 8 is a detail side elevation of the gearing employed in the local printer and of the movable knife of the severing mechanism, the frame between certain of the gears being removed.

Fig. 9 is a full sized detail front elevation of the ticket and platen frames.

Fig. 10 is a full sized detail side elevation of the destination device carrying frame, shown in Fig. 7, and the ticket and platen frames, shown in Fig. 9, the latter frames being shown in normal and operated positions.

Fig. 11 is a full sized detail view in side elevation of the means for releasing the previously inserted destination device from the machine and permitting the destination device to be employed at the next operation to pass into the destination device carrying frame, the chute through which the destination devices pass being shown in dotted lines.

Fig. 11ᵃ is a detail assembly view of the actuating mechanism for the consecutive number mechanism of the destination devices.

Fig. 12 is a full sized detail view of the cam and part of the connections for rocking the platen frame and the ticket frame.

Figs. 13 and 14 are full sized detail side elevation and top plan views, respectively, of the adjustable electro in the local printer and means for adjusting it and also the device for operating the platen frame to make one or two impressions on a ticket dependent upon whether a one way or a round trip ticket is to be issued.

Figs. 15, 16, 17, and 18, are enlarged views of one of the destination devices; Fig. 15 being a bottom plan view showing the printing side of the device; Fig. 16 being taken on the line C—C of Fig. 18, and Fig. 17 being taken on the line D—D of Fig. 18, and Fig. 18 being taken on the line E—E of Fig. 17. In Fig. 18 the operating means as well as the plates for supporting the consecutive counter are not shown in section for the sake of clearness.

Figs. 19, 20, and 21, show full sized illustrative forms of tickets issued by the local printer; Fig. 19 being a top plan view of a one way ticket; Fig. 20 being a top plan view of a round trip ticket; and Fig. 21 being the back view of the ticket shown in Fig. 19.

Fig. 22 is a transverse vertical section of the register taken along the side of one of the banks of amount keys, as on the line F—F in Fig. 1 and looking to the left.

Fig. 22ᴬ is a detail view showing one of the totalizer actuators and the driving means therefor.

Fig. 23 is a full sized bottom plan view of the ticket seller's totalizers.

Fig. 24 is a full sized sectional view on the line G—G of Fig. 23.

Fig. 25 shows details in front and side elevation of the spiral cam employed to select the ticket seller's totalizers for operation.

Fig. 26 is a full sized detail view in side elevation looking to the left, of the validating bank of keys employed to control the number of cycles of operation of the validating mechanism of the validating printer, the locking plate for the keys being omitted.

Fig. 27 is a full sized right hand side elevation looking to the left, of the keys comprising the ticket seller's bank.

Fig. 27ᴬ is a detail view of the two slotted arms and an arm forming part of the mechanism controlling the operation of the zero stop pawls for the banks of amount keys.

Fig. 27ᴮ is a detail front view of part of the mechanism for controlling the releasing of the operating mechanism and for effecting the locking and releasing of the keys.

Fig. 27ᶜ is a top plan detail view of the devices mounted on the shaft which is controlled by the device for preparing the machine for total and subtotal printing operations.

Fig. 27ᴰ is a detail view of the means employed for operating the device normally locking the amount keys against operation.

Fig. 27ᴱ is a detail perspective view of part of the mechanism shown in Fig. 27ᶜ.

Figure 28:
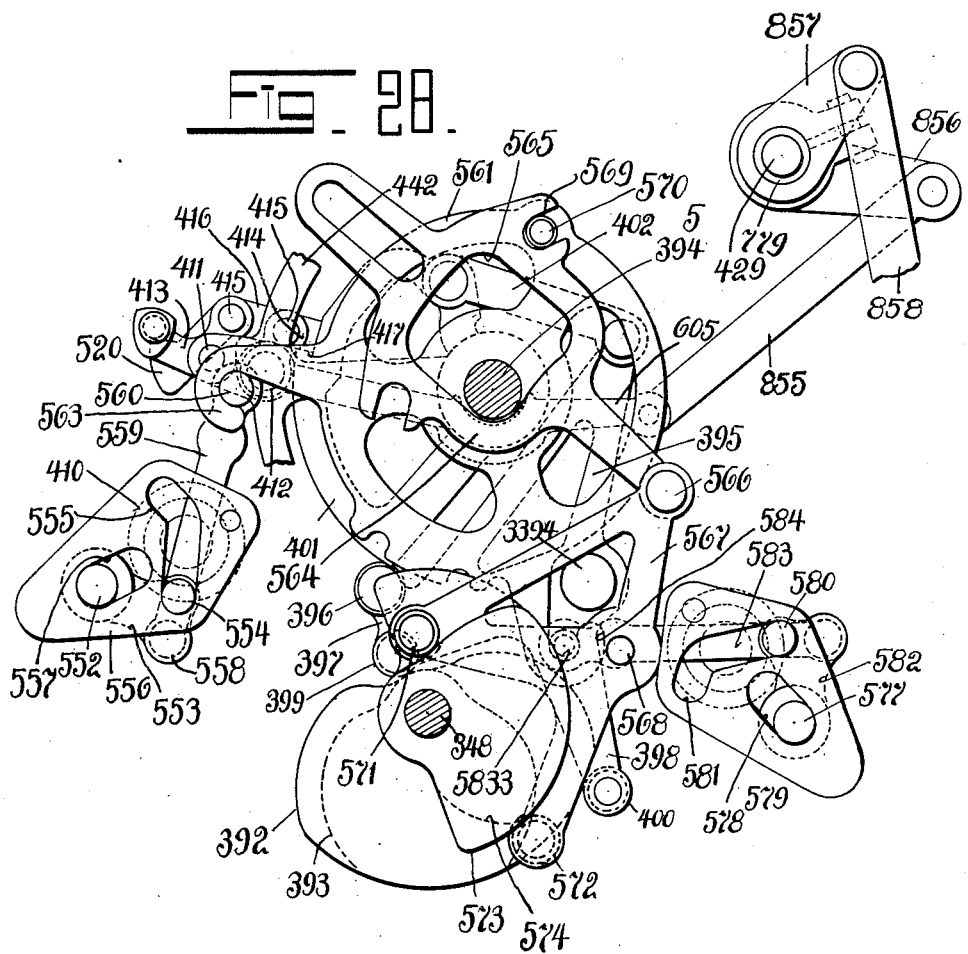

Fig. 28 is a full sized detail view in side elevation looking to the left, of the differential mechanism controlled by the validating bank of keys and part of the mechanism for engaging the totalizers with the actuators.

Fig. 29 is a left hand side elevation of the validating printer.

Fig. 29ᴬ is a detail sectional view of the validating printer, impression rolls and the means for elevating the latter, the view being taken on the line X—X of Fig. 29$^B$ and showing the printing cylinders but not in section.

Fig. 29$^B$ is a detail sectional view taken on the line Y—Y of Fig. 29$^A$ and looking downwardly.

Fig. 30 is full sized detail view of the movable printer frame in the validating printer.

Fig. 31 is a full sized detail view of the device for disconnecting the motor clutch through which the motor drives the local printer, and for rendering the motor clutch through which the motor drives the register and validating printer effective.

Figs. 32 and 33 are full sized partial top plan and bottom plan views respectively of an illustrative form of coupon ticket validated by the validating printer.

Figures 34, 34A:
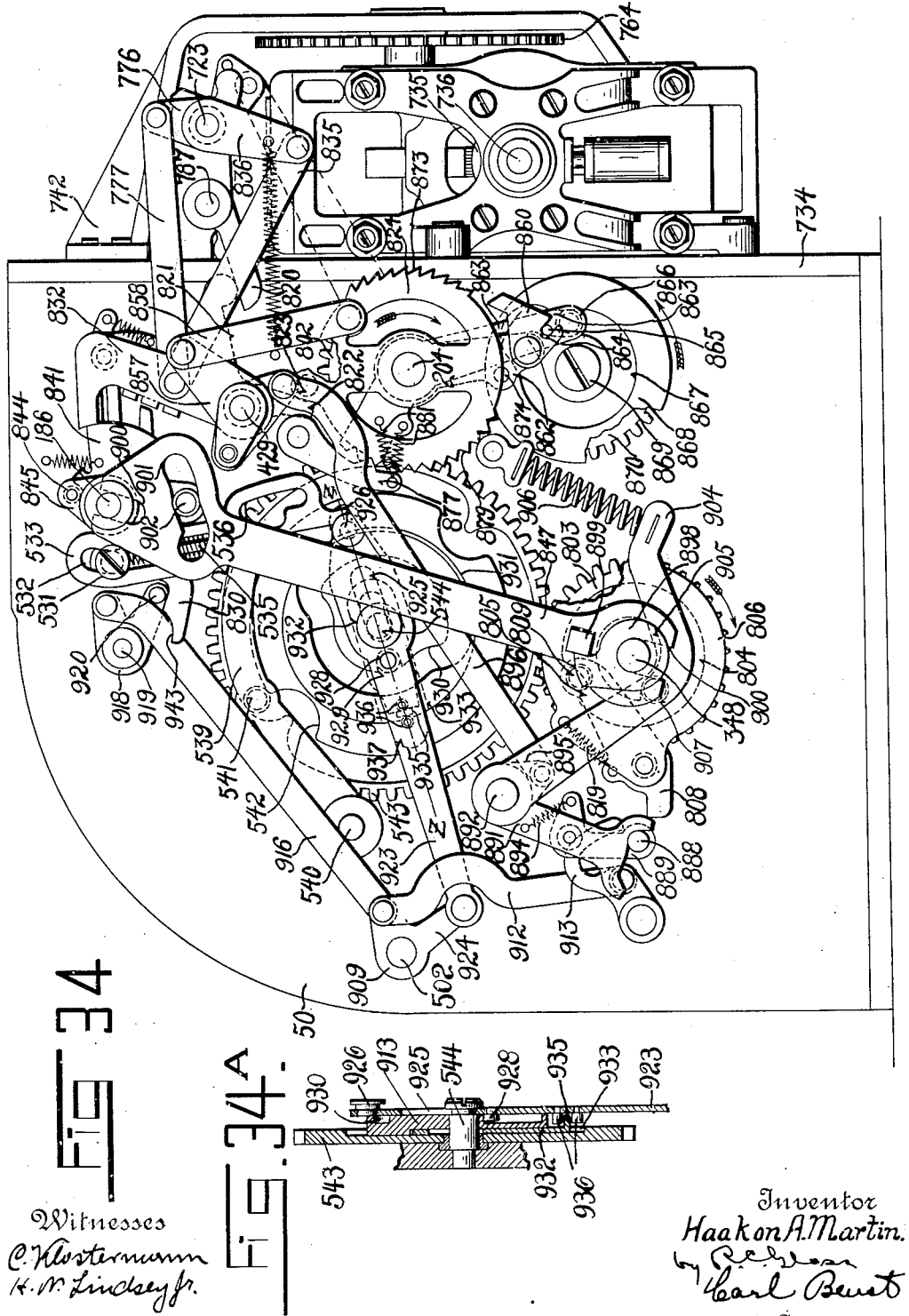

Fig. 34 is a right hand side elevation of the machine.

Fig. 34$^A$ is a detail sectional view taken on the line Z—Z of Fig. 34.

Figure 35:
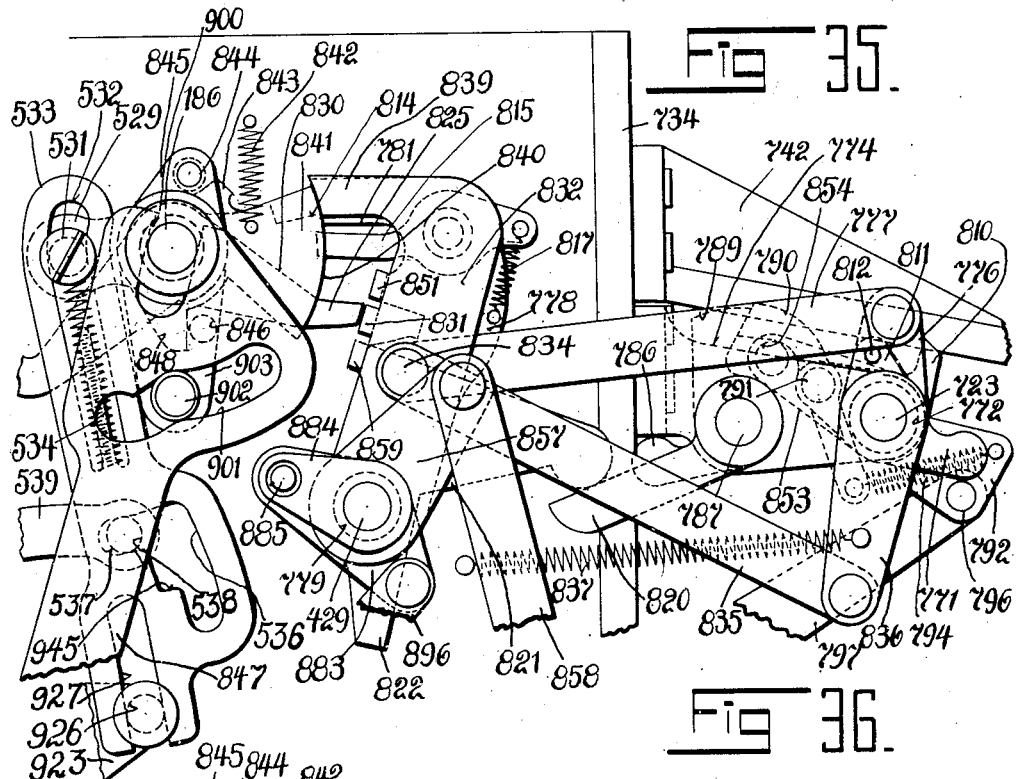
Figure 36:
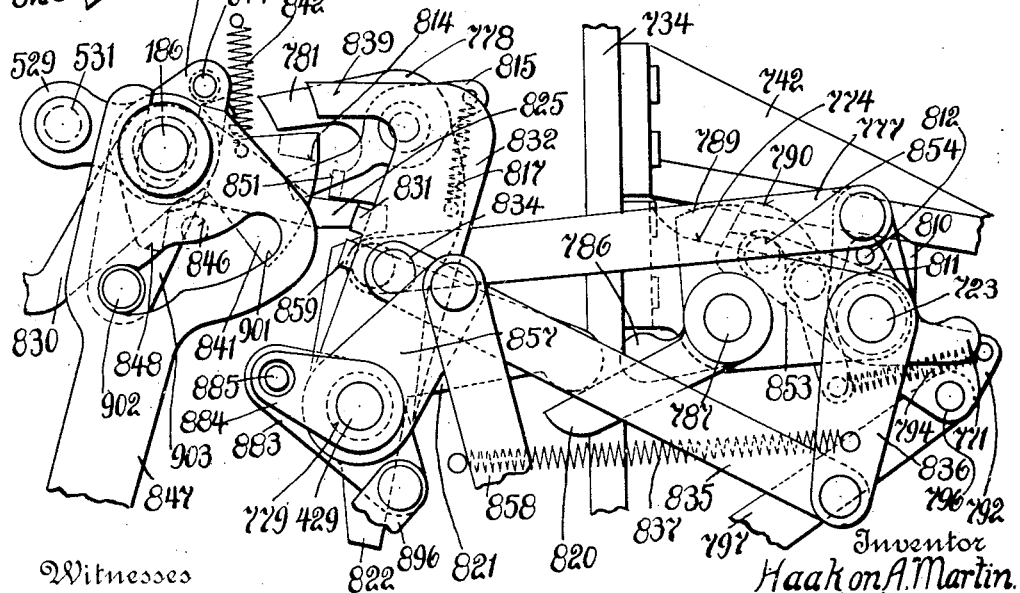

Figs. 35 and 36 are enlarged detail views of a portion of the mechanism shown in Fig. 34 for controlling the motor clutches, this mechanism being shown in normal position in Fig. 35 and in operated position in Fig. 36.

Fig. 37 is a partial top plan view of the driving connections through which the motor operates the machine, and shows part of the mechanism for controlling the clutch mechanisms.

Fig. 38 is a full sized detail top plan view of part of the mechanism shown in Fig. 37.

Fig. 39 is a full sized detail view of a lever forming one of the elements of the mechanism for controlling the local clutch of the motor.

The machine in general comprises the validating printer, the local printer and an accounting machine called the "register" herein. The register is the type of machine shown and described in the patent to William A. Chryst, No. 1,230,864, dated June 26, 1917, based on an application filed June 7, 1913, and comprises differential mechanism for operating a grand totalizer and a plurality of individual totalizers, which are termed herein "ticket seller's" totalizers. In the present invention, the register is provided with a keyboard including banks of amount keys for controlling the differential mechanism when a through or coupon ticket is to be validated, a bank of initial keys for selecting the desired ticket seller's totalizer for operation, and a bank of validating keys for controlling the number of cycles of operation of the validating printer, so that it will be operated in accordance with the number of coupons comprising a coupon ticket so that each coupon will be validated.

When a local ticket is to be issued, the destination device, for printing on a ticket of the desired class, for the desired station of destination, is inserted into a chute in the local printer. Upon operation of a hand lever the inserted destination device passes into a rocking frame employed to carry the device into position to control the differential mechanism for the totalizers upon operation of the local printer. After the hand lever has been operated to permit the inserted destination device to pass into the rocking frame it is only necessary to depress the initial key assigned to the ticket seller operating the machine to effect a complete operation of the machine for printing a local ticket. To this end an electric motor is provided with two clutches, and with releasing means for each clutch. The local printer is operated through one of these clutches, and the validating printer and the register are operated through the other clutch by the motor. While the motor is shown as a common operating means for the entire machine, it is evident that a hand crank or other means may be employed for this purpose, and it is not intended to limit the invention to use with an electric motor. When only an initial key is operated both clutches are released to operate the register and validating printer, as well as the local printer, but the validating printer at this operation is not employed to validate the ticket.

Upon an operation of the local printer a ticket is partly printed by an electro, fed into a platen carrying frame and then severed from the ticket strip. The platen frame subsequently is raised to carry the ticket into engagement with the destination device to print the consecutive number of the class of tickets printed by the device, and also the place of destination on the ticket. The electro is constructed to be adjusted preliminarily to an operation of the machine so that it may print a one way or a round trip ticket. Then, upon operation of the machine, the platen in accordance with the position of the electro carries the ticket once or twice against the inserted destination device to print the consecutive number and place of destination once upon a one way ticket, or twice upon a round trip ticket.

Before the local ticket is carried against the destination device the latter is carried by the rocking frame into printing position, and in this position the device is in coöperative relationship with finger-bearing bars comprising part of the mechanism for controlling the differential mechanism for the totalizers. The destination devices are provided with amount determining means which, in the present instance, are in the form of holes of different depths representing the value of the tickets issued by the particular devices. Upon operation of the register the fingers on the bars pass into these holes, and upon being arrested by the engagement of the fingers with the bottoms of the holes effect disconnections between differential actuators for the totalizer and their operating means. A pawl is operated during the movement of the frame carrying the inserted destination device to actuate the consecutive numbering device of the latter.

When a coupon ticket is to be validated, the ticket seller places a ticket similar to that of the usual printed form upon a table in the validiating printer, depresses the key in the validating bank corresponding to the number of coupons comprising the coupon ticket, the amount keys representing the value of the ticket to be validated, and finally depresses his initial key. Upon depression of the initial key, the clutch through which the motor drives the validating printer and the register is rendered effective. The driving mechanism of the register actuates the differential mechanism for the totalizers as when the local printer is operated, but when a coupon ticket is to be validated the extent of movement of the differential mechanism is controlled by the depressed amount keys. Type carriers in the validating printer are positioned by the differential mechanism of the register at every operation of the machine, and are provided for printing the value of the coupon tickets and the initial of the ticket seller on the coupons of the coupon tickets retained by the passengers, and also the values of the coupon tickets validated and the local tickets issued on a detail strip. The validating printer is given a number of cycles of operations determined by the special validating key depressed. After the first cycle of movement of the validating printer and the register, the driving means for the register is disconnected from the common operating means, and finally during the last cycle of movement of the validating printer the clutch is disconnected and the motor stopped.

Described in specific terms, and referring more particularly to Figs. 1, 2, 3, and 4, the machine embodies the main side frames 50 and 51, and frames 52 and 53 intermediate the side frames, all of the frames being mounted on a suitable base. The register is located between the right hand side frame 50 and the frame 53. The keyboard of the register (Fig. 1) comprises a bank of ticket sellers or initial keys 54, four banks of amount keys 55 and a bank of validating keys 56. as well as a lever 57 for controlling the adding, resetting and reading operations of the totalizers. The local printer is located to the left of the register between the frame 52 and the side frame 51. The validating printer is located on the left hand side of the frame 51.

Destination devices.

As above stated, a large number of destination devices are used, as one device is provided for each class of local tickets issued to each of the stations for which the local printer issues tickets. Any one of the following classes of tickets may be represented by a destination device; "half fare," "round trip," or "one way tickets," "full fare," "round trip," or "one way tickets," "excursion tickets," etc.

As shown in Figs. 15, 17, and 18, each destination device is provided with a consecutive numbering device 60, comprising a plurality of printing wheels 61 loosely mounted on a shaft 62, which is suitably supported in parallel plates 63. The plates are mounted in the forward end of the casing 64 of the destination device, and their forward ends project through openings 65 (Fig. 16) cut in the front end of the casing.

The units printing wheel of a consecutive numbering device is rigidly connected with a ratchet wheel 66 (Figs. 16 and 18) by connecting pins 67. The ratchet wheel 66 is fast on a sleeve 68, which passes through one of the plates 63, and rigidly carries a ratchet wheel 69 on its opposite end. A pawl 70 is pivoted at 71 to an arm 72 of a member 73 loosely mounted upon the sleeve 68. The rear end of a spring 74, coiled about the shaft 62, is fast to a plate 75 forming a part of the lower side of the casing of the destination device. The other end of the spring is bent to pass through a hole in the pawl 70. The spring is tensioned and serves to retain the pawl 70 and the member 73 in the normal position shown in Fig. 18. When a destination device is inserted into the machine and the machine operated the member 73 is rocked clockwise (Fig. 16) in a manner to be described later, and through the pawl 70 and ratchet wheel 69 moves the unit printing wheel one step forward to add 1 on the numbering device. A pawl 77, which is pivoted at 78 to one of the plates 63, is held in engagement with the ratchet wheel 66 by a spring 79, which is compressed between the rearwardly extending arm 80 of the pawl 77 and the plate 75 of the casing. Upon each step of movement of the units wheel and the ratchet 66, the nose 81 of the pawl 77 is lowered into engagement with the radial face of the next succeeding tooth of the ratchet 66 after the tooth has passed under the nose, and in this manner backward movement of the printing wheels 61 is prevented.

Transfers from one printing wheel to the printing wheel of next higher order are accomplished by the well known "Geneva" transfer mechanism, which will be described here but briefly. Broad transfer pinions 84 and locking star disks 85 are alternately loosely mounted upon a cross rod 86 and are rigidly connected in pairs by pins 87, each pair comprising a pinion 84 and a star disk 85. To each of the wheels 61 above the units there are connected by pins 87, a pinion 88, a notched disk 89, and a disk 90. The units wheel has no pinion 88. Each of the disks 90 is provided with a single tooth 91, adapted to coöperate with the appropriate one of the pinions 84 which is sufficiently broad to coöperate not only with the disk 90 but also with the pinion 88 of the wheel 61 of next higher order. This coöperation occurs just at the completion of each complete rotation of the wheel of lower order. Just at this time the notch in the disk 89 is adjacent one of the points of the star disk 85 thus permitting the turning of said disk 85 and pinion 84 one step to carry one to the wheel of next higher order. A leaf spring 93 is fastened to the plate 75 of the casing by screws 94 (Figs. 17 and 18) and has projecting prongs 95 for coöperating with the pinions 88, so that the printing wheels will be alined in their proper printing positions.

In addition to printing the consecutive number of the ticket issued by the destination devices each device is adapted to print the name of the destination station to which it is assigned, the fare, and the class, (Figs. 15, 19, and 20). This data is printed by the printing blocks 96 rigidly fastened to the plates 75 of the devices by screws 97.

One end of each destination device carries a block 98 having holes 99, which are made of different depths to control the differential mechanism for the totalizers, and represent the value of the ticket printed by the destination device. Stops 100 are inserted into the holes and form the bottom of the holes.

An opening 101 (Fig. 17) is formed in the forward end of the casing of each destination device so that a card 102 bearing the name of the destination station to which the device is assigned can be seen through this opening. The card is inserted into the device between the front wall of the casing and an upturned forward portion 103 of a plate 104 forming the front end of the bottom of the casing.

*Means in local printer controlling insertion and ejection of destination devices.*

For the purpose of issuing a local ticket, the destination device for the desired destination is inserted through the cabinet into the open end 108 of a chute 109 (Figs. 2, 5, 6, and 11) in the local printer. The chute is carried by cross rods 110 and 111, the upper end of the chute being provided with rearwardly extending arms 112 through which the rod 110 passes and the lower end of the chute with forwardly extending arms 113, which engage over the rod 111. The destination devices are inserted into the chute with their card bearing ends first and the printing blocks 96 facing the back of the chute. The chute on its left hand side is provided with a rib or guide 114 (Fig. 6) on which studs 115 (Figs. 15 and 18) on the destination devices are adapted to slide, the purpose of the rib 114 and studs 115 being to prevent the insertion of the destination devices incorrectly. The back of the chute is provided with an opening 116 (Fig. 6) and the left hand sides of the bottoms of the destination devices are adapted to slide on the back of the chute on the left of the opening.

The inserted destination device passes through the chute 109 into a carrying frame 118, shown in Figs. 2, 5, 6, 7 and 10. This carrying frame 118 consists of two side plates 119, loosely mounted on rods 120 carried in two upright supporting frames 121 mounted on the base of the machine. The side plates 119 of the carrying frame 118 have flanges 122, to which is fastened a member 123. On the inner right hand side of the member 123 is a rib 124 (Fig. 7) corresponding to rib 114 of the chute 109 and upon which the studs 115 of the destination devices slide, and on the inner left hand side of the member 123 is a rib 125 upon which the left hand rear sides of the destination devices slide. The frame is normally in such a position that the inserted destination device can slide down the chute 109 into the member 123. A rod 127 is supported by the upper ends of two arms or links 128 (Figs. 2, 5, and 11) loosely mounted at 129 on arms 130 which, in turn, are journaled on the rods 120. The rod 127 is adapted to be moved forward in slots 131, formed in the frames 121, to remove it from beneath and thus to release the inserted destination device from the member 123, while the machine is not being operated and the rod 127 is adapted to be moved rearward in the slots and then forward to normal position during the operation of the local printer, as will be described later. The rod 127 is normally below the lower open end of the member 123 and in engagement with the flanges 122 of the rocking frame 118, so that the forward end of the plates 63 in the inserted destination device rests upon this rod.

For the purpose of permitting but one destination device to be completely inserted into the local printer at a time, and for moving the rod 127 forwardly in the slots 131 to permit the previously inserted destination device to drop out of the machine, upon the insertion of another destination device, the following mechanism is provided.

A hand lever 134 (Figs. 2, 5, 6, 10, and 11) is loosely mounted on a stud 135 projecting from an arm 136 extending rearwardly from the right hand side of the chute 109. The hand lever 134 is located to the right of chute 109 as shown in Fig. 2. However it has been shown in full lines in Fig. 11 for the sake of clearness and the chute 109 has been outlined in broken lines so as to show the relative positions of the parts. A forwardly projecting portion 137 of the lever 134 carries a pin 138 projecting into the slot 139, formed in the forward end of an enlarged portion 140 of the upper end of a reciprocating bar 141. In the rear end of the enlarged portion 140 of this reciprocating bar 141 is a slot 142 through which the stud 135 projects, and near its lower end the bar 141 is provided with a slot 143 through which passes a stud 144 projecting from a forwardly and downwardly extending arm 145 on the right side of the chute 109. It can be seen from this construction that when the lever 134 is rocked clockwise about its pivot 135 the stud 138 will operate in the slot 139 forcing the reciprocating bar 141 to slide downward upon the guide studs 135 and 144. A roller 146 engages the forward edge of the bar 141 to assist in guiding the bar. An inclined slot 147 is formed in the lower enlarged end 148 of the bar 141, so that when the bar 141 is lowered by the lever 134, the slot 147 will pass over the rod 127 and force the rod forwardly in the slots 131 and away from under the inserted destination device, that is, out of the position in which it is shown in Fig. 10. When the bar 141 is moved in this manner, the destination device falls out of the member 123 between guide pieces 150 and 151 on the flanges 122 of the frame 118, and then slides on top of a ticket chute 153 (Figs. 2, 5, and 6) out of the machine. The guide piece 150 is constructed so that the stud 115 on the destination device slides thereon as the destination device passes out of the frame 118. The ticket chute 153 is fastened by rearwardly extending arms 154 (Figs. 5 and 6) to the front edge of the base of the machine.

As best shown in Figs. 10 and 11, a hooked arm 155 is pivotally mounted at 156 to the right hand side plate 119 of the frame 118. A spring 157, which, at its lower end, is secured to a pin 158 on the arm 155, and at its upper end to a pin 159 on the plate 119, normally retains the arm 155 in the position shown in Figs. 10 and 11 so that a forward hooked portion 160 of the arm 155 is hooked under the rod 127. The purpose of this arm 155 will be described later, but as it is necessary to rock it downward to permit the bar 127 to move forward in slots 131 when a destination device is to be ejected, it may be stated here that this rocking of the arm is accomplished by the end 161 (Fig. 11) of the bar 141 engaging a pin 162 on the arm 155 when the bar 141 is lowered as described above.

The downward movement of the hand lever 134 also serves to move a lug 164 projecting from the portion 137 of the lever out of engagement with the lower end of the destination device which has been inserted into the open end 108 of the chute 109, the lug being provided to prevent one destination device passing through the chute until after the destination device in the frame 118 is released to permit it to pass out of the machine. The lug 164 moves in an opening 165 (Fig. 2) formed in the chute for this purpose. The restoration of the bar 141, the lever 134 and the rod 127 to normal position is effected by a spring 166 (Figs. 5 and 13) when the operator removes his hand from the lever 134, the spring being tensioned and connected at its lower end to a projection 167 on the bar 141, and at its upper end to a pin 168 on one of the arms 112 of the chute 109.

In order to prevent a new destination device passing directly into the frame 118 and out of the machine when released from the lug 164 and when the bar 127 is moved forwardly from under the previously inserted destination device, the following device is provided to prevent the inserted device from passing into the frame 118 until the bar 127 has been restored to normal position under the lower end of the member 123. This device includes a lever 170 (Figs. 2, 6, and 11) loosely mounted on the stud 144, and at its upper end the lever carries a stud 171. At its lower end, the lever 170 is provided with a cam slot 172 through which a roller 173, mounted on the bar 141, projects. When the bar 141 is lowered by the operation of the lever 134, as described above, the roller rides down in the slot 172 and rocks the lever 170 counter clockwise thereby carrying the stud 171 into the path of the new destination device which has passed the lug 164 so that the device will be stopped by the stud 171 while the rod 127 is in the forward ends of the slots 131. Upon return of the lever 134 and bar 141 to normal position, the lever 170 is rocked clockwise to normal position to carry its stud 171 out of engagement with the inserted destination device and thus permit the latter to pass into the member 123, in which it is stopped by the rod 127, which has also been restored to normal position upon movement of the bar 141 to normal position.

To lock the lever 134 against operation during an operation of the register and local printer an arm 180 (Fig. 6) is provided with a shoulder 181 for engaging under a shoulder 182 on the rear edge of the enlarged portion 140 of the bar 141. The arm 180 is loosely suspended from the cross rod 110 and at its lower end is pivotally connected to a link 183 pivotally attached by a pin 184 to an arm 185 fast on a shaft 186. This shaft 186 is rocked counter clockwise, as viewed in Fig. 6, upon depression of one of the ticket-sellers' keys 54 in a manner to be described later, the rocking of the shaft serving to move the arm 180 so that its shoulder 181 is brought under the shoulder 182 to lock the bar 141 and lever 134 against operation. Near the end of the operation of the register the shaft 186 is restored to normal position thereby moving the arm 180 clockwise out of locking, into normal position.

*Means for moving the destination device into printing position.*

Upon operation of the local printer the carrying frame 118 is rocked rearwardly to carry the inserted destination device into a position to control the differential mechanism for the totalizing devices and while the destination device is in this position an impression is taken from it upon the ticket to be issued. The frame 118 is given this rearward movement by the movement of the rod 127, during the operation of the local printer, in the rear portions of the slots 131 formed in the frames 121. During this rearward movement of the rod the latter remains under the destination device and in engagement with the flanges 122 on the frame 118 so that the destination device is retained in the member 123 of the frame 118 during the rocking movement of the frame. To move the rod 127 rearwardly a link 188 (Figs. 5 and 11) is loosely supported at its forward end by a cross rod 189 supported by arms 130 and at its rear end the link is pivotally connected by a pin 187 to an arm 190 pivoted loosely on the left hand frame 121. The forward end of a link 191 is also pivotally connected by the pin 187 to the arm 190 and the link 191 at its rear end is pivotally connected to a downward extending arm 192 of a lever 193 loosely mounted on a shaft 194, supported in bearings in the frames 51 and 52. An arm 195 (Fig. 5) of the lever 193 carries a roller 196 which is adapted to project into a cam groove 197 formed in a disk 198 fast on a shaft 199, also supported at its ends in the frames 51 and 52.

The cam groove 197 is open at 200 to permit movement of the roller 196 away from shaft 199 when the lever 193 is rocked counter clockwise through the links 188 and 191 by the forward movement of the rod 127 to release the destination device. The cam groove 197 is so designed that the lever 193 is rocked clockwise to rock the arms 130 counter clockwise through the links 188 and 191 and thereby move the rod 127 rearwardly in the slots 131 during the first one-half rotation of the disk 198 and shaft 199, the shaft and disk being given one complete operation at each operation of the local printer. When the rod 127 reaches the upwardly and rearwardly extending set-offs 201 (Fig. 11) of the slots 131 it is raised slightly to elevate the destination device for a purpose to be described later. While the destination device is in this position it controls the extent of movement of the differential actuators for the totalizers and prints on the ticket to be issued. The cam groove 197 is designed only to move the rod 127 and the frame 118 rearwardly as the frame 118 is not restored to normal position until after the shaft 199 and disk 198 complete their rotation, so that the destination device will be retained in controlling position to permit the differential mechanism for the totalizers to have sufficient time to operate as will be explained fully later.

For the purpose of restoring the rod 127 and its operating connections to normal position after the differential mechanism has been controlled by the destination device, a cam disk 203 (Fig. 5) fast on a shaft 204, is provided. The shaft 204 is given one complete rotation at each operation of the machine when the local printer is operated and the driving of the shaft 204 is so timed that its rotation does not begin until after the shaft 199 has been rotated 180°. The mechanism for driving these shafts at different times will be discussed in connection with the operating mechanism for the entire machine, it being sufficient to state here that the shaft 204 begins to rotate after the shaft 199 has been given one-half a rotation. A pitman 205, which at its upper end is bifurcated to straddle the shaft 204 and at its lower end is pivoted to an arm 206 of the lever 193, carries a roller 207 which is adapted to ride in a cam groove 208 formed in the disk 203. The roller 207 is normally free to move in an open portion 209 of the cam groove 208 so that the rod 127 can be moved forwardly by operation of a hand lever 134 to release the destination device from the machine. The lever 193 during this movement of the rod 127, is caused to rock idly counter clockwise and then in the reverse direction to normal position. At the end of the first one-half rotation of the shaft 199 the lever 193 has been rocked clockwise by the coöperation of the roller 196 in the cam groove 197, and the pitman 205 therefore has been raised so that its roller 207 is in position to ride in the cam groove 208. The configuration of the cam groove 208 is such that near the end of the rotation of the shaft 204 the roller 207 and therefore the pitman 205 are moved downward to rock the lever 193 counter clockwise to normal position and thereby move the rod 127 forwardly in the slots 131 to normal position. As the spring 157 (Fig. 10) retains the hook 160 of the arm 155 in engagement with the rod 127 it can be seen that forward movement of the rod 127 to normal position serves to rock the frame 118 to normal position.

*Operation of consecutive numbering device.*

During rearward movement of the frame 118 the consecutive numbering device 60 carried by the inserted destination device is operated by a pawl 211 to add one thereon. This pawl 211 is fast on a stub shaft 212 which is mounted in the left hand side plate 119 of the frame 118. The shaft 212 is rocked clockwise to carry the finger 213 of the pawl 211 through an opening 214 (Fig. 15) in the casing of the destination device and into engagement with a flange 215 of the arm 73 to rock the arm and the pawl 70 and thereby actuate the consecutive numbering device as before described. To rock the pawl 211 in this manner, an arm 216 (Figs. 5, 10, 11 and 11ᴬ) is fast on the shaft 212 and a pin 217 projecting to the right from the forward end of the link 188, engages the curved edge 218 of the arm 216 to rock the arm and therefore the shaft 212 and pawl 211 upon rearward movement of the link 188. A spring 219 which is connected to the projecting portion 220 of the arm 216 at one end and at the opposite end to a pin 221 on the frame 118 normally serves to hold the arm 216 in engagement with a pin 222 on the frame 118 and also serves to rock the arm 216 and pawl 211 back to normal position upon the return movement of the frame 218 to its normal position.

*Alinement of destination device carrying frame.*

It is desirable to aline the carrying frame 118 in normal position to insure the passage of the destination device from the chute 109 into the member 123 of the frame 118 and to aline it in its moved position so that the destination device will be in its exact position necessary for it to control the differential mechanism for the totalizers and to print on the ticket to be issued. The device for performing this function is best shown in Figs. 5 and 10, and comprises two arms 224 rigidly mounted on a shaft 225 which is suitably mounted at its ends in the frames 51 and 52 of the local printer. The arms 224 carry studs 226 at their outer ends for coöperating with slots 227 and 228 in the side plates 119 of the frame 118. The studs 226 are held normally in the slots 227 by a spring 229 (Fig. 5) which is under tension, one end being connected to a cross rod 230 and the other end to the rearwardly projecting arm 231 of a lever 232 which is fast on the shaft 225. The forwardly projecting arm 233 of the lever 232 is provided with a slot 234 into which projects a roller 235 carried by the forward end of an arm 236 of a lever 237 loosely mounted on the shaft 194. The rearwardly extending arm 238 of this lever 237 carries two rollers 239 and 240 for coöperating with the peripheries of the disks 203 and 198 respectively. The periphery of the disk 198 is so shaped as to rock the lever 237 counter clockwise and thereby rock the lever 232 shaft 225 and arms 224 in the same direction so that the studs 226 are carried out of the slots 227 before the rearward movement of the frame 118 is begun. After the frame has been moved in its rearward position the spring 229 serves to rock the shaft 225 and arms 224 to lower the studs 226 into engagement with the slots 228. The periphery of the disk 203 is such that it rocks the lever 237 to raise the studs 226 out of the slots 228 just before the frame 118 has started on its return movement to normal position, the spring 229 again serving to restore the studs 226 into normal engagement with slots 227 after the frame 118 has been so restored.

*Impression means—Local printer.*

The means for carrying the local ticket to be issued against the inserted destination device while it is in printing and controlling position, will now be described, more particular reference being had to Figs. 5, 6, 7, 9, and 10. A platen frame 242 comprises a plate 243 integral with arms 244 loosely mounted on the rods 120. As will be noted by reference to Figs. 9 and 10 the two arms 244 of the platen frame are shaped differently, the left hand one being enlarged at its lower end for a purpose to be hereinafter described. A platen 245 is carried on a block 246 (Figs. 6, 9 and 10) which is mounted to slide on the upper flanged end 247 of the plate 243. Mounted between the block 246 and the plate 243 is a block 248 adapted to be adjusted by a screw 249 so that the platen can be adjusted to make a perfect impression on the tickets from the destination devices.

A frame comprising an arm 250 loosely mounted on the right hand rod 120 and carrying a plate 252 integral with a plate 253, which at its left hand side is integral with another plate 252 is provided to keep the tickets from sliding off of the platen 245, and will be called herein the "ticket frame." The lower end of the plate 253 has a projection 254 (Figs. 6, 9 and 10) which projects through a slot 255 (Fig. 6) formed in a member 256 which is mounted on the base of the machine and so arranged and constructed that it forms an arc with the rods 120 as the center. A spring 257 is carried by a rod 258 supported by the member 256 near the upper end of the slot 255. The spring is bent at 259 to form a notch with which the projection 254 coöperates to retain the ticket frame in the position shown in Figs. 5, 6, and 10 and in this position the plate 243 of the platen frame rests on the plate 253.

The left hand arm 244 of the platen frame is connected by a pin 260 (Figs. 2, 5, 9, and 10) to the forward end of a link 261, which at its rear end (Figs. 5 and 12) is connected to the lower end of a lever 262, loosely mounted on the shaft 194. The lever 262 at its upper end carries a roller 263 (Fig. 12) which projects into a cam groove 264 formed in a cam disk 265 fast on the shaft 199. The cam groove 264 is so shaped that the lever is rocked to move the link 261 forwardly thereby to rock the platen frame and the ticket frame counter clockwise about the rods 120. For a purpose hereinafter described the formation of groove 264 is such as to permit movement of platen frame independent of the cam 265 to lower the platen frame, as shown by the dotted lines in Fig. 10, into engagement with a block 266 rigid on the base of the machine. In this position of the platen frame it rests upon the plate 253 of the ticket frame. While these frames are in these positions the platen 245 is clear of the flanges 268 of the plates 252 and the end of a ticket strip 267 is fed over the platen 245 and under flanges 268 on the plates 252 of the ticket frame and then the end of the strip, which is to be the ticket, is severed by a severing mechanism. The mechanism for feeding the ticket strip 267 over the platen and the mechanism for severing the ticket from the strip will be described later, it being desirable to describe the complete operation of the platen and ticket frames first. When the cam is then effective to carry the platen against the destination device the platen frame has an initial movement independent of the ticket frame thereby carrying the severed ticket against the flanges 268 of the plates 252. This is due to the permitted relative movement of the two frames and serves to hold the ticket in the frame.

Just as the platen frame reaches normal position upon return movement of the frame effected by the cam 265, independent means, now to be described, operates this frame to carry the ticket once or twice against the destination device to print the consecutive number, the class and the destination station on the ticket. Two arms 269 (Figs. 4, 5, 6, 13, and 14) are loosely mounted on the shaft 194 and are rigidly connected by a rod 270. The forward ends of the arms are enlarged and provided with cam slots 271 which are adapted to coöperate with rollers 272 (Figs. 6, 9, and 10) projecting laterally from lugs 273 integral with the bent portion 247 of the platen carrying frame. When the arms 269 are rocked downwardly by means to be described presently the cam slots 271 pass over the rollers 272 and move the platen frame upward to carry the ticket against the destination device to take a printing impression. Upward movement of the platen frame by the arms 269 carries the ticket frame upward and the projection 254 of the plate 253 of the ticket frame engages in the notch 259 in the spring 257 to prevent the ticket frame from moving downward with the platen frame when the latter is moved counter clockwise back to normal position by the arms 269.

When the platen frame moves slightly counter clockwise to normal position independent of the ticket frame after the first impression is taken on a round trip ticket or after a single impression is taken on a one way ticket the ticket is released from between the platen 245 and the flanges 268 of the ticket frame and falls one-half its length when it is stopped by the engagement of its lower edge with a lug 275 (Figs. 6 and 7) projecting from the under side of the right hand flange 122 of the carrying frame 118. The frame 118 it will be remembered is in normal position in Fig. 6. When the frame is rocked rearwardly as hereinabove described the lug 275 is moved to a position over the upper end of the chute 153 thereby preventing the ticket falling down through said chute immediately upon its release following the receding movement of the platen. Upon forward movement of the frame 118 to normal position the lug 275 is carried away from under the ticket and the latter falls through the ticket chute 153 out of the machine. If a round trip ticket is to be issued it is carried against the destination device both before and after it has moved into engagement with the lug 275, but if a one way ticket is to be issued it is carried against the destination device only before the ticket moves into engagement with this lug.

In order to insure movement of the ticket into engagement with the lug 275 a pawl 276 (Figs. 6, 10, 13, and 14) is rigidly mounted upon a sleeve 277 mounted upon the cross rod 225. Fast on the sleeve 277 is a member 278 provided with two fingers 279 and 280 (Figs. 13 and 14). A pawl 281 which is pivoted at 282 to the right hand arm 269 has an upwardly extending nose 283 normally held in engagement with a lug 284, projecting from the arm 269, by a compressed spring 285. The pawl 281 is provided with a nose 286 for coöperating with the finger 279 on the member 278. During downward movement of the arms 269 the pawl 281 upon contact with finger 279 is rocked rearwardly, and as the nose 286 on the pawl passes the finger 279 the spring 285 restores the pawl 281 to normal position relative to the arm 269. Then upon return movement of the arms 269 the flat edge of the nose 286 engages the flat edge of the finger 279 and rocks the sleeve 277 and pawl 276 clockwise so that the forward end of the pawl will engage the upper edge of the ticket and force it downward into engagement with the lug 275 on the frame 118. When the nose 286 passes out of engagement with the finger 278 during the upward movement of the arms 269, a spring 288 (Figs. 6 and 13) connected at one end to the pawl 276 and at the other end to the cross rod 230, rocks the pawl 276 back to normal position. Counter clockwise movement of the pawl 276 past normal position is prevented by the engagement of the finger 280 with a cross rod 287.

*Means for operating local printer impression means.*

A disk 289 having a cam groove 290 (Figs. 4, 13, and 14) is provided to operate the arms 269 but once so that the platen frame will carry the ticket but once against the destination device to print a one way ticket. A disk 291, having a cam groove 292 (Figs. 6, 13, and 14) is provided to operate the arms 269 and platen frame twice to carry the ticket twice against the destination device to print a round trip ticket. These cam disks rock the arms 269 through a lever 293 which is slidably mounted upon the shaft 194 and the cross rod 270. The arm 294 of the lever 293 carries a roller 295 (Figs. 6 and 14) adapted to ride in the cam groove 292 of the disk 291 when a round trip ticket is to be issued. The other arm 296 of the lever 293 carries a roller 297 which operates in the cam groove 290 of the disk 289 when a one way ticket is to be issued.

The lever 293 is shifted laterally upon the cross rod 270 and the shaft 194 to carry one roller or the other into engagement with its respective cam groove 290 or 292 by the operation of a hand lever 298 (Figs. 2, 5, 6, 13, and 14) before the operating mechanism for the machine is released. The hand lever is mounted loosely upon a cross rod 299 which is supported at its right hand end by the frame 52 and at its left hand end by a plate 300 (Figs. 2 and 29) supported by rods 301, 302, and 304 projecting from the frame 51. Rigidly connected to the lever 298 is a cam 305 (Figs. 6, 13, and 14) which has a spiral cam groove 306 formed in its curved bar 307. A sleeve 308 which is adapted to slide laterally on a cross rod 309 has a rearward extending arm 310 provided with a roller 311 projecting into the cam groove 306. The cam groove 306 is so designed that upon movement of the lever 298 in a clockwise direction (as shown in Fig. 13) from its upper to its lower position the cam groove shifts the sleeve 308 to the right while reverse movement of the lever from its lower to its upper position shifts the sleeve 308 to the left. The sleeve 308 is provided in addition to the arm 310 with arms 312 and 313 (best shown in Fig. 14). The arm 312 is so positioned on the sleeve 308 that when the sleeve is shifted to the right it engages the left side of the lever 293 and shifts it to the right to carry the roller 295 into the cam groove 292 of the cam disk 291. When the sleeve 308 is shifted to the left the arm 313 engages the right side of the lever 293 and shifts the lever 293 to the left to carry the roller 297 into engagement with the cam groove 290. From the above construction it can be seen that if the roller 295 is positioned in its cam groove 292 during the operation of the local printer the lever 293 and arms 269 are rocked twice, clockwise and then counter clockwise to normal position to carry the ticket twice against the inserted destination device to print on a round trip ticket (Fig. 20) and if the roller 297 is in its cam groove 290 the lever 293 and arms 269 are rocked but once to carry the ticket against the destination device to print on a one way ticket (Fig. 19).

The lever 298 is alined in one or the other of its two positions by the engagement of a roller 315 (Fig. 6) in one of two V-shaped notches 316 formed in the forward curved edge of an enlarged portion 314 of the lever 298. The roller 315 is carried by the upper end of an arm 317 loosely mounted on the cross rod 225. A spring 318 secured at one end to the arm 317 and at its opposite end to the cross rod 230, tends to rock the arm 317 counter clockwise so that the roller 315 will move into either one of the notches 316 which is moved adjacent to it and thereby aline the lever 298 in its proper position.
The lever 298 is also locked against movement during the operation of the machine. To this end the rear curved edge of the enlarged portion 314 of the lever 298 is provided with two notches 319, into one or the other of which a roller 320 passes upon the operation of one of the ticket sellers' keys 54 to release the machine. The roller 320 is carried intermediate the ends of a link 321 which is provided at its upper and lower ends with slots 322 and 323 respectively, to straddle the cross rod 299 and shaft 186, to guide the link in its reciprocatory movement. The upper end of the link 321 is provided also with a slot 324. A roller 325 projecting from an arm 326 passes through the slot 324. The arm 326 is fast on the shaft 186, which as stated before, is rocked counter clockwise upon depression of one of the ticket sellers' keys 54 and at the end of the operation is restored to normal position. It can be seen from this construction that movement of the shaft 186 upon depression of one of the keys 54 moves the link 321 downward to carry the roller 320 into one of the notches 319, to lock the lever 298 against movement and that upon return movement of the shaft 186 to normal position at the end of the operation of the register, the roller 320 is withdrawn from the slot 319 to permit movement of the lever. It will readily be seen that the construction just described also serves to prevent a rocking of the shaft 186 and consequently an operation of a key 54 when the lever 298 is not in either of its proper positions of adjustment. When the lever 298 is out of a position of adjustment the curved edge of the enlarged portion 314 of the lever 298 will be in the path of movement of roller 320 and consequently movement of link 321 is blocked.

*Inking ribbon—Local printer.*

An inking ribbon 328 (Fig. 5) through which the destination devices print upon the tickets is mounted on the member 123 of the carrying frame 118. The ribbon is only shown in Fig. 5, it being removed in the other figures for the sake of convenience. Two ribbon spools 329 only one of which can be seen in the drawings, are supported by a plate 330 fastened to the member 123. The ribbon passes from one spool under a rod 331 (Fig. 7) through an opening 332, under the destination device, through an opening 332 and under a rod 331 on the other side of the member 123, onto the other spool. The means for feeding the ribbon is not shown in the drawings as the showing of such means is not an essential part of or necessary to the understanding of the invention and any one of the well known forms of feeding devices may be employed.

*Printing means retained in local printer.*

The ticket strip 267, (Figs. 5 and 6) from which the local tickets are issued, is fed from a supply roll (not shown) under the machine through a guide 35 between a feeding and printing roll 333 and a coöperating impression roll 334, under a guide 335, through a guide 336, between an electro cylinder 337, and its coöperating impression roll 338 and through an opening 339 in a stationary knife 3400 over the platen 245 of the platen frame which has been lowered to the position shown in dotted lines in Fig. 10, before the ticket strip is fed forward. The feeding roll 333, which is of an ordinary construction and supported by trunnions 340 may be provided with any desirable form of printing electro and a consecutive numbering device 341 of any well known construction and shown conventionally in the drawings. This consecutive numbering device 341 prints the consecutive number on all of the tickets issued by the local printer upon the back of the tickets as shown in Fig. 21.

An inking roller 3411 carried by trunnions 3422 projecting into the slots 342 (Fig. 5) formed in the side plates 343 of the paper guide 351 is provided to ink the consecutive numbering device 341. Arms 344 loose on a shaft 345 are provided properly to adjust the inking roller. It is obvious from Fig. 5 that by reason of the slot and set screw connection of 3441 between arms 343 and 344 that a relative adjustment between the two arms is permitted. The lower end of arm 344 rests against the trunnion 3422 and thus by the relative adjustment the tension of a spring 3442, between arms 343 and an additional ink roll carrier to be hereinafter described, is varied.

Dating wheels 346 (Figs. 2^A and 6) for printing the date on the front of the bottom portion of the one way tickets (Fig. 19) and on the return portions of the round trip tickets (Fig. 20) are mounted in a cylinder 347 fast on the left hand end of a shaft 379 (Fig. 2^A). The left hand end of the electro cylinder 337 as shown in Fig. 2^A is splined on the shaft 379 which is in horizontal alinement with the shaft 348. The shaft 379 is supported at its right hand end in the frame 52, and at its left hand end in the electro cylinder 337 which passes through the frame 51 (Fig. 2). The date wheels 346 are adjusted by turn buttons 375 (Figs. 1 and 5) positioned under the validating printer. By this construction the electro cylinder 337 rotates with the shaft 379 and is shiftable longitudinally of the shaft without shifting the date wheels 346 and cylinder 347.

The electro cylinder 337 is provided with two printing surfaces and is slidable on the cylinder 347 (Fig. 2^A) to move one printing surface into position to print the name of the issuing railroad and the name of the issuing station upon the one way ticket (Fig. 19) or to move the other printing surface into position to print the name of the railroad and the name of the issuing station on both portions of the round trip ticket, (Fig. 20). As the date wheels 346 are not shifted they print the date once on both round trip and one way tickets. For the purpose of shifting the electro cylinder 337 to bring the desired printing surface into position to print a one way or round trip ticket the sleeve 308, above described, carries a downwardly extending arm 352 (Figs. 5, 6, 13, and 14) and a curved arm 353 passing over the electro roller. These arms 352 and 353 carry rollers 354 which pass into an annular groove 355 (Figs. 13 and 14) formed near the right hand end of the electro cylinder 337 to permit rotation of the latter. By this construction, when the hand lever 298 is adjusted from one of its positions to the other to prepare the arms 269 for carrying the ticket once or twice against the inserted destination device the electro cylinder 337 is shifted so that upon rotation of the electro cylinder the latter together with the inserted destination device print a one way or round trip ticket, dependent upon the final adjustment of the lever 298. An inking roll 356 (Figs. 5 and 6) which is carried by arms 357 loose on a shaft 358 upon which the impression roll 338 is mounted, is employed to ink the date wheels 346. The guide 336 is supported by the arms 357. The inking roller 356 is adjusted in the same manner as the roll 3411 by an adjustable plate 359 (Fig. 7) and is held in position by the spring 3442 hereinbefore mentioned.

Local ticket severing mechanism.

After the ticket strip has been fed over the platen 245 it is severed by the coöperation of a movable knife 360 with the stationary knife 3400 (Figs. 5, 6, and 8). This movable knife is pressed by spring plungers 361, mounted in a stationary block 362 on one of the frames 121, against the stationary knife 3400. Two arms fast on a shaft 364 have slots 365 in their forward ends which straddle a rod 366 on the movable knife. An arm 376 also fast on the shaft 364 carries a roller 367 which projects into a cam groove 368 (Fig. 8) formed in a disk 369 rigidly mounted on the shaft 340 which is given one rotation at each operation of the local printer. This cam groove 368 is so formed that the movable knife 360 is lowered to permit the feeding of the ticket strip and then at the end of this feeding movement of the strip the knife is raised to sever the ticket from the strip. A slide 370 having a flanged portion 371 is mounted to slide vertically on the stationary knife 3400 and at its lower end is provided with a slot through which projects a pin 372 projecting from the movable knife 360. A spring 373 is compressed between the upper end of said slot and the pin 372 so that when the movable knife 360 is raised to normal position to sever the ticket from the ticket strip the flanged portion 371 yieldingly forces the strip against a flanged piece 374 on the stationary knife to grip the strip during the severing of the ticket therefrom. When the movable knife is lowered to permit the feeding of the ticket through the opening in the stationary knife the pin 372 engages the lower end of the slot in the slide 370 and carries the same downwardly thereby disengaging the flange 371 from the ticket strip.

Operating gearing for the local ticket feeding means.

In order to feed the end of the ticket strip 267 into position on the platen 245 as quickly as possible after the platen frame has been lowered, so that sufficient time may be allowed from the carrying of the ticket against the inserted destination device, the gearing for driving the feeding roll 333 and the impression roll 334 as well as the cylinders 337 and 347 and the impression roller 338 is constructed to accelerate the rotation of these members during the feeding of the strip. This gearing, which is shown in Fig. 8, will be described now but the main operating mechanism for driving this gearing as well as for operating the register and validating printer will be described after the register and the validating printer have been described.

A gear 377 (Figs. 4, 8, and 37) loosely mounted on a sleeve 378 rotates about the shaft 204, and is given one complete rotation at each operation of the local printer by the main operating mechanism. This gear is mounted on the sleeve 378 between the frames 52 and 53. The frame 52 is not shown in Fig. 8 so that the position of the various gears can be more readily understood. The gear 377 meshes with a gear 380 fast on the shaft 199 which also carries fast thereto an elliptical gear 382. Fast on a sleeve 381 mounted on the shaft 194 and passing through the frame 52 is an elliptical gear 383 which is like the gear 382 and meshes therewith. Fast on the sleeve 381 to the right of the frame 52 is a gear 384 which meshes with gears 385 and 386 rigidly mounted on the shafts 358 and 340 respectively. Fast on the shaft 358 is another gear 387 which meshes with a gear 388 rigidly mounted on the shaft 379 (Fig. 6). A gear 389, which is rigidly mounted on the shaft 340, meshes with a gear 390 fast on the shaft 345 which carries the impression roll 334. The elliptical gears 382 and 383 are so proportioned that the speed of rotation of the feed roll 333, impression rolls 334 and 338 and the cylinders 337 and 347 is increased while feeding and printing the ticket strip so that sufficient time will remain for performance of the other functions of the local printer.

Differential mechanism of the register.

The register, shown in the accompanying drawings, is as hereinbefore stated of the general type of machine fully shown and described in the patent to William A. Chryst, No. 1,230,864, dated June 26, 1917, based on an application filed June 7, 1913. Only such parts of the register as are necessary to the understanding of the present invention are described herein and if a more detailed description is desired reference may be had to the above mentioned patent.

The differential mechanism for actuating the totalizers is shown in Figs. 22 and 22^A and the means for driving the differential mechanism is also shown in Fig. 22^A. Rigid on a shaft 348 (Fig. 22^A) are a plurality of pairs of cams 392 and 393, a pair of cams being provided for each of the six banks of keys comprising the key board. The shaft 348 is supported in the frames 50 and 53 and is in axial alinement with the shaft 379. Pivoted on a stud 3394 mounted in a separate frame (not shown) for the differential mechanism of each bank of keys, is a three armed lever 395. The lever for each of the amount banks is like that shown in Fig. 28 for the bank of validating keys except that a roller 396 on the lever shown in Fig. 28 is not on the levers for the amount banks. The arms 397 and 398 of the levers 395 carry oppositely extending rollers 399 and 400 respectively which ride on the peripheries of the cams 393 and 392 respectively provided for that bank. The arrangement of each pair of cams is such that upon the rotation of the shaft 348 at each operation of the machine the corresponding lever 395 will be rocked first clockwise as viewed in Figs. 22^A and 28 and then counter clockwise over an arc of about 90°.

Loosely mounted on a stub shaft 394 supported by the separate frame for each bank is a driving segment 401 (Fig. 22^A). This segment is omitted in Fig. 22 but is shown in Figs. 22^A and 28 and it is to be understood that there is one of these segments 401 for each bank of keys. A link 402 connects the segment 401 to the upper end of the corresponding lever 395 so that the segment 401 will be rocked first clockwise and then rocked counter clockwise to normal position by the lever 395. Loosely mounted on the stub shaft 394 and beside the driving segment 401 for each bank of amount keys but not for the validating or ticket sellers' banks of keys, is an actuator 404 carrying a rack 405 and a toothed transfer element 406 (Fig. 22) for actuating the main totalizer 407 and a corresponding rack 408 and transfer element 409 for actuating the ticket sellers' totalizers 410. Each actuator 404 and a differentially movable member 442 (Fig. 28) for the bank of validating keys, and also a differentially movable member (not shown) for the bank of ticket sellers' keys carries on pivots 411 and 412 respectively a bell crank 413 and an arm 414. The bell crank and arm carry on pivots 415 a latch 416 which at all times is drawn rearwardly by a spring (not shown) so that the rear end of the latch is held against the driving segment 401 and normally above a shoulder 417 of the segment thereby establishing a driving connection between the segment 401 and the actuator 404 so that the two are moved together so long as the latch 416 is in engagement with shoulder 417. A plate 418 (Fig. 22) is loosely mounted on the stub shaft 394 beside each of the actuators and is provided with three sets of internal teeth 419 and 420 and 421. A forwardly extending arm 422 of the plate 418 has a notch into which a pin 424 on the forwardly extending arm of the bell crank 413 projects so that the actuator 404 and the plate 418 will move together. When movement of the plate 418 is arrested, as will be described presently, the actuator 404 is permitted to move slightly farther to rock the bell crank 413 counter clockwise and thereby withdraw the latch 416 from the shoulder 417 on the driving segment 401, so that the actuator 404 will be stopped in the desired position permitting the segment 401 to continue its invariable movement. When the latch 416 is drawn forwardly its nose 520 engages in the particular notch 521 in a plate 522 which is opposite the nose 520 at the time the latch is drawn forwardly. Upon counter clockwise movement of the segment 401 the latch is moved into engagement with the shoulder 417 of the segment and the actuator is returned to normal position with the segment by the engagement of the driving segment with a stud 423 on the actuator.

*Control of differential mechanism by the destination devices.*

The differential movement of the actuators 404 just described, is controlled by the inserted destination device upon operation of the local printer to print and issue a local ticket and is controlled by the amount keys 55 when a coupon ticket is to be validated, the amount keys being depressed only when the latter style of ticket is to be issued. The means for controlling the differential mechanism by the destination devices will be described first.

Connected at 412 to each actuator 404 (Fig. 22^A) is a lever 426 which is loosely mounted on the stub shaft 394 to rock with the actuator 404. The rear end of the lever 426 is pivotally secured to a link 427 which at its rear end (Fig. 22) is pivoted to the outer end of an arm 428 fastened on a corresponding sleeve 429 by a split hub 425. There is one of these sleeves 429 for each amount bank and one for the ticket seller's bank of keys. The sleeves 429 are mounted to rotate about a shaft 430 which is supported at one end by the frame 51 and at the other end by the frame 50. The sleeves 429 pass into the local printer, as shown in Figs. 2, 4, 5, and 6, and rigid on the left hand end of each sleeve is a split hub 439 carrying an arm 431 (Figs. 5 and 6). Each arm 431 carries a pin 432 over which a hook 433 on the rear end of a corresponding link 434 engages. The forward end of each link 434 is pivoted to a corresponding segment gear 436 which is rigidly mounted on one of a series of sleeves 437. There is one of these sleeves 437 for each totalizer pinion in a totalizer and one for the ticket seller's bank and the sleeves are mounted on the cross rod 299. The sleeves 437 at their left hand ends (Figs. 2 and 29) carry type wheels 438 for printing the fare on a coupon ticket (Figs. 32 and 33) and on a detail strip 440 (Fig. 29) as will be described later. Through the above described connections between the actuator 404 and the segment gears 436 it can be seen that the differential movement of the actuators is imparted to the segment gears 436 and type wheels 438 and that these gears and wheels are moved back to normal position with the actuators.

The type wheel 441 for printing the initial of the ticket seller is differentially positioned by the differential mechanism for the ticket seller's bank in a manner similar to that in which the amount type wheels 438 are positioned. The differential mechanism for the ticket seller's bank is like that shown in Fig. 28 for the validating bank of keys. The differentially movable member 442, which is shown broken away in Fig. 28, corresponds to the actuator 404 for an amount bank and is similar to the actuator for an amount bank but carries no actuating racks or transfer mechanism. The differentially movable members 442 for the validating bank and the ticket seller's bank of keys are connected to their driving segments 401 by latch mechanisms which are identical to that for the amount banks as already stated. The differential mechanism for the validating keys is shown in Fig. 28. Levers 605 are connected at 412 to the members 442 and the lever 605 for the ticket seller's bank is connected to the innermost sleeve 429 in the same manner as the levers 426 for the amount banks (Fig. 22) are connected to their corresponding sleeves 429. The levers 605 for the validating and ticket sellers' banks are curved intermediate their ends to fit about the under side of the stub shafts 394. The rollers 396 on the levers 395 when the latter are rocked clockwise engage the links 605 to move them into contact with the stub shafts 394 while the members 442 are in their differentially set positions. In this manner the sleeve 429, hub 439, link 434, member 436 and sleeve 437 through which the ticket seller's type wheel 441 is positioned is adjusted directly from one position to another without being restored to zero position at each operation of the machine. The sleeve 437 carrying the ticket seller's type carrier has a member 436 which may be without teeth as the destination devices do not control its adjustment. Each segment gear 436 for the amount banks of keys meshes with rack teeth 443 formed on a corresponding reciprocating bar 444 (Figs. 5 and 6) which is provided with slots 445 near its upper and lower ends through which cross rods 446 pass to guide the bar 444 in its reciprocating movements. Immediately to the left of each of the bars 444 is a bar 447 which also has slots 445 through which the cross rods 446 pass. A lug 4488 projecting laterally to the left from the lower end of each bar 444 is held in engagement with the lower end of the adjacent bar 447 by springs 4499 which connect the two bars as shown in the drawings. The upper end of each bar 447 has a rearwardly extending arm 448 to which is pivoted a lever 449 which at the end of its forwardly extending arm 450 carries a pin 451 projecting into a notch 452 formed in the upper end of the adjacent bar 444. The lever 449 at its lower end is provided with a pin 453 which projects into a slot 454 in the rear end of a link 455 having a hook at its rear end engaging a pin 456. The pin 456 is carried by an arm 457 fastened by a hub 458 to one of the nested sleeves 459. The sleeves 459, there being one sleeve for each pair of bars 444 and 447 and therefore one for each actuator 404, are carried by a cross rod 460 which extends through the local printer and register. Each sleeve 459 at its right hand end and in the rear of the corresponding actuator 404 of the register (Fig. 22) is provided with a hub 461 having a projecting finger 462. Loose on a stud 463, which is supported by the frame (not shown) for carrying the actuator 404, is a lever 464 the forwardly extending arm of which is pivotally connected to a link 466. At its lower end the link is pivoted to the rearwardly extending arm of a lever 468 loosely mounted on a stud 469. The lever 468 at the free end of its downwardly extending arm is provided with a flat sided pin 470 for coöperating with the series of internal teeth 421 on the plate 418.

Having described the several parts of the differential mechanism for operating the totalizer under the control of the control devices, it will be well now to explain the operation of these parts as a whole in view of the above description. At the beginning of the operation of the local printer the destination device carrying frame 118 (Figs. 5, 6, 7, and 9) is rocked rearwardly and then as the rod 127 moves in the set off portions 201 of the slots 131 the destination device is slightly raised. The holes 99 of the destination device, when in this position, are in direct operative alinement with fingers 475 on the lower ends of the rack bars 447 (Figs.

5 and 6). The destination device is raised slightly while the frame 118 is at rest in its rearward position so that the fingers 475 project through the opening in the rear end of the casing of the destination device, the ends of the fingers 475 being then in the same plane as the rear end of the block 98. After the destination device has been so moved and while it is retained in this position the pairs of cams 392 and 393 are operated to rock the actuators 404 clockwise (Fig. 22A) through the three armed levers 395, driving segments 401 and the latches 416. As the levers 426 are moved with their actuators they move their links 427 downward and through the arms 428, sleeves 429 (Fig. 22), arms 431 (Figs. 5 and 6) links 434 and segment gears 436 impart their differential movement to the rack bars 444. Because of the spring connections 4499 between the pairs of bars 444 and 447, the bars in each pair move together, the lugs 4488 on the bars 444 being provided to prevent the springs 4499 from pulling the bars 447 downward relatively to the bars 444. The downward movement of the pairs of bars 444 and 447 lowers the levers 449 and rocks the link 455 idly about their pivots 456, slots 454 being provided to permit this movement of the levers 449 without moving these links rearwardly in the direction of their lengths. The fingers 475 on the bars 447 during the downward movement of bars 447 and 444 pass into the holes 99 in the positioned destination device. As soon as the end of one of the fingers 475 engages the stop 100 in its corresponding hole, movement of the bar 447 is arrested. As no stop is provided for the corresponding bar 444 at this time it is given a slight movement downwardly relative to the bar 447 by the actuators 404 through the intermediate connections. This slight movement of the bar 444 relative to the bar 447 is sufficient to rock the lever 449 clockwise, as viewed in Figs. 5 and 6, and thereby move the link 455 rearward in the direction of its length for the purpose of rocking the hub 458 and the corresponding sleeve 459 clockwise, as viewed in Figs. 5 and 6 and counter clockwise as viewed in Fig. 22. In this manner the tooth 462 on the collar 461 rocks the lever 464 counter clockwise. This movement of the lever 464 rocks the lever 468 clockwise through the link 466 so that the pin 470 is carried into engagement with the particular tooth 421 of the plate 418 opposite the pin at that time. In this way movement of the plate 418 is arrested by the pin 470, the actuator 404 being permitted to move slightly farther because of the slot and pin connection 424 between the plate and the latch of the actuator. This continued movement of the actuator 404 causes the bell crank 413 to rock counter clockwise to draw forwardly the latch 416 and thereby disconnects the actuator from the driving segment 401, as already described. The pins 470 therefore, serve to stop the actuators 404 at positions determined by the inserted destination device and at the same time disengage the latches from their driving segments 401 to permit the latter to continue their movement independent of the actuators.

Upon return movement of the actuators 404 to normal position, effected by the return of the driving segment 401 to normal position, the above described parts are also returned to normal position, the fingers 475 thereby being withdrawn from the holes 99 in the control device before the return movement of the destination device and carrying frame to normal position is begun.

In order to insure downward movement of the destination device in the member 123 (Figs. 5 and 10) of the frame 118 when the rod 127 is moved downwardly in the portions 201 of the slot 131 in the frames 121 so that the casing of the destination device will not engage the ends of the fingers 475 when the device is rocked forwardly with the frame 118, an arm 473 is provided (Figs. 6, 9, 10, 13, and 14). This arm 473 is loosely mounted on the cross rod 225, and a tensioned spring 474 (Figs. 6 and 10) tends to rock the arm clockwise, a finger 4744 on the arm being normally in engagement with the cross rod 287 to prevent the spring moving the arm clockwise past normal position. When the destination device is raised in the member 123 while the frame 118 is in its rear position, it engages the arm 473 and rocks it counter clockwise. Then when the rod 127 is lowered the spring 474 rocks the arm 473 and so insures downward movement of the destination device with the rod.

Key-board of differential mechanism.

As stated before the keyboard comprises four banks of amount keys 55 (Fig. 1) a bank of ticket sellers' keys 54 and a bank of the keys 56 which have been called herein, validating keys because they control the number of cycles of operation of certain parts of the validating printer to be described later. The construction of the key banks is similar to that shown in the above mentioned Chryst patent and as reference may be had thereto for a detailed description of the key banks it will only be necessary to describe briefly their general construction and specifically point out the differences existing between the constructions of the key banks of the two inventions.

The elements of each bank of keys 54, 55, and 56 are mounted in a corresponding frame 476 (Fig. 22) supported by cross rods 477. Adjacent each bank of keys is a detent 478 (Figs. 22, 26, and 27) swung from an arm 479 and a pawl 480 pivotally attached at 481 and 482 respectively to the key frame 476. The detent 478 for the ticket seller's key is shown broken away in Fig. 27. The pawls 480 for the banks of validating and tickets sellers' keys are longer than those for the amount keys for reasons to be described later. When an amount or validating key is depressed, the inclined edge of a shoulder 483 on the key engages a pin 484 adjacent the key and on the detent 478 and forces the latter downward. Springs 485 (Fig. 22) serve to retain the detents 478 for the amount keys in normal elevated position.

A spring 491 (Fig. 26) is provided, normally to retain a zero stop pawl 487 for the bank of validating keys in operative position as shown in Fig. 26, so that when the local printer is operated the nose on the upper end of the pawl will engage the forwardly extending arm of the bell crank lever 413 (Fig. 28) supporting the latch 416 of the differential mechanism for the validating bank and withdraw the latch from the corresponding driving segment 401 and thereby disconnect the differentially movable plate 442 from the driving segment. The spring 491, which retains the pawl 487 for the validating keys in normal position, also serves to retain the detent 478 for these keys in normal position through the engagement of a stud 489 on the pawl 487 with the pawl 480. When an amount key or validating key is depressed downward movement of its corresponding detent 478 occurs until the shoulder 483 (Fig. 26) on the key has past the pin 484 on the detent, when the detent rises under the action of its spring 485, if an amount key is depressed, and under the action of the spring 491 if a validating key is depressed. The rise of the detents moved is not to normal position, for the depression just above the shoulders 483 is not sufficiently deep to permit of the complete return of the detents.

As shown in Fig. 27, a zero stop pawl 487 is also provided for the bank of ticket sellers' keys and a spring 491 retains the pawl 487 and the detent 478 in normal positions in the same manner as the zero stop pawl and detent for the bank of validating keys are retained in normal position. The detent 478 for this bank of keys serves to rock the zero stop pawl 487 out of its normal operative position by the rocking of the pawl 480 when the detent 478 is lowered by depression of the key but this detent 478 is not provided to retain a ticket seller's key in depressed position, and therefore the ticket sellers' keys are not provided with shoulders 483 as are the amount and validating keys.

For the purpose of compelling a key in the validating bank to be operated before amount keys can be operated, the arms 479 (Fig. 22) for the amount banks are provided with curved projections 495 which engage over a rod 496. This rod 496 is supported at its right hand end (Figs. 27^B and 27^A) by an arm 497 and at its left hand end by an arm 545. These arms 497 and 545 are fast on a shaft 498 and a spring 4971 serves to hold the arms 497 and rod 496 in the normal position shown in Fig. 22. The arm 479 (Figs. 26 and 27^D) of the validating bank is provided with a projection 499 normally engaging a pin 500 on the arm 497. When a validating key is depressed its plate 478 is swung downward thereby rocking the arms 497 and 545 and the rod 496 downwardly through the engagement of the projection 499 on the arm 479 with the pin 500, so that the rod 496 is carried away from the projections 495 on the plates 478 for the banks of amount keys to permit operation of the latter.

The noses of zero stop pawls 486 for the amount banks are normally retained out of the path of movement of the forward extending arms of the levers 413 of the corresponding latch mechanisms, so that when the local printer is operated, the extent of movement of the actuators 404 will be controlled by the inserted destination device and not be stopped at zero positions by the zero stop pawls 486. These stop pawls are normally held out of operative position by the engagement of their forwardly extending arms with a cross rod 504 (Figs. 22 and 27^C) carried by arms 505 loosely mounted on a sleeve 973 surrounding a shaft 502. Tensioned springs 507 connected at one end to the pawls 486 and at their other ends to the frames 476 tend to rock the pawls 486 clockwise and thereby raise the cross rod 504. This movement is prevented, however, by the engagement of the rod 504 to the right of the right hand arm 505 with the lower end of a plate 5041 (Fig. 26) mounted on the key frame for the validating keys, the plate being mounted pivotally at its upper and lower ends respectively by arms 5042 (Figs. 26 and 27^A) and 5043 (Fig. 26) loose on the pins 481 and 482 respectively. The arm 5042 carries a pin 5044 projecting into a cam slot 5045 formed in an arm 5046. The arm 5046 (Figs. 26, 27^A, 27^B, and 37) is loose on the shaft 186 and is rigidly connected to an arm 5047 also loose on the shaft 186. The arm 5047 is provided with a slot 5048 (Figs. 26 and 27^A) into which a pin 5049 on an arm 5050 loose on the pin 481 projects. The detent 478 for the validating keys is pivoted to the arm 5050 by the same pivot pin by which the detent is pivoted to the arm 479. A yoke 5051 (Figs. 26 and 27^B) loosely mounted on the shaft 186, is rigidly connected to the arms 5046 and 5047 and a spring 852 which is coiled about the shaft 186 and has one end bent over the yoke 5051 and the opposite end bent around a rod 846 (Fig. 27ᴮ) mounted in the frame 50 tends to rock the yoke and arms 5046 and 5047 clockwise as viewed in Fig. 26, but this movement is prevented by the engagement of the pin 5049 with the lower end of the slot 5048 in the arm 5047. When a validating key is depressed the detent 478 is lowered, as above described, whereupon the arm 5050 is swung clockwise about its pivot 481. During this movement of the arm 5050 its pin 5049 engages the side 5052 of the slot 5048 in the arm 5047 thereby rocking the arms 5046 and 5047 and the yoke 5051 counter clockwise against the influence of the spring 852. The cam slot 5045 in the arm 5046 is so formed that when the latter is rocked counter clockwise as just described, the plate 5041 is raised, whereupon the rod 504 is raised by the stop pawls 486 for the banks of amount keys into operative position, the movement of the pawls being effected by their springs 507. From this construction it can be seen that when a validating key is depressed the zero stop pawls for the amount keys are rocked into operative position, the movement of the pawls being limited by the engagement of their pins 489 with the downwardly extending fingers of the pawls 480. When an amount key is depressed, however, its plate 478 is lowered swinging the pawl 480 clockwise, as viewed in Fig. 22, so that the lower edge of the pawl 480 through its engagement with the pin 489 on the zero stop pawl rocks the latter out of operative position.

Upon operation of a driving segment 401 the corresponding actuator 404, being connected thereto by the latch 416, moves clockwise with the segment to the point where the forwardly extending arm of the bell crank lever 413 engages the depressing key, such engagement rocking the lever and thus disengaging the latch 416 from the driving segment and engaging the forward end 520 of the latch with the particular notch 521, in a plate 522, which is opposite the latch at such time. In this manner when a validating ticket is to be issued the amount keys control the actuators 404 and through the levers 426, links 427, arms 428, sleeves 429 (Fig. 22) hubs 439, links 434, and segment gears 436 position the sleeves 437 (Figs. 5 and 6) and thereby position the type carriers 438 (Figs. 2 and 29).

Extensions 513 on locking plates 510 (Fig. 22) are provided to engage over pins 514 on the amount and validating keys depressed to lock them in depressed positions during the operation of the machine and pass beneath the pins 514 on the undepressed validating and amount keys thereby preventing their depression during the operation of the machine. One of these locking plates 510 is provided for each bank of amount keys and the bank of validating keys but as these plates are identical the plate for the bank of validating keys is not shown in the drawings. These plates are supported at their upper and lower ends respectively by arms 511 and 5111 which are loosely mounted on the pins 481 and 482 respectively. In order to give the locking plates 510 the required upward movement for the purpose of locking the keys in depressed or undepressed position during the operation of the machine, the supporting arms 511 for the plates 510 for the banks of amount keys are provided with extensions 515 engaging over a rod 516 (Figs. 22 and 27ᴮ) carried by arms 517 fast on the shaft 186 and the extension 515 for the arm 511 for the locking plate of the validating keys engages over a pin 1000 (Fig. 27ᴮ) carried by an arm 1001 fast on the shaft 186. This shaft 186 is rocked clockwise, as viewed in Fig. 22, in the manner to be described, upon depression of the ticket sellers' keys 54 and thereby causes the rod 516 and the pin 1000 to coöperate with the extensions 515 on the arms 511 and lift all the locking plates 510 simultaneously.

*Ticket sellers' bank of keys.*

Coöperating with the pins 514 on the ticket sellers' keys 54 (Fig. 27) is a plate 523 provided with cam slots 524 which the pins 514 enter on depression of the keys to move the plate 523 downwardly against the action of a spring 5231 swinging an arm 525 supporting the lower end of the plate about its pivot 482. The plate 523, at its upper end, is provided with a slot 526, through which the pin 481 projects to guide the upper end of the plate in its movements. The plate 523 carries a pin 5060, which projects into a recess formed in the upwardly extending arm of a bell crank lever 5061, loosely mounted on the shaft 498 (Figs. 26 and 27ᴮ.) The end of the rearwardly extending arm of the lever 5061 engages a stud 5062 carried by a downwardly extending arm 5063 loosely mounted on the shaft 186. A forwardly extending finger 5064 is integral with the arm 5063 and engages over a rod 5065 carried by arms 5066 fast on the shaft 186. It can be seen from this construction that as the stud 5062 engages the rearward end of the rearwardly extending arm of the lever 5061 the arm 5063 cannot normally be rocked forwardly and therefore the shaft 186 can not be rocked clockwise because of the engagement of the finger 5064 over the rod 5065. When a ticket seller's key is depressed, however, the plate 523 is lowered as above described, thereby raising the rearwardly extending arm of the lever 5061 from in front of the stud 5062 whereupon the shaft 186 is rocked clockwise by means now to be described.

Release of keys.

The means for rocking the shaft 186 upon depression of a ticket seller's key includes a lever 529 (Figs. 34 to 37, inclusive, and Fig. 39) fast on the shaft 186 near the right hand end of the latter. The forwardly extending arm of the lever 529 carries a pin 531 projecting through a slot 532 formed in a link 533. A spring 534 (Figs. 34 and 35) coiled about the pin 535, projecting upward in the slot is normally compressed between the lower end of the slot and the pin 531 and has a normal tendency to rock the lever 529 and shaft 186 which operation occurs upon depression of a ticket seller's key, to remove the rear end of the horizontal arm of the lever 5061 from in front of the stud 5062. It will readily be seen that when the lever 5061 is rocked counter clockwise the pin 5062 moves under the horizontal arm of the lever thereby preventing return movement of the plate 523 when the operator removes his finger from the depressed key, the slot 524 serving to retain the key in depressed position until the arm 5063 is rocked back to normal position as will be described presently.

The link 533 is provided also with a bayonet shaped slot 536 in the set off portion 537 (Fig. 35) of which normally engages a pin 538 carried by the rear end of an arm 589 loose on a stud 540. The arm 539 carries a roller 541 projecting into a cam groove 542 formed in a side of a gear 543 which is loosely mounted on a stud 544 and is given one-half of a rotation at each adding operation of the register. The cam groove 542 is so designed that near the end of each adding operation of the register the arm 539 is rocked clockwise (Fig. 35) and as the pin 538 is in the portion 537 of the slot 536 the link 533 is drawn downwardly to rock the lever 529 and shaft 186 counter clockwise past normal position and then in the clockwise direction to normal position. When the rod 516 and stud 1000 are swung counter clockwise upon movement of the shaft 186 they will move the locking plates 510 down to normal unlocking position. The amount keys (Fig. 22) are released by the rod 516 engaging the projections 495 on the arms 479 for the detents 478 and thereby moving the detents downward during the excess of movement of the rod 516 past normal position. The validating keys are released in a like manner by the excess of movement of the stud 1000 (Fig. 26) past normal position.

The ticket sellers' keys (Fig. 27) are released when the plate 523 is moved upwardly to normal position by its spring 5231 near the end of the operation of the machine, at which time the stud 5062 is moved rearward in the following described manner to permit restoration of the plate 523 to normal position. A lever 5068 (Figs. 27 and 27ᶜ) is loosely mounted on the shaft 498, and the upper edge of the rearwardly extending arm of the lever 5068 is engaged by the portion of the stud 5062 projecting toward the left from the arm 5063. The rear edge of the upwardly extending arm of this lever 5068 is engaged by the rod 5065 on the arms 5066 rigidly mounted on the shaft 186 as above described. It can be seen that when the shaft 186 and arm 5063 are rocked clockwise (Fig. 27) upon depression of a ticket seller's key the lever 5068 is also rocked clockwise through its engagement with the stud 5062. The upwardly extending arm of the lever 5068 is so curved that during the initial counter clockwise movement of the arm 5064 with the shaft 186 near the end of the operation of the machine the lever 5068 is rocked counter clockwise, as viewed in Fig. 27, the rearwardly extending arm of the lever during this time rocking the arm 5063 rearwardly slightly past normal position so that the stud 5062 is carried away from beneath the horizontal arm of the lever 5061. Continued downward movement of the arm 5064 with the shaft 186 after the arm 5063 has been moved slightly past normal rocks the lever 5068 no further. As the stud 5062 is carried away from beneath the horizontal arm of the lever 5061 the spring 5231 raises the plate 523 whereby the lever 5061 is rocked back to normal position so that the end of its horizontal arm is again restored to its normal position in front of the stud 5062. This upward movement of the plate 523 permits restoration to normal position of the depressed ticket seller's key by its spring.

In order to prevent the operator from retaining the depressed ticket seller's key in depressed position until the end of one complete operation of the machine and thereby prevent return of the plate 523 and lever 5061 to normal for the purpose of causing an immediate second operation of the machine an arm 5069 (Figs. 27 and 27ᶜ) is employed. This arm is loosely mounted on the shaft 498 and a spring, which is shown in Fig. 27 and is connected at one end to the arm 5069 and at its opposite end to the lever 5061 normally retains the outer upper edge of arm 5069 in engagement with the stud 5062. The arm 5069 is longer than the horizontal arm of the lever 5061 so that when this arm of the lever 5061 is raised out of the path of stud 5062 to permit clockwise movement of the shaft 186 as above described, the stud passes between these two arms. It can be seen from this construction that if a ticket seller's key is held in depressed position until the end of the operation, the plate 523 and lever 5061 are held in moved position, and when the stud 5062 is moved rearwardly slightly past normal position as above described, the spring for the arm 5069 will pull the latter upwardly into engagement with the horizontal arm of the lever 5061 so that the rear end of the arm 5069 is in front of the stud 5062. Therefore, the arm 5063 cannot be rocked forwardly again and in this way a second operation is prevented. Then when the operator removes his finger from the depressed ticket seller's key the spring 5231 for the plate 523 restores this plate and lever 5061 to normal position and the horizontal arm of the lever 5061 moves the arm 5069 downwardly from in front of the stud 5062 so that the stud 5062 can assume its normal position in engagement with the end of the horizontal arm of the lever 5061.

As the shaft 186 is rocked as just described at every operation of the machine regardless of the style of ticket to be issued, it is obvious that the rod 516 (Fig. 22) and pin 1000 will be effective to lower all the detents 478 for the banks of amount and validating keys when a local ticket is issued when no amount or validating keys are employed as well as when a validated ticket is issued. It will be remembered that the rod 496 is normally in position to lock the amount key detents 478 against movement until a validating key is depressed. As no validating key is employed when issuing a local ticket it is necessary to remove the rod 496 from locking position before the rod 516 is effective to lower all the detents 478 of the amount banks. In order to disable the locking effect of the rod 516 in an operation when no validating key is depressed the arm 545 (Figs. 22 and 27^D) is provided with a nose 5451. Upon downward movement of the rod 516 past normal position the rod 516 engages the nose 5451 to move the rod 496 downwardly so that the latter will be moved out of locking engagement with the projections 495 (Fig. 22) on the arms 479 of the amount banks to permit the amount key detents to be lowered. The rod 516 is then raised to normal position so that the rod 496 again engages under the projections 495 to lock the amount keys against operation until after a key in the validating bank has been depressed at another operation of the machine to validate a coupon ticket.

Totalizing mechanism.

The ticket sellers' totalizers 410 (Figs. 22, 23, 24, and 28) consist of a plurality of groups of pinions loosely mounted on a tube 548 fixed in frames 549 and 550. Suitable spacing collars are provided for holding the pinions in proper position on the tube 548. These frames are provided with rollers 551 coöperating with a rod 552 having arms 553 provided with rollers 554 extending into cam slots 555 in fixed plates 556 (Figs. 24, 25, and 28). The ends of the shaft 552 are movable in slots 557 formed in the plates 556. Connected at 558 to the right hand side arm 553 is a link 559 which at its upper end carries a pin 560. A plate 561 loosely mounted on the stud 394 which is in alinement with the studs 394 supporting the actuators 404 and members 442 is provided with a hook 563 in which normally rests the pin 560 on the link 559. A member 564, which has a central opening 565 through which the stud 394 passes, is pivoted at its rear end by a pin 566 to a lever 567 loosely mounted on a stud 568. The member 564 is provided with a notch 569 into which a roller 570 mounted on the plate 561 projects during an adding operation, in which the actuators 404 are controlled by either the inserted destination device or by the amount keys. The lever 567 carries two oppositely extending rollers 571 and 572 which coöperate with the peripheries of cams 573 and 574 respectively. The cams 573 and 574 are fast on the shaft 348 and are designed to rock the plate 561 clockwise through the lever 567 and member 564 after the driving segments 401 have reached their limit of clockwise movement and before they begin their return movement to normal position. In this manner the link 559 is drawn upwardly and because of the coöperation of the rollers 554 in the cam slots 555, the ticket seller's totalizer frame is raised to engage the pinions of the selected totalizer with the actuating racks 480 on the actuators 404 so that the selected totalizer will be actuated upon return movement of the actuators.

As shown in Fig. 23 there are five ticket sellers' totalizers, one for each of the keys 54. The pinions of like denomination are grouped as shown in Fig. 23 and as also shown in said figure the left hand one of each group is in the same vertical plane as the actuators 404. The rod 552 and rollers 551 are provided to permit of lateral adjustment of the totalizers to bring any desired set of totalizer pinions into alinement with the actuators, as will be described later.

The grand totalizer 407 (Fig. 22) is somewhat similarly mounted except that its frame has not a lateral movement. It consists of pinions mounted on a tube 576 which is supported in the frame (not shown but similar to the ticket seller's totalizer frame) fast on a rod 577 (Fig. 28) which projects through slots 578 formed in fixed plates 579, like the plates 556. The rod 577 carries arms 582 provided with rollers 580 playing in slots 581 in the plates 579. A link 583 at its rear end is connected to the right hand arm 582 and at its forward end carries a roller 5833 resting in a hook 584 projecting from the plate 561. By this construction when a ticket seller's totalizer is engaged with the racks 408 on the actuators 404 the grand totalizer is engaged at the same time with the racks 405. The control mechanism including the plate 561, member 564 and lever 567 for rocking the totalizers into engagement with the actuators is fully shown and described in the patent to Frederick L. Fuller, No. 1,242,170, dated October 9, 1917, based on an application filed December 21, 1914. Only so much of this mechanism for controlling the engagement of the actuators and totalizers is shown herein as is necessary to rock the totalizers during an adding operation, since the means controlling reading and resetting operations of a totalizer is not essential to the understanding of the present invention. This control mechanism is prepared for effecting the different accounting operations of the totalizers by the manually adjustable lever 57 (Fig. 1), in the manner described in the above mentioned Fuller patent.

An alining plate 586 (Figs. 23 and 24) carried by arms 587 fast on a shaft 588 supported by the totalizing frame, engages the totalizer pinions of the ticket seller's totalizer to prevent their rotation when out of engagement with their actuators. Cam levers 589 fast on the shaft 552 engage shoulders 590 on the arms 587 to rock the plate 586 out of engagement with the totalizer pinions when the shaft 552 is rocked to carry the selected totalizer into engagement with the actuators. The grand total is alined in a similar manner as described in the aforementioned Wm. A. Chryst patent.

*The total printing operation of totalizers.*

When it is desired to print a total or subtotal from any one of the totalizers the lever 57 is adjusted to its proper position and this adjustment, in the manner set forth in the Fuller patent effects an engagement of the selected totalizer and upon the continued operation of the machine the totalizer pinions will be rotated backward to "0" and thus control the adjustment of the actuators, to represent the amount formerly on the totalizer in the following manner.

The extent of movement of the actuators 404 in total and subtotal printing operations is determined by long teeth 592 (Figs. 22 and 24) on the totalizer pinions. The teeth 592 when the pinions arrive at zero position engage pawls 593 (Fig. 22) and rock the latter counter clockwise, the pawls having been previously rocked into the paths of movement of the teeth by the adjustment of the hand lever 57 to a total or subtotal printing position as set forth in the Fuller patent. Arms 594, which are similar to the arms 468 hereinbefore described carry pins 595 and are connected to the pawls 593 by toggle links 596 and arms 598. Movement of the pawls 593 by the long teeth 592 rock the arms 594 to carry the pins 595 into engagement with the internal teeth 419 on the plates 418 if a grand totalizer is being operated and into engagement with the internal teeth 420 of these plates if one of the ticket sellers' totalizers is being operated. Engagement of the pins 595 with these teeth arrest the movement of the plate 418 and effect disconnection of the latches from the actuators 404 in the same manner as the engagement of pins 470 with the teeth 421 effected this disconnection in the case of printing local tickets.

The mechanism just described and also the transfer mechanism to be described hereinafter is identical for both the grand and ticket sellers' totalizers. The transfer mechanism has merely been shown and described with reference to the grand totalizer for the sake of clearness in the drawings.

*Selecting means for ticket sellers' totalizers.*

The means for shifting the ticket sellers' totalizers along the shaft 552 as hereinbefore mentioned (Fig. 23) so that any desired totalizer may be brought into operative relation with the actuators is fully shown and described in the above mentioned patent of William A. Chryst. Briefly, this means comprises a roller 600 (Figs. 23 and 24) which is mounted on the frame 550 and projects into a groove 601 (Fig. 25) in a spiral cam 602 journaled on a rod 603 projecting from the frame 53 and in alinement with the rods 394. A rearwardly extending arm 604 of the cam 602 is connected to by the means of intermediate mechanism, not shown, and controlled by the innermost sleeve 429, which is rotated directly from one set position to another by the differential mechanism, for the ticket seller's key bank as already described. In this way the cam 602 is moved directly from one position to another to shift the ticket sellers' totalizers along the shaft 552 for the purpose of bringing the selected totalizer into position to be moved into engagement with the actuators.

*Transfer mechanism.*

The transfer mechanism herein employed is identical with that employed in the Chryst and Fuller patents hereinbefore mentioned. It will however be described briefly herein but as it is identical for both the grand and ticket sellers' totalizers it will only be described and shown in connection with the former. Therefore when the sleeve 429 is rotated under the control of the ticket sellers' keys the cam 602 is rocked to shift the desired ticket seller's totalizer into position to coöperate with the actuators 404.

Pairs of teeth 608 (Fig. 22) are cut in the transfer arms 406 and 409 pivoted on and movable concentric to the actuators. The arms are movable relatively to their respective racks 405 and 408 for the purpose of transferring. Means, not shown in the present application, are provided to cause the racks and their arms to move as integral units. A plate 609 abuts a stud 610 on a corresponding transfer arm, the plate being pivoted at 611 to the frame supporting the actuator. As a totalizer pinion passes its nine position it engages a pawl 612 to rock an arm 613 rigid with the pawl 612. The arm 613 carries a pin passing through a slot 615 in the plate 609, so that movement of the arm 613 permits a spring shown in Fig. 22 as connected to the plate 609 and to the arm 594 to move the end of the plate 609 out of the path of movement of the stud 610 to permit the transfer arm to move an extra step of movement to effect the required transfer, the plate 609 being engaged by the stud 610 during return movement of an actuator when a transfer is not to be effected.

*Type-wheels of validating printer.*

The validating printer is mounted on the left hand side of the frame 51 within a hood 620, shown in dotted lines in Figs. 2 and 4. The type carriers 438 as already stated, are mounted on the sleeves 437, which are differentially positioned at every adding operation of the machine either under the control of the destination devices or of the amount keys, as described above. These type wheels as well as the type wheel 441 for printing the initials of the ticket sellers are provided with two series of type 621 and 622 (Fig. 29) the series 621 being adapted to print the value of coupon tickets validated by the validating printer and the ticket sellers' initials on the back of the first or title coupon 623 (Figs. 32 and 33) of the tickets and the series 622 is employed to print the initial of the ticket seller and the value of every ticket issued by the local printer or validated by the validating printer on the detail strip 440 (Figs. 29 and 30.)

*Detail strip of validating printer.*

The detail strip 440 passes from a supply roll 624 about an impression roll 625 on to a storage roll 626. These rolls are carried on a printer frame 627 (Fig. 30) loosely mounted on a stud 628. The impression roller is mounted on plate 629 which can be adjusted so that a proper printing impression may always be taken. While the type carriers 438 and 441 are in their differentially moved positions the printer frame 627 is rocked clockwise so that the impression roll 625 carries the detail strip 440 against the series of type 622 to take an impression on the strip. To this end a rearwardly extending arm 632 of the printer frame 627 is pivotally connected to the lower end of a link 633 which is pivoted at its upper end to an arm 634 fast on the left hand end of a shaft 635 supported at its right hand end in the frame 53 (Fig. 4) and near its left hand end in the frame 51. A downwardly extending arm 636 is fast on the shaft 635 between the frames 52 and 53 (Figs. 4 and 30) and its lower end is pivoted to a pitman 637 which at its lower end is provided with a slot 638 straddling the shaft 348 to guide the pitman in its reciprocation. A roller 639 projecting from the pitman 637 rides in the cam groove 640 (Fig. 30) formed in a cam disk 641 fast on the left hand end of the shaft 348, which is in direct axial alinement with the shaft 379 supporting the printing cylinders 337 and 347 of the local printer Figs. 2^A, 4, and 39. This cam groove 640 is so shaped as to move the pitman rearwardly and through the arm 636, shaft 635, and arm 634 and link 633, rock the printer frame clockwise and thereby move the impression roll 625 to carry the detail strip 440 against the type carriers after the latter have been positioned by the differential mechanism of the register. The upper edge of an arm 642 of the printer frame is curved, forming an arc with the stud 628 as a center, and this edge moves in a groove (Figs. 4 and 29) formed on a pin 644 to guide the frame in its rocking movements.

For the purpose of feeding the detail strip 440 one step forwardly after each printing impression is made thereon a ratchet wheel 645 (Fig. 29) is rigidly connected to the feeding roller 626 and is engaged by a pawl 646. The pawl 646 is loosely mounted on the frame 51 and a spring retains the forward lower end of the pawl in engagement with the ratchet wheel 645. Upon downward movement of the printer frame the ratchet wheel 645 is moved with the frame so that the pawl 646 engages behind the succeeding teeth and thereby when the ratchet wheel is moved back to normal position with the printer frame the receiving roller will be rotated one step to advance the detail strip.

*Inking ribbon for detail strip.*

An endless inking ribbon 650 (Fig. 29) for the type wheels passes over a feed roll 651 of absorbent material and adapted to retain a supply of ink, loose on a stud 652 projecting from the frame 51, over a roller 653, carried by the free end of an arm 654 loose on the stud 652, under a roller loose on a stud 649, under a roller 655 mounted on the frame 51 and back of a sleeve on the rod 304. The arm 654 has an upwardly projecting branch to which is connected one end of a spring 657 which at its opposite end is secured to an arm 658 loosely pivoted on the rod 301. The spring 657 tends to rock the arm 654 counter clockwise (Fig. 29) and in this manner tensions the inking ribbon and at the same time holds a roll 659 carried by the arm 658 against the ribbon thereby pressing it against the roll 651. The feeding roll 651, which coöperates with the roll 659 is given one step of movement at each operation of the printer frame by the coöperation of a spring pressed pawl 660 (Fig. 30) with a ratchet wheel 661 rigid with the feed roll 651. The pawl 660 is loosely mounted on the printer frame and when the printer frame is rocked counter clockwise the pawl is carried with it and engages the succeeding tooth of the ratchet wheel and then when the frame is moved counter clockwise back to normal position the pawl rotates the feeding roll 651 to advance the inking ribbon.

*Alining means for type wheels.*

During the rocking of the printer frame the type wheels are alined in their differentially set positions by an alining plate 663 (Figs. 29 and 30) which is provided with a V shaped rib 664 for engaging V shaped notches 665 formed on the peripheries of the type wheels. For the purpose of lowering the alining plate 663 to aline the type wheels, an arm 666 loose on the stud 301 but rigidly connected with the plate 663 by an adjustable screw 6631 carries a roller 667 projecting into a cam slot 668 (Fig. 30) formed in the printer frame. This cam slot is so formed as to rock the arm 666 and the plate 662 clockwise as viewed in Figs. 29 and 30 at the very beginning of the operation of the printer frame so that the alining rib 664 is moved into engagement with the notches 665 and retained in this position until near the very end of the return movement of the printer frame to normal position.

*Impression means for taking impression from type wheels on coupon tickets.*

When a coupon ticket (Figs. 32 and 33) is to be validated it is inserted through the side of the hood 620 on to a table 670 (removed in Fig. 4 and shown in Figs. 2 and 29) so that the back of the first or title coupon 623 of the ticket is in printing position under the series 621 of type on the type carriers. A platen 671 (Figs. 2, 29, and 30) for carrying the first coupon against the type carriers is mounted on the rear end of a lever 672 loosely mounted at 673 to the frame of the machine. The forward end of the lever 672 pivotally carries a pawl 674 which is adapted to be adjusted by the screw 675 to insure the proper contact of the platen with the type carriers. A spring connected at one end to the frame 51 and at the other end to the pawl 674 normally holds the rear end of the lever 672 in engagement with a stop pin 677. An arm 678 (Fig. 30) is loosely mounted by a pin 679 on the printer frame 627 and is provided with two prongs 680 and 681. A roller 682 which is mounted on the lower end of an arm 683 loose on the stud 652 projects into the slot formed by the prongs 680 and 681. The arm 683 is fast to an arm 684, pivoted at its lower end to a link 685 which is connected at its rear end to the outer end of an arm 686 fast on the shaft 429. This shaft, as will be described later, is rocked slightly clockwise upon depression of a ticket seller's key if a validating key has been depressed. This movement of the shaft 429 rocks the arm 683 counter clockwise through the arm 686, link 685, and arm 684 and as the roller 682 projects into the slot formed by the prongs 680 and 681 the arm 678 also is rocked forwardly so that the end of the prong 680 is carried over the rear end of the pawl 674. When the printer frame is then rocked clockwise, the arm 678 is carried downward and is guided by the roller 682 so that its prong 680 engages the pawl 674 to rock the lever 672 against the tension of its spring, whereby the platen 671 carries the coupon 623 of the coupon ticket against the type carriers to print on the coupon the amount set up on the type carriers. The printer frame and the shaft 429 are restored to normal position near the end of the last rotation of the shaft 204 and the prong 680 is thereby carried away from over the pawl 674 so that if a coupon ticket is not to be validated at the next operation of the register the printer frame can be rocked to take an impression on the detail strip 440 to print the value of the local ticket issued without operating the platen lever 672.

*Date wheels for printing on coupon tickets.*

The date device 690 for printing the date of issue on the back of each of the coupons 688 (Fig. 33) is mounted in a feeding roll 689 (Figs. 29 and 29ᴬ). The date device 691 for printing the date of expiration on these coupons is mounted in a feeding roll 692. These date devices are of a well known construction and therefore have not been shown or described in detail.

*Feeding and impression means for coupon tickets.*

The right hand end of the feed roll 689 is fast on the left hand end of the shaft 204 and at its left hand end the roll is supported in a bracket 695 rigidly mounted on the frame 51. The feed roll 692 at its right hand end is supported by a stud at its right hand end in the bracket 695. The shaft 204 is given as many complete rotations as there are coupons 688 in the coupon ticket to be validated. The number of rotations of this shaft is controlled by the validating keys as will be described later. The rotation of the shaft 204 and the feed roll 689 is imparted to the feed roll 692 by an intermediate gear 699 which meshes with a gear 700 (Fig 29ᴬ) fast on the shaft 204 and a gear 701 rigid with the feed roll 692. Means for inking the wheels (not shown) of the date devices 690 and 691 are not shown in the drawings, any means, such as inking rollers, being capable of use for this purpose.

Impression rolls 702 and 703 for coöperating with the feed rolls 689 and 692, respectively, are supported in a frame comprising parallel plates 704 (Figs. 4, 29, 29ᴬ, and 29ᴮ) connected by a cross bar 705. A cross rod 706, connecting the two plates 704, passes through the rear end of a pair of arms 707 loosely mounted on a stud 708 and a cross rod 709 also connecting the plates 704 passes through two arms 711 also loose on the stud 708. Links 712 loosely mounted on the rods 706 and 709 and links 713 loosely mounted on studs 713a form toggles which when extended, by means now to be described, serve to raise the frame comprising the plates 704 and thereby lift the impression rollers into engagement with their corresponding feed rolls. Connected at the center point of these toggles is a bar 716. The bar 716 pivotally carries a lever 717 to the downwardly extending arm of which is secured a spring 718 which is under tension and tends to rock the lever 717 clockwise. This movement of the lever, however, is prevented normally by the engagement of a pin 719 on the rearwardly extending arm of the lever 717 with the upper end of a slot 720 (Fig. 29) formed in the lower end of a link 721, which is swung from an arm 722 fast on the shaft 429. This shaft 429, as above stated, is rocked slightly crosswise (Fig. 29) in a manner to be described later, upon depression of a ticket-seller's key after a validating key has been operated. This movement of the shaft 429 elevates the link 721 and permits the spring 718 to rock the lever 717 clockwise, this movement of the lever being limited by the engagement of its rearwardly extending arm with a flat sided stud 724 projecting from the lower end of an arm 725. A nose 726 on the rearwardly extending arm of the lever 717 is thereby carried to the rear of the pin 724. The arm 725 is loose on a stud 727 but is rigid on a sleeve 730 on which is rigidly mounted an arm 728 connected to the arm 634 by a link 729. The arm 634, as already described, is rocked first clockwise (Fig. 30) and then counter clockwise to normal position through the medium of the pitman 637, arm 636 and shaft 635 by the cam groove 640. If a validating key is not depressed the arm 725 will be rocked idly without accomplishing any function. When a validating key has been depressed, however, the nose 726 will be moved to the rear of the stud 724, as described above, so that when the arm 725 is subsequently rocked clockwise its stud 724 through its engagement with the nose 726 will rock the lever 717 counter clockwise and when the stud passes out of engagement with the nose the spring 718 again rocks the lever 717 clockwise to carry the nose in front of the flat side of the stud 724, the clockwise movement of the lever 717 being limited by a pin 731 on the bar 716. Then upon counter clockwise movement of the arm 725 to normal position the stud 724 forces the lever 717 and the bar 716 forwardly thereby extending the links 712 and 713 to elevate the impression rolls 702 and 703 against the coöperating feed rolls.

From the above description it can be seen that upon return movement of the arm 725 to normal position near the end of the single rotation of the shaft 348 the impression rolls 702 and 703 are retained in engagement with the feeding rolls 689 and 692 until the shaft 429 is rocked counter clockwise (Fig. 29) back to normal position to lower the nose 726 from in front of the pin 724 thereby permitting the impression rolls to be lowered out of engagement with their feeding rolls. The shaft 429 is not rocked back to normal position, when a coupon ticket is validated, until after the shaft 204 has been given as many complete rotations as there are coupons 688, the rolls 689 and 702, and 692 and 703, serving to feed the coupon ticket forward the distance of one coupon 688 at each rotation of the shaft 204.

*Operating mechanism.*

As already pointed out the local printer is not operated when the validating printer is employed to validate a coupon ticket, but the register is given one complete cycle of operation at every operation of the local printer or of the validating printer. It has also been stated above that the shaft 204 is given as many rotations as there are coupons 688 in the coupon ticket so that each coupon will have the date of issue and the date of expiration printed thereon by the dating devices 690 and 691, respectively. The local printer, the validating printer and the register are all preferably driven by an electric motor through connections which are designed to effect the above operations. This motor and these connections will now be described.

*Motor and clutches.*

The electric motor 733 (Figs. 3 and 34) is fastened on a plate 734 which forms the back frame of the machine and is rigidly mounted on the frames 50 and 53. The forms of clutch and motor mechanism here employed are of the well known types shown and described in Letters Patent of the United States No. 923,857 granted to Chas. F. Kettering on June 8, 1909, and patent to Charles F. Kettering and William A. Chryst, No. 1,144,418, dated June 29, 1915, based on an application filed September 23, 1907. It is not considered necessary to describe the motor fully in the present application as a detailed description of the same may be had by reference to said patents. It is to be understood that it is not intended to limit the present invention to use with the particular electric motor shown or to use with an electric motor at all, as it is obvious that any other suitable form of operating mechanism, may be employed. The driving mechanism differs somewhat from that shown in the above Kettering patent and Kettering and Chryst patent as two clutch mechanisms, instead of one, are used in the present invention. The motor is adapted to operate the local printer through one clutch and the validating printer and the register through the other clutch.

The armature 735 of the motor (Fig. 3) is fast on a shaft 736 integral with a worm which is not shown but is mounted within a casing 737 (Fig. 3) and meshes with a curved worm wheel or gear 738 (Figs. 4ᴮ and 37). This form of worm and gear connection is old as shown in detail in said Kettering patent and said Kettering and Chryst patent. The gear 738 is fast to two hollow cylindrical parts 739 and 740 one on either side of the gear 738 the part 739 forming one of the elements of the clutch through which the motor operates the local printer and this clutch is called the local clutch herein. The other part 740 forms an element of the clutch through which the motor drives the validating printer and the register and this clutch is called the validating clutch herein. The gear 738 is loosely mounted on a shaft 741 which at its rear end is supported by a frame 742 (Fig.
37) and at its forward end in a frame 744 fastened on the plate 734. One clutch member (Fig. 4ᴮ) for the local clutch is in the form of a cut away disk or plate 730 mounted within its corresponding cylindrical part 739 and fast on the forward end of a sleeve 745 loose on the shaft 741. A like plate 732 (Fig. 4ᴮ) for the validating clutch is fast on a sleeve 7450 surrounding the forward portion of the shaft 741. The connection between the two elements of either clutch is accomplished by means of rollers 7400 which are operated by spring pressed plungers 7401 as fully shown and described in the aforesaid Kettering patent.
The connection of the clutch members of the local clutch is effected by the rollers 7400 when a nose 746 (Fig. 3) on an arm 747 (Figs. 3 and 37) is raised out of engagement with shoulders on disks 748 and 751. The arm 747 is loose on the stud 750 carried by a bracket 749 rigidly mounted on the plate 734. When the arm 747 is rocked counter clockwise (Fig. 3) to raise its nose 746 out of engagement with the shoulders on the disks 748 and 751, the disk 748 is slightly rotated by a spring (not shown herein but clearly set forth in said Kettering and Chryst patent) about the sleeve 745 and relative to the disk 751 so that a roller 752 carried by an arm 753 fast on a shaft 754 is forced out of a notch 755 formed in the periphery of the disk 748, thereby rocking the shaft 654. The connection between the cylindrical part 740 and the plate 732 of the validating clutch is effected by rollers in a similar manner when a nose on an arm 756 (Fig. 37), similar to the arm 747, is raised out of engagement with shoulders on a disk 757 and 769 which are similar to the disks 751 and 748, respectively, and loosely mounted on the sleeve 7450 (Figs. 4ᴮ and 37). The disk 769 is given a slight movement relative to the disk 757 when the arm 756 is raised and this disk has a notch which is similar to the notch 755 in the disk 748 (Fig. 3) and operates an arm (not shown) similar to the arm 753 and also fast on the shaft 754. The shaft 754 carries fast thereon an arm 758, which, when the shaft 754 is rocked when either clutch is rendered effective, engages a roller 759 to rock an arm 760 carrying the roller downward. The arm 760 carries an insulating strip 761 which, when the arm 760 is rocked downward, moves a pair of contact strips 762 into engagement with a pair of contacts 763 to close the motor circuit and thus cause operation of the motor. The switch mechanism is not shown and described in detail here but is fully shown and described in the Kettering and Chryst patent.

The sleeve 745 (Fig. 4ᴮ) carries rigidly mounted thereon a gear 764 (Figs. 3, 4ᴮ and 37) which meshes with a like gear 765 fast on a shaft 766 (Fig. 3) also suitably mounted in the frames 742 and 744. Fast on the shaft 766 near its forward end is a bevel gear 767 which meshes with a bevel gear 768 fast on the sleeve 378 which, as already described, has the gear 377 rigidly mounted on its left hand end. This latter gear wheel 377, as stated in connection with Fig. 8, meshes with the gear wheel 380 and thereby drives the gearing for the local printer. Therefore it can be seen that the local printer is driven through these connections and the local clutch by the motor.

*Release of local clutch.*

The mechanism now to be described is employed to rock the arm 747 (Figs. 3 and 37) out of normal locking position when the local printer is to be operated. The lever 747, as shown in Fig. 3, is provided with a slot 770 through which the free end of an arm 771 projects, (Figs. 3, 35, 36, and 37). The arm 771 is fast on the left hand end of a sleeve 772 rotatably mounted on the shaft 723. Fast on the right hand end of the sleeve 772 is an arm 776 pivoted at its upper end to the rear end of a link 777 which at its forward end is pivoted to a member 778 loosely mounted on a sleeve 779 (Figs. 35 to 38, inclusive) which is mounted to rotate about the shaft 429. A projecting arm 781 of the member 778 normally engages the rear curved edge 782 of the lever 529 (Figs. 27B, 34, 35, 36, and 39). The rear edge 782 (Fig. 39) of this lever 529 cannot be seen in Figs. 34, 35, and 36 as the rear curved edge of an arm 841, loosely mounted on the shaft 186, is superimposed on the circular edge 782 in these figures. A spring 783 (Figs. 3 and 37) coiled about the sleeve 772 is under tension and tends to rotate the sleeve 772 counter clockwise as viewed in Figs. 34, 35, and 36, to rock the arm 747 through the arm 771 and thereby release the local clutch. As already described, the shaft 186 and the lever 529 are rocked clockwise by the spring 534 when a ticket seller's key is operated and in this manner the rear curved edge 782 of the lever 529 is moved out of engagement with the arm 781 on the member 778. When the lever 529 is rocked upon depression of only a ticket seller's key the spring 783 performs its function of rocking the sleeve 772 and arm 771 counter clockwise thereby moving the arm 776, link 777, and member 778 to the positions shown in Fig. 36. It can, therefore, be seen from the description just given that when a ticket seller's key is the only key operated the local clutch is rendered effective and the motor operates the gearing of the local printer (Fig. 8) through this clutch, gears 764 and 765, shaft 766 and bevel gears 767 and 768.

*Release of validating clutch during operation of the local printer.*

As already pointed out the local printer is given one half of a complete operation, that is, the gear 377 is given a rotation of 180° before the register begins to operate. The local printer is partly operated before the register begins its operation so that the holes 99 in the destination device are moved into direct operative relation with the fingers 475 on the bars 447 before movement of the bars 447 is begun by the actuators 404.

The mechanism for automatically releasing the validating clutch when the local printer has been given one half of an operation will now be described. An arm 786 which is fast on a shaft 787 (Figs. 34, 35, 36, and 37), projects into a slot (not shown) in the arm 756 (Fig. 37) for locking the validating clutch. The slot in the arm 756 is similar to the slot 770 in the arm 747. Coiled about the shaft 787 is a spring 788 which is under tension and serves to rock the shaft 787 in a clockwise direction, as viewed in Figs. 34, 35, and 36, to raise the arm 756 and thereby release the validating clutch so that the motor may operate the validating printer and the register. Fast on the shaft 787 near its left hand end is an arm 789 the rear edge of which is normally in engagement with a pawl 790 (Figs. 4, 31, and 34 to 37) to prevent movement of the shaft 787 under the influence of the spring 788. The pawl 790 is pivoted at 791 to the forward end of a lever 792 which is rigidly mounted on a sleeve 793 rotatably mounted on the shaft 723 to the left of the sleeve 772. A spring 794 secured at its opposite ends to the lever 792 and to a downwardly extending arm of the pawl 790 serves to retain the pawl in its normal position relative to the lever 792. The lever 792 is pivotally connected at 796 to a pitman 797 (Figs. 4, 31, and 37) forked at its forward end to straddle the sleeve 378 to guide the pitman in its reciprocating movement. Fast on the sleeve 378 is a disk 798 which has a cam groove 799 (Figs. 31 and 37) formed in one of its faces, and a roller 800 on the pitman 797 projects into this cam groove. When the local printer has been operated 180° the cam portion 801 of the groove 799 draws the pitman 797 toward the shaft 204 to rock the lever 792 clockwise. This movement of the lever carries the pawl 790 upward out of engagement with the arm 789 whereupon the spring 788 rocks the shaft 787, arm 786 and locking arm 756 to release the validating clutch. The clutch member or plate 732 of the validating clutch as already stated is connected by its rollers to the cylindrical part 740 when the validating clutch is released so that the sleeve 7450 (Fig. 4B) will rotate with the gear 738. A bevel gear 780 (Figs. 4B and 37) fast on the sleeve 7450 meshes with a bevel gear 785 fast on the shaft 204 so that the rotation of the gear 738 is imparted to the shaft 204 when the validating clutch is released.

On the shaft 204 to the right of the frame 50 is rigidly mounted a gear 802 (Figs. 3 and 34) meshing with the gear 543. The gear wheel 543 in turn meshes with a gear 803 loosely mounted on the shaft 348 which carries the driving cams 392 and 393 for the differential mechanism of the register and the cam 641 for operating the detail strip printer frame of the validating printer, (Figs. 4 and 30). Fast to the gear 803, but loose on the shaft 348, is a disk 804 provided with a notch 805 formed in its periphery. Fast on the shaft 348 and beside the gear 803 is a member 806 to which is pivoted a coupling lever 808 carrying a roller 809 normally seated in the notch 805. Through these connections just described the shaft 204 rotates the shaft 348. As the feeding roller 689 of the validating printer (Fig. 29) is fast on the shaft 204 and as the operating cams for the register and validating printer are mounted on the shaft 348 it can be seen from the above described mechanism that the feeding mechanism for the coupon tickets and the register are operated by the motor through the validating clutch.

*Disconnection of local clutch.*

The mechanism for disconnecting the local clutch comprises an upwardly extending finger 810, on the arm 771 (Figs. 3 and 34 to 37) and an arm 811 which is fast on the right hand end of the sleeve 793 and carries a pin 812 for engaging the finger 810. When the pitman 797 (Fig. 31) is drawn forwardly by the passage of the roller 800 into the cam portion 801 of the groove 799, the sleeve 793 and arm 811 are not rocked sufficiently in a clockwise direction to carry the pin 812 against the finger 810. Near the end of the rotation of the disk 798 the roller 800 passes into the cam portion 813 of the groove 799 and rocks the sleeve 793 and arm 811 still farther in a clockwise direction to rock the sleeve 772 and arm 771 clockwise slightly past normal position and thereby restore the arm 747 to locking engagement with the disks 748 and 751 to disconnect the local clutch.

As the movement of the arm 771 slightly past normal position rocks the sleeve 772 it will also through the arm 776 and link 777, move the member 778 slightly past normal position. In order to prevent the spring 783 from again operating the sleeve 772 when the roller 800 on the pitman 797 passes out of the cam portion 813 of the groove 799, the lever 529 (Figs. 35 to 39) is provided with a block 814 for coöperating with a pawl 815 pivoted on the member 778. When the lever 529 is rocked clockwise by the spring 534 the lower edge of the block 814 engages the forward upper end of the pawl 815 and rocks the pawl clockwise about its pivot and against the action of a spring 817. When the member 778 is rocked slightly past normal position as the locking arm 747 is moved into effective locking position the pawl 815 passes out of engagement with the lower edge of the block 814, and the spring 817 then rocks the pawl 815 upwardly to normal position relative to the member 778. Finally as the roller 800 rides out of the cam portion 813 of the groove 799 the sleeve 772 and therefore the member 778 is rocked slightly counter clockwise back to normal position and the forward end of the pawl 815 engages the rear end of the block 814 to prevent the spring 817 from again rocking the sleeve 772, and thereby again releasing the local clutch.

*Disconnection of validating clutch.*

When the local printer is operated the shafts 204 and 348 are given but one complete rotation to operate the register and take an impression on the detail strip 440 in the validating printer from the type wheels 338 and 441 and then the validating clutch is disconnected to stop the machine. To disconnect the validating clutch at this operation an arm 820 (Figs. 34, 35, and 36) is fast on the right hand end of the shaft 787 and engages under the rear end of an arm 821 loosely mounted on the sleeve 779 so that when the shaft 787 is rocked clockwise to release the validating clutch the arm 820 rocks the arm 821 counter clockwise. The arm 821 has a downwardly extending finger 822 normally engaged on its rear side by a stud 823 (Figs. 3 and 34) projecting laterally from a disk 824 loose on the shaft 204. The disk 824 is rotated one step clockwise at the beginning of the operation of the register, during the operation of the local printer, by the engagement of the finger 822 on the arm 821 with the stud 823 on the disk when the shaft 787 is rocked to release the validating clutch. Near the end of the operation of the register the disk 824 is restored to normal position so that the stud 823 will engage the finger 822 and rock the arms 821 and 820, and shaft 787 to normal position to disconnect the validating clutch and break the motor circuit and thereby stop the motor. The mechanism for restoring the disk 824 to normal will be described soon in connection with the means for releasing the validating clutch, without releasing the local clutch, when a coupon ticket is to be validated. When the shaft 787 is restored to normal position in the manner just described the spring 794 restores the pawl 790 into normal engagement with the rear edge of the arm 789 fast on the shaft 787 to prevent the latter from being operated again by its spring 788 until the pawl 790 is moved out of normal locking position at the next operation.

*Release of validating clutch when the local printer is not operated.*

The releasing of the validating clutch when the validating printer is to be operated for the purpose of validating coupon tickets, is controlled by the validating keys 56 shown in Figs. 1 and 26 and hereinbefore described. The pin 5049 on the arm (Fig. 26) passes through the slot 5048 formed in the arm 5047 (Figs. 26, 27ᴬ, and 27ᴮ) loose on the shaft 186 as already described. The yoke 5051 fast to the arm 5047 is fast at its right hand side to a sleeve 829 (Figs. 27ᴮ and 37). The sleeve 829 at its right hand end has mounted thereon a lever 830 the rearwardly extending arm 825 (Figs. 35 to 37) which is normally in front of a lug 831 which projects to the left from a member 832 fast on a short sleeve 833 (best shown in Fig. 38). The sleeve 833 is loosely mounted upon the sleeve 779. Pivoted at 834 (Figs. 35 and 36) to the member 832 is a link 835 also pivoted to the lower end of an arm 836 rigidly mounted on the right hand end of the shaft 723. A spring 837 at its rear end is secured to the arm 836 and at its forward end to a stud on the frame 50 of the machine and tends to rock the arm 836 and shaft 723 clockwise and thus through link 835 turn the member 832 counter clockwise. This action of the spring however is normally prevented by the engagement of a finger 839 on the member 832 with the rear curved edge of the arm 841. The arm 841 is loosely mounted on the shaft 186 and a spring 842 normally serves to hold the arm in the position shown in Fig. 35. In this position of the arm 841 a projection 843 thereon is engaged by a stud 844 projecting from an arm 845 which is fast on the shaft 186. It is evident that when the lever 529 and shaft 186 are rocked clockwise by the spring 534 upon depression of a ticket seller's key as hereinbefore described the arm 841 will be moved in the same direction by the engagement of the stud 844 with the projection 843 on the arm. The stud 846 which is mounted on the frame 50 (Figs. 27ᴮ, 35, and 36) and projects under the arm 841 is normally engaged by a finger 848 on the arm 841 to prevent the arm 841 from being drawn upward by its spring 842 past normal position when the lever 529 is rocked counter clockwise (Figs. 35 and 36) past normal position as already described.

If a key in the validating bank has not been depressed, when the lever 529 and the arm 841 are rocked clockwise, movement of the member 832, link 835, arm 836, and shaft 723 under the influence of the springs 837 is prevented by engagement of the lug 831 on the member 832 with the rear end of the lever 830 as shown in Fig. 36. When a validating key is operated, however, it moves its detent 478 (Fig. 26) downward and the pin 5040 coöperates with the side 5052 of the slot 5048 in the arm 5047 to rock the arm 5047, yoke 5051, sleeve 829 and lever 830 counter clockwise and thereby elevate the rear end of the lever 830 out of the path of the lug 831 and in front of a lug 851 on the member 778. The arm 5047, yoke 5051, sleeve 829 and arm 830 are rocked against the action of the spring 852 as already described. When the lever 529 is then rocked by the spring 534 upon depression of a ticket seller's key the spring 783 cannot rock the sleeve 772 to release the local clutch as forward movement of the member 778, which is connected to the sleeve 772 by the link 777 and arm 776, is prevented by the engagement of the lug 851 on the member 778 with the rear end of the lever 830. As the end of the lever 830 has been moved out of the path of the lug 831 on the member 832 by the depression of a validating key as above described, the spring 837 rocks the arm 836 and shaft 723 clockwise and thereby moves the member 832 forwardly, when the arm 841 is moved out of engagement with the finger 839 on the member 832 upon depression of a ticket seller's key.

An arm 853 (Figs. 35 to 37) rigidly mounted on the shaft 723 at its left end and to the left of the sleeve 793 carries a pin 854 at its free end projecting under the forward end of the pawl 790. It can therefore be seen that when the shaft 723 is rocked clockwise by the spring 837 as just described, the pin 854 rocks the pawls 790 out of engagement with the arm 789. Thereupon the spring 788 (Fig. 37) rocks the shaft 787 clockwise to raise the locking arm 756 and thereby release the validating clutch and close the motor circuit.

*Control of validating clutch by validating keys.*

The validating bank of keys is provided to control the number of rotations of the shaft 204. One coupon 688 (Figs. 32 and 33) of the coupon ticket during one rotation of the shaft 204 has printed thereon the dates of issue and expiration by the date devices 690 and 691 as the ticket is fed by the feed rolls 689 and 692 and their corresponding impression rolls 702 and 703 as already described. The differential mechanism controlled by the validating bank of keys as shown in Fig. 28 also has already been described.

The link 605 (Fig. 28) of the differential mechanism for the validating bank is connected pivotally to a link 855 which at its upper end is pivotally connected to an arm 856 (Figs. 28 and 35 to 38) fast on the sleeve 779. Fast on the right hand end of this sleeve is an arm 857 and a link 858 is pivotally connected at its upper end to the arm 857 and at its lower end to the disk 824 (Fig. 34). Through these connections the differential movement of the member 442, as controlled by the depressed validating key, is imparted to the disk 824 to move the disk 824 a number of steps clockwise corresponding to the number on the validating key depressed. It has already been stated that the zero stop pawl 487 (Fig. 26) for the validating bank, is normally in position to disconnect the latch 416 from the driving segment 401 when the differentially movable member 442 is in zero position. This arrangement is provided to prevent differential movement of the disk 824 when the local printer is employed to issue a ticket. When the validating key is depressed its detent 478 is lowered as already described and the pawl 480 by its engagement with the pin 489 on the zero stop pawl 487 rocks the zero stop pawl counter clockwise (Fig. 26) out of operative position. The first step of movement of the disk 824 from normal position is given thereto by the forward rocking of the arm 821 (Figs. 35 and 36) under the influence of the spring 837 after a validating key has been depressed and upon depression of a ticket seller's key. For this purpose the arm 821 is provided with a lug 859 engaging the forward edge of the member 832 so that when the member 832 is rocked forward by the spring 837 the arm 821 is moved forwardly with it. This first step of movement of the disk 824 merely rocks the sleeve 779 and causes the link 605 to be lowered one step about its pivotal center 412 on the differentially movable member 42.

As each coupon 688 is fed forwardly by the feeding rolls 689 and 692 and the coöperating impression rolls 702 and 703 and validated by the date devices 690 and 691 the disk 824 (Figs. 3 and 34) is returned one step in a counter clockwise direction toward normal position, the last step of movement to disconnect the validating clutch and break the motor circuit and thereby stop the motor as already described. The mechanism for restoring the disk 824 to normal position by this step by step movement includes a pawl 860 pivotally mounted on the lower end of a downwardly extending arm of a lever 862 loosely mounted on the shaft 204. A downwardly extending arm 863 also loose on the shaft 204 carries a pin 865 which projects into a notch or slot 864 formed in the pawl 860. The lower end of the arm 863 is provided also with a roller 866 which rides in the cam groove 867 formed in a disk 868 loosely mounted on a stud 869. Also loose on the stud 869 but rigid with the disk 868 is a gear 870 meshing with the gear 802 so that upon each rotation of the shaft 204 and disk 802 the gear 870 and disk 868 also are given a complete rotation. The cam groove 867 is designed so that near the end of each rotation of the disk 868 the arm 863 is swung rearwardly this movement serving to rock the pawl 860 about its pivot to raise its operating nose into engagement with one of the ratchet teeth 873 formed on the periphery of the disk 824 and then to rock the lever 862 rearwardly with the arm 863 to move the disk 824 one step counter clockwise toward normal position. Upon return clockwise movement of the arm 863 the pawl 860 is first rocked downwardly to disengage its nose from the ratchet teeth 873 and then the rear end of the arm 863 engages a pin 874 projecting from the lever 862 and in front of the arm 863 to rock the lever 862 clockwise back to normal position. At each rotation of the shaft 204 this same operation takes place the pawl 860 at each succeeding operation engaging behind the succeeding tooth of the ratchet 873 and thereby moving the disk 824 one step at each cycle of operation toward normal position. During the last step of movement of the disk 824 to normal position the pin 823, as already stated, engages the finger 822 on the arm 821 and rocks the latter clockwise so that its rear end will engage the arm 820 fast on the shaft 787 and rock the arm 820 and shaft 787 counter clockwise to restore the validating clutch locking arm 756 (Figs. 3 and 37) to locking position and thus disconnect the validating clutch and break the motor circuit. The lever 862 is held in normal position during the beginning of the counter clockwise movement of the arm 863 until the pawl 860 is raised into engagement with the ratchet teeth 873 and is held in moved position until the pawl is disengaged from the ratchet teeth during the return movement of the arm 863 by the engagement of an alining nose on a pivoted pawl 877 with V-shaped notches formed in the outer edge of the upper arm of the lever 862. The disk 824 is also alined after each step of movement by the engagement of this alining nose in alining notches 879 formed in the periphery of the disk 824. Springs 881 which are connected at their forward ends to the alining pawl 877 and at their rear ends to the lever 862 serve to operate the alining pawl.

When the lever 529 and the shaft 186' are restored to normal position at the end of the first rotation of the shaft 204, as already described, the spring 842, rocks the arm 841 upwardly until the upper end of the latter engages under the finger 839 of the member 832. Then near the end of the last rotation of the shaft 204 when the member 832 is rocked rearwardly to normal position the arm 841 is restored to normal position so that its rear curved edge engages the end of finger 839 of the member 832 to prevent movement of the member 832 until a validating key and a ticket seller's key have been depressed at another operation of the machine.

*Control of the impression means for coupon tickets.*

It has been stated above that the shaft 429 is rocked clockwise (Figs. 29 and 30) so that the prong 680 (Fig. 30) of the arm 678 is carried over the pawl 674 (Fig. 29) mounted on the platen carrying lever 672 through the arms 683, 684 and 685 and 686 and to raise the arm 721 to permit the impression rolls 702 and 703 to be raised into engagement with the feed rolls 689 and 692. This movement of the shaft 429 is effected by the forward movement of the member 832

(Figs. 34 to 38). At its right hand end the sleeve 833 upon which the member 832 is fast, rigidly carries a lever 883 which is fastened to an arm 884 rigidly mounted on the shaft 429 by a rod 885. Through these connections forward movement of the member 832 rocks the shaft 429 clockwise and at the end of the operation of the machine when the member 832 is restored to normal position the shaft 429 is rocked counterclockwise to normal position so that the platen carrying lever 672 will not be operated and the impression rolls 702 and 703 will not be raised at the next operation of the machine unless a coupon ticket is to be validated. As the printer frame 627 is rocked but once by the cam 641 but one impression will be taken from the type carriers 438 and 441 on the detail strip 440 during the operation of the machine either to validate a coupon ticket or issue a local ticket.

*Disconnection of register.*

As the shaft 348 is to be given but one complete rotation to operate completely the register at every operation of the machine when a ticket is issued or validated it is necessary to disconnect the shaft 348 from its driving mechanism at the end of the first rotation of the shaft 204 when a coupon ticket is to be validated. To effect this disconnection the coupling lever 808 (Fig. 34) is rocked counter clockwise about its pivot at the end of the first rotation of the gear wheel 803 and disk 804 to raise the roller 809 out of the notch 805 in the disk 804 so that the disk 804 can continue to rotate without effecting rotation of the shaft 348. The lever 808 is rocked for this purpose against the action of its spring 819 by the engagement of its forwardly extending arm with a stud 888 which is moved into the path of this arm during the first rotation of the disk 804. The stud 888 projects laterally from a bell crank lever 889 pivoted on an arm 891 loose on a stud 892. The arm 891 is provided with two downwardly extending projections at its lower end for limiting the movement of the bell crank lever 889 about its pivot. A spring 894 which is connected at its opposite ends to the arm 891 and to the rearwardly extending arm of the bell crank lever 889 normally retains the bell crank lever in the position shown in Fig. 34 so that the stud 888 normally engages the rear projection on the arm 891. The arm 891 is integral with an arm 895 pivotally connected to the forward end of a link 896 which at its rear end is pivoted to the lever 883. When a ticket seller's key is depressed after depression of a validating key the member 832, rigidly connected to the lever 883 by the sleeve 833, as already described, rocks forwardly and thereby, through the link 896 and arm 895, rocks the arm 891 counter clockwise. During this movement of the arm the pin 888 engages the forwardly extending arm of the lever 808 to prevent the stud from moving rearward during the continued movement of the arm 891. Upon rotation of the shaft 348, disk 804 and member 806 the forward end of the lever 808 is carried away from stud 888 to permit the spring 894 to rock the lever 889 counter clockwise about its pivot so that the pin 888 will be moved into the path of movement of the forwardly extending arm of the lever 808. Therefore as the shaft 348 approaches the end of its one complete rotation the forwardly extending arm of the lever engages under the stud 888 and thereby the lever is rocked counter clockwise to raise the roller 809 out of engagement with the notch 805 in the disk 804. In this manner the shaft 348 is disconnected from the driving mechanism and as the stud 888 remains in engagement with the lever 808 until the end of the last rotation of the shaft 204 and disk 804 the roller 809 is held out of engagement with the notch 805 in the disk 804 until the validating clutch is disconnected. To disconnect this clutch the member 832, as already described, is restored to normal position at the end of the last rotation of the shaft 204 and the lever 891 is moved to normal position so that the rear projection on its lower end carries the pin 888 away from over the forward end of the lever 808 to permit the spring 819 to rock the lever 808 to normal position and thereby seat the roller 809 in the notch 804.

To prevent overthrow of the shaft 348 past home position an arm 898 (Fig. 34) fast on the end of the shaft 348 engages a squared pin 899 mounted on the pitman 847 when the shaft 348 reaches home position. The pitman 847 at its extreme upper and lower ends is provided with slots 900 straddling the shafts 186 and 348 to guide the pitman in its vertical movements. The pitman near its upper end (best shown in Figs. 35 and 36) is provided also with a cam slot 901 through which projects a roller 902 carried by an arm 903 fast on the shaft 186. When the spring 534 rocks the lever 529 and shaft 186, the roller 902 moves forwardly in the slot 901 to raise the pitman 847 and thereby elevates the stud 899 out of engagement with the arm 898. Near the end of the rotation of the shaft 348 when the shaft 186 is restored to normal position, as described above, the roller 902 moves back to normal position in the slot 901 to move the pitman 847 downward to normal position so that the arm 898 will engage the pin 899 at the very end of the rotation of the shaft 348. For the purpose of insuring a complete rotation of the shaft 348 to home position a roller 907 projecting from an arm 904 loosely mounted on the stud 892 cooperates with a cam 905. The cam 905 upon rotation of the shaft 348 gradually rocks the arm 904 clockwise thereby increasing the tension of a spring 906 so that when the roller 907 reaches the nearly radial inclined portion of the cam the spring 906 draws the arm 904 upwardly, the coöperation of the roller 907 with this inclined portion insuring movement of the shaft 348 to home position.

*Total printing.*

In total and subtotal printing operations the resgister is operated through the validating clutch, as will be described presently, and the shaft 348 is given two rotations to give the register two cycles of operation, the first cycle of operation being employed to restore to untripped position the transfer devices tripped at the last operation of the machine and to engage the actuators with the totalizer from which the total or subtotal is to be printed, the actuators being controlled by that totalizer during the second cycle of operation. The operation of the totalizers during total printing operations has been described fully in the above mentioned Chryst patent and briefly described hereinbefore and the means for controlling the register for the different accounting operations, that is, for adding, resetting and reading, is fully described in the above mentioned Fuller patent. As already stated, the hand lever 57 (Fig. 2), the plate 564 (Fig. 28), and the driving lever 567 and cams 573 and 574 for the plate 564 comprise part of this controlling mechanism, and the long tooth 592 of a totalizer pinion is employed to rock the lever 594 through the pawl 593, arm 598 and links 596 to control the extent of movement of the corresponding actuator 404 in a total or subtotal printing operation.

As it is necessary to give the register two cycles of operation for a total or subtotal printing operation, it is necessary to prevent the shaft 348 from becoming disconnected from its driving mechanism at the end of the first rotation so that it may be given two complete rotations. The device for accomplishing this purpose is shown in Fig. 34 and will now be described. The shaft 502 rigidly carries thereon a bell crank lever 909. Swung from the free end of the rearwardly extending arm of the bell crank lever 909 is a link 912 which at its lower end is pivoted to a hook 913 loosely mounted on the frame 50. Upon adjustment of the lever 57 (Fig. 1) to a total or subtotal printing position the shaft 502 and lever 909 are rocked clockwise through mechanism described in the aforesaid Fuller patent. The mechanism through which the shaft 502 is rocked by adjustment of the total lever includes an arm 960 (Figs. 27ᶜ and 27ᴱ) which is fast on the shaft and corresponds to the arm 231 shown in the drawings of the aforesaid Fuller patent. This movement of the lever 909 through the link 912 lowers the hook 913 over the stud 888. In this manner the lever 889 is prevented from rocking counter clockwise to position the pin 888 into the path of the forwardly extending arm on the lever 808 to disconnect the shaft 348 from its driving mechanism at the end of its first rotation.

When a total or subtotal is to be printed from a ticket seller's totalizer, the shaft 186 is released to permit the operation of the machine by the counter clockwise rocking of the lever 5061 (Fig. 27) upon depression of the desired ticket seller's key which lowers the plate 523 and rocks the lever 5061, as already described. When a total or subtotal is to be taken from the grand totalizer, however, the ticket seller's key is not operated and therefore the machine is released by the adjustment of the total lever to one of its extreme positions, in which positions it controls the machine for printing a total or subtotal from the grand totalizer. To release the machine by the adjustment of the total lever, when a total or subtotal is to be taken from the grand totalizer, the plate 523 at its lower end carries a stud 969 the flat surface of which is engaged by an arm 970 on a yoke member 971 (Figs. 27 and 27ᶜ) loose on the shaft 502. The right hand end of the yoke member 971 is fast on a sleeve 972 (Fig. 27ᶜ). The right hand end of the sleeve 972 is fastened to the left hand end of a sleeve 973 by a yoke 974, and the sleeve 973 immediately to the left of the right hand arm 505 is fast to a yoke 975 (Figs. 26, 27ᶜ, and 27ᴱ). This yoke 975, as best shown in Fig. 27ᴱ, is provided with a pin 976 and a link, which is not shown in the present application and which corresponds to the link 247 in the above mentioned Fuller patent, is moved forwardly by the adjustment of the total lever, when the latter is moved to either one of its extreme positions by mechanism not shown in the drawings but fully described and shown in the said Fuller patent. Rearward movement of this link, connected to the yoke 975 by the pin 976, rocks the yoke member 971 clockwise, as viewed in Fig. 27, through the yoke 975, sleeve 973, yoke 974 and sleeve 972, whereupon the plate 523 is drawn downwardly through the engagement of the arm 970 with the stud 976 on the lower end of the plate. Downward movement of the plate 523 rocks the lever 5061 to raise the rear end of the horizontal arm of the lever 5061 from in front of the stud 5062 whereupon the shaft 186 is rocked by the spring 534 (Figs. 34, 35, and 36) in the same manner as when a ticket seller's key is depressed.

In total and subtotal printing operations the release of the local clutch is prevented, the register being operated through the validating clutch upon such operations, as will now be described. In order to prevent the local clutch from being rendered effective in total and subtotal printing operations a link 916 is pivotally secured at its lower end to the rearwardly extending arm of the lever 909 and at its upper end is pivoted to a lever 918 loosely mounted on a stud 919. The lever 918 carries a pin 920 which projects over the forwardly extending arm of the lever 830 (Figs. 34, 35, and 36). When the lever 909 is rocked clockwise by the adjustment of the lever 57 to a total or subtotal printing position the lever 918, through the link 916, will be moved in the same direction to rock the lever 830 counter clockwise by the engagement of the pin 920 with the lever 918 so that the rear end of the latter is moved into the path of movement of the lug 851 on the member 778, thereby preventing the local clutch from being rendered effective.

As the rear end of the lever 830 is moved away from the lug 831 (Figs. 35 and 36) on the member 832 the spring 837 is permitted to move the member 832 forwardly and release the validating clutch for effective operation when the arm 841 is rocked away from the arm 839 of the member 832 upon depression of a ticket seller's key when a subtotal or total is printed from a ticket seller's totalizer or by the adjustment of the total lever 57 into position to control the machine for printing a total or subtotal from the grand totalizer. When the member 832 moves forwardly the arm 820 is rocked with it and through the arm 821 rotates the disk 824 one step in the same manner as when the validating clutch is released during the operation of the local printer. Near the end of the first rotation of the shaft 204, that is, near the end of the first cycle of operation of the register, the pawl 860 is raised into engagement with the bottom tooth 873 on the disk 824 and restores to normal position the disk 824, arm 821 and the correlated parts thus moving the locking arm 756 to normal locking position. The arm 830 is held away from the lug 831 by the pin 920 (Fig. 34) and therefore when the pawl 860 is moved out of engagement with the ratchet tooth 873 on the disk 824 just before the very end of the first rotation of the shaft 204 the spring 837 again operates the member 832 of the validating clutch. The arm 841 is raised during the second and not the first rotation of the shaft 204 in a manner to be described presently so that its curved edge will not be moved in front of the arm 839 on the member 832 until after the member 832 is restored to normal position during the second rotation of the shaft 204.

The means for controlling movement of the shaft 186, lever 529 and arm 841 to normal position near the end of the second rotation of the shafts 204 and 348 during a total or subtotal printing operation will now be described briefly. This means is shown and described in the aforesaid Fuller patent and reference may be had thereto for a more detailed description of the same. A pitman 923 (Fig. 34) is pivoted at its forward end to the downwardly extending arm of the lever 909 and near its rear end has a slot 925 through which the stud 544 projects to support the pitman. At its rear end the pitman carries a pin 926 projecting into a slot 927 (Fig. 35) formed in the lower end of the link 533. A roller 928 (Figs. 34 and 34A) also carried by the pitman 923 is normally seated in a notch or set off 929 in a cam groove 930 formed in a disk 931 loosely mounted on the stud 544 and not connected to the gear wheel 543 during an adding operation. A plate 932 is slidably mounted in a groove 933 formed in the left hand face of the disk, the plate being provided with a slot at its rear end through which the stud 544 projects. The forward end of the plate 932 is provided with a lug 935 engaged on either side by pins 936 mounted on the pitman 923. The above described movement of the shaft 502 and lever 909 by adjustment of the total lever 57 to a total or subtotal printing position draws the pitman 923 forwardly and thereby rocks the link 533 about the pin 531 so that the portion 537 (Fig. 35) of the slot 536 in the link is moved out of engagement with the roller 538 on the arm 539. Forward movement of the pitman 923 also moves the forward portion of the plate 932 into engagement with one of two diametrically opposite notches 937 formed in the gear 543 to couple the disk 931 to the gear 543 by the plate 932 so that the gear and the disk are rotated as a unit during a total or subtotal printing operation. The roller 928 at the same time is moved out of the notch 929 and into position to ride in the groove 930 formed in the disk 931. The cam groove 930 is so shaped that upon rotation of the disk 931 the pitman 923 is moved forwardly before the end of the first rotation of the shafts 204 and 348 is reached, to move the rear edge of the slot 536 (Fig. 35) in the link 533 into engagement with the pin 538 on the arm 539 the lever 909 and the shaft 502 being rocked further clockwise (Fig. 34) by such movement of the pitman. With the link 533 in this position the roller 538 moves idly in the portion 931 of the slot 536 when the arm 539 is rocked downwardly near the end of the first one-half rotation of the gear 543 it being remembered that this gear is given one-half a rotation upon each complete rotation of the shafts 204 and 348. The forward movement of the pitman 923 during the rotation of the disk 931 rocks the lever 918 still farther in a clockwise direction through the lever 909 and link 916, but as the pin 920 at this time engages a curved edge 943 of the lever 830 the latter will be retained in the position to which its was adjusted by the operation of the total lever 57. The hook 913 is lowered still farther by the forward movement of the pitman 923 but the recess in the hook is deep enough to permit this movement without the upper end of the recess engaging the pin 888. Near the end of the rotation of the gear wheel 543, that is, near the end of the second cycle of operation of the register the pitman 923 is moved by the cam groove 930 to the position to which it was adjusted by the total lever 57 so that when the arm 539 is rocked downwardly the second time the pin 538 engages the shoulder 945 (Fig. 35) in the slot 536 in the link 533 to slightly lower the latter. This movement of the link 533 is just sufficient to restore the lever 529 and shaft 186 to normal position so that the arm 841 can be raised by its spring 842 in front of the finger 839 on the member 832, when the arm 832 is moved rearwardly the second time near the end of the second rotation of shafts 204 and 348. Since the arm 841 now engages the finger 839 on the member 832 the validating clutch cannot be rendered effective as the member 832 cannot again be moved forwardly.

*Control of zero stop pawls in total and subtotal printing operations.*

In total and subtotal printing operations it is necessary to permit the zero stop pawls 486 (Fig. 22) for the amount key banks to move into operative position upon release of the machine so that the differential mechanism, controlled by the amount key banks in adding operations, will be stopped at zero position, during the first cycle of operation of the register, the transfer devices, which were tripped at the last operation of the machine being restored to untripped positions during this first cycle of operation, that is, during the first rotation of the shaft 348. As the differential mechanism for the amount key banks is controlled by the totalizer wheels, from which the total or subtotal is taken, during the second cycle of operation of the register, it is necessary to rock the zero stop pawls 486 out of operative position before the actuators begin their upstroke during the second cycle of operation and the mechanism by which this result is accomplished will now be described.

It will be remembered that the cross rod 504, (Figs. 22, 26, and 27°) carried by the arms 505 loosely mounted on the sleeve 973, normally retains the zero stop pawls for the amount key banks in inoperative position and that the lower end of the plate 5041 (Fig. 26) retains the rod 504 in normal position. As the arms 5046 and 5047 (Figs. 26 and 27ᴮ) are rigidly fastened by the yoke 5051 to the sleeve 829 carrying the lever 830 (Figs. 27ᴮ, 34, 35, and 36) it can be seen that when the lever 830 is rocked by the adjustment of the total lever, as above described, the arm 5046 is rocked counter clockwise as viewed in Fig. 26. This movement of the arm 5046, through the engagement of the pin 5044 in the cam slot 5045, raises the plate 5041 in the same manner as when a validating key is depressed. The slot 5048 in the arm 5047 is triangular to permit the rocking of the arms 5046 and 5047 with effecting movement of the detent plate 478 for the validating keys. When the plate 5041 is raised in this way the zero stop pawls 486 are rocked by their springs into operative position thereby raising the rod 504 and arms 505. As the pawls 486 are in operative position during the first rotation of the shaft 348, it can be seen that the latches 416 for the amount differential mechanism are tripped, when the actuators arrive at zero position and then when the actuators are moved from their zero to their normal position, upon return movement of the driving segment 401 to normal position during this first rotation of the shaft 348 the tripped transfer devices are restored to untripped positions.

In order to move the rod 504 to normal position to move the zero stop pawls out of operative position after they have tripped their corresponding latches 416 and before the differential mechanism is operated during the second cycle of operation of the register an arm 980 (Figs. 26 and 27ᶜ) is fast on the shaft 502 and carries a pin 981 which projects over the right hand arm 505. When the shaft 502 is rocked clockwise (Fig. 26) as above stated, by the adjustment of the total lever to a total or subtotal printing position the pin 981 is lowered but not sufficiently to engage the right hand arm 505 and then when the arms 505 are rocked counter clockwise to raise the rod 504 when the zero stop pawls are rocked into operative position the right hand arm 505 engages the pin 981. Then when the shaft 502 is rocked still farther clockwise during the first cycle of operation of the register, by the cam groove 930 through the pitman 923 and lever 909, as already described, the arms 505 and the rod 504 are moved clockwise to normal position through the engagement of the pin 981 with the arm 505 to move the zero stop pawls out of operative position. When the total lever is moved to its adding position the pin 920 (Fig. 34) is carried out of engagement with the lever 830 whereupon the lever 830, sleeve 829, yoke 5051 and arms 5046 and 5047 are rocked to normal position by the action of the spring 852. The plate 5041 thereby is lowered to normal position to move the rod 504 to normal position the rod having been moved upwardly by the zero stop pawls near the end of the second cycle of operation of the register when the shaft 502 and arm 980 are rocked counter clockwise, as above described, to the position to which they were moved by the adjustment of the total lever.

As is usual in the art, there are provided additional totalizer elements for which no banks of amount keys are provided, these elements being of the highest denominations and operated in adding operations only when transfers to them are necessary. The differential mechanism and transfer devices for these totalizer elements are identical to those shown in Fig. 22, except that the differential mechanism for the additional totalizer elements are not controlled by the destination devices. As these differential mechanisms and transfer devices for these totalizer elements are identical to those shown in Fig. 22 it has been considered unnecessary to show or describe them in the present application. The zero stop pawls for the actuators for the additional totalizer elements are always in operative position in adding operations as the additional actuators are moved only from normal to zero position at such operations to effect transfers. These zero stop pawls are like those for the banks of amount keys and therefore are not shown. In total and subtotal printing operations these zero stop pawls for the additional actuators are rocked out of normal position after they have tripped their latches in zero positions during the first rotation of the shaft 348 and before the actuators are operated during the second rotation of the shaft 348, so that the extent of movement of the additional actuators is controlled by the additional totalizer wheels during the second rotation of the shaft 348. To this end a rod 990 (Fig. 27ᶜ) is carried by two arms 991 fast to the shaft 502 and the rod 990 passes over the forwardly extending tails of the zero stop pawls for the additional actuators. When the shaft 502 is rocked by the adjustment of the total lever to a total or subtotal printing position, the rod 990 is lowered but not sufficiently to rock the zero stop pawls for these additional operations out of operative position. Then when the shaft 502 is rocked still farther by the mechanism shown in Fig. 34, as above described, the rod 990 is lowered sufficiently to rock the zero stop pawls for these additional actuators out of operative position so that during the second rotation of the shaft 348 the actuators are controlled by the additional totalizer wheels. Type wheels (Figs. 2 and 29) are controlled by these additional totalizer elements in total and subtotal printing operations in the same manner as the type wheels controlled by the amount keys are controlled in total and subtotal printing operations.

*Interlocks.*

In order to lock the validating keys against depression upon adjustment of the total lever to a total or subtotal printing position and to prevent adjustment of the total lever out of adding position after a validating key has been depressed an arm 995 (Figs. 26 and 27ᶜ) is fast on the shaft 502 and carries a pin 996 which is normally in position, when the total lever is in adding position, to permit the clockwise rocking of the arm 480, which is effected by the downward movement of the detent 478 for the validating keys, when a validating key is depressed. This movement of the arm 480, when a validating key is depressed, moves the forwardly extending end of the arm 480 under the pin 996 and thereby prevents clockwise movement of the shaft 502 and hence adjustment of the total lever out of adding position it being remembered that the shaft 502 is rocked clockwise by the adjustment of the total lever, as above stated and as fully described in the aforesaid Fuller patent. When the total lever has been adjusted to a total or subtotal printing position the shaft 502 is rocked clockwise, as above stated, whereupon the pin 996 is moved in front of the forwardly extending end of the arm 480 and locks the latter against movement and hence locks the validating keys against operation while the total lever is in one of its total or subtotal printing positions.

For the purpose of preventing the simultaneous operation of a ticket seller's key and movement of the total lever into its positions for controlling the machine for printing a total or subtotal from the grand totalizer, the yoked member 971 (Figs. 27 and 27ᶜ) carries an arm 978 carrying a pin 979. It is obvious that if such means were not provided a ticket seller's key could be depressed partially so that its pin 514 would just enter the open end of the slot 524 in the plate 523 without moving the plate and then upon adjustment of the total lever into position to control the machine for printing a total or subtotal from the grand totalizer the plate 523 would be lowered and cause complete depression of the key because the slot 524 is curved. When the yoked member 971 is rocked clockwise, as hereinbefore stated, (Fig. 27) by the adjustment of the total lever to one of its extreme positions, in which it controls the machine for printing a total or subtotal from the grand totalizer, the pin 979 is lowered in front of the forward end of the forwardly extending portion of the arm 480, supporting the lower end of the detent 478 for the ticket sellers' keys, thereby preventing movement of the arm 480 and hence operation of a ticket seller's key. When a ticket seller's key is operated, the forwardly extending arm 480 is moved under the pin 979. It can, therefore, be seen that the arm 480 cannot be rocked at the same time that the pin 979 is lowered and hence a ticket seller's key cannot be operated and the total lever cannot be adjusted to its positions for controlling total and subtotal printing from the grand totalizer at the same time.

Recapitulation.

In order that the complete operation of the machine may be understood better, a résumé of its operation when a local ticket is to be issued will first briefly be given, then a résumé of its operation when a coupon ticket is validated will be given and finally its operation when a total or subtotal is to be printed will be described.

To operate the machine to issue a local ticket, the ticket seller inserts the proper destination device into the chute 109 (Figs. 5, 6, and 11) and operates the lever 134 to permit the inserted device to pass into the member 123 and permit the device employed at the last operation to pass out of the machine. Of course, if it is desired to print more than one ticket of the same class and for the same destination the inserted destination device is permitted to remain in the machine until after the last ticket is issued, the lever 134 being operated then to release the destination device.

The lever 298 (Figs. 6 and 13) may be adjusted to its one way or round trip position either before or after the lever 134 is operated, if the lever 298 is not already in the desired position. Movement of the lever 298 to its round trip position shifts the sleeve 308 to the right, through the medium of the shifting cam 305, and the arm 312 on the sleeve shifts the lever 293 in the same direction so that the roller 295 on the lever 293 projects into the cam groove 292 in the disk 291. Movement of the lever 298 to its one way position shifts the sleeve 308 to the left so that its arm 313 will shift the lever 293 to carry the roller 297 into the cam groove 290 in the disk 289. The electro 337 is shifted with the sleeve 308 by the arms 352 and 353 so that its one way or round trip printing surface will be in printing position in accordance to the position of the lever 298.

To release the local clutch and close the motor circuit the ticket seller only operates the ticket seller's key 54 assigned to him. Depression of this key moves the plate 523 (Fig. 27) downward to rock the horizontal arm of the lever 5061 away from in front of the stud 5062. The spring 534 immediately rocks the lever 529, (Figs. 34, 35, 36, and 39) shaft 186 and the arm 841 clockwise. When the shaft 186 is rocked in this manner, the rod 516 and stud 1000 (Figs. 22 and 26) are elevated to raise the rocking detents 510 for the amount and validating keys into locking position. As the rear curved edge of the lever 529 (Fig. 36) is moved down out of engagement with the arm 781 on the member 778 the spring 783 (Figs. 3 and 37) rocks the sleeve 772 counter clockwise and through the arm 776 and link 777 moves the member 778 forwardly into the position shown in Fig. 36. This movement of the sleeve 772 through the arm 771 raises the locking arm 747 for the local clutch out of locking position to permit the connection of the clutch members 740 and 732 (Fig. 4ᴰ) and the closing of the motor circuit. The motor through the local clutch, gears 764 and 765, shaft 766, bevel gears 767 and 768, sleeve 378 (Fig. 37) and the gearing, shown in Fig. 8, gives the main drive shaft 199 of the local printer one complete rotation and operates the feeding mechanism for the ticket strip 267.

Upon rotation of the shaft 199, the disk 198 (Fig. 5) rocks the lever 237 counter clockwise to raise the studs 226 on the arms 224 (Figs. 5 and 10) out of engagement with the notches 227 in the frame 118. The cam groove 197 (Fig. 5), through its coöperation with the roller 196, then rocks the lever 193 clockwise to move the rod 127 rearwardly in the slots 131 through the medium of the links 191 and 188 and the toggle links 128 and 130. This movement of the rod 127 rocks the frame 118 rearwardly to carry the inserted destination device into position to print on a ticket and control the differential mechanism for the totalizers. The spring 229, after the frame 118 is in its moved position, is permitted, because of the shape of the periphery of the cam disk 198, to move the arms 224 to normal position so that the studs 226 engage in the slots 228 in the frame 118 to aline the latter in its moved position.

During the rearward movement of the frame 118 the pin 217 (Fig. 5) on the link 188 engages the arm 216 (Fig. 10) and thereby rocks the pawl 211 so that the nose 213 of the latter engages the flange 215 (Fig. 15) on the arm 72 to add one on the printing counter of the inserted destination device.

The cam groove 264 (Fig. 12) formed in the disk 265, rocks the lever 262 counter clockwise near the beginning of the rotation of the shaft 199 and through the link 261 (Figs. 5, 10, and 12) rocks the ticket frame and the platen frame downward until the latter rests on the block 266, as shown in dotted lines in Fig. 10. The feed roll 333, the electro 337 and their coöperating impression rolls (Figs. 5 and 6) then feed the end of the ticket strip 267 over the platen 245, and the coacting knives 360 and 3400 sever the ticket from the strip. During the feeding of the strip the consecutive numbering device 341 (Fig. 6), the date wheels 346 (Figs. 2^A and 6) and the electro 337 print on the ticket. After the ticket is severed, the platen and ticket frames are raised and then the arms 269 are rocked once or twice to raise the platen frame past normal position to carry the ticket against the printing plate 96 and numbering device 60 of the inserted destination device. If the roller 295 projects into the cam groove 292 (Figs. 6 and 13) the arms 269 move the platen frame twice against the destination device and thereby print from the printing plate 96 and numbering device carried by the destination device, on both portions of a round trip ticket. If the roller 297 is in the cam groove 290 (Fig. 13) the arms 269 are operated but once so that but one impression from the plate 96 and numbering device 60 will be taken on a one way ticket.

The pawl 281 (Fig. 13) during the operation of the arms 269 operates the arm 276 to move a ticket into engagement with a lug 275 (Fig. 7) after the first impression is taken so that the ticket will be in position to receive a second impression, if it is to be a round trip ticket. When the rod 127 (Fig. 10) is moved forwardly in the slots 131 to normal position the frame 118 is rocked with it, as the frame is connected to the rod 127 by the hook 160. This movement of the frame 118 to normal position carries the lug 275 away from under the ticket to permit the latter to drop through the chute 153 out of the machine. The frame 118, rod 127, lever 193 and the connections between the rod 127 and the lever 193 (Fig. 5) are restored to normal position after the shaft 199 has been given one complete rotation by the coöperation of the roller 207 on the pitman 205 in the cam groove 208 formed in the disk 203. The disk 203 is fast on the shaft 204 which is driven by the motor through the validating clutch, the latter being rendered effective when the drive shaft 199 has been rotated 180°. The periphery of the disk 203 by its coöperation with the roller 239 on the lever 237 rocks the latter to raise the studs 226 out of the notches 228 in the frame 118. The cam groove 208 then restores the frame 118 to normal position and finally the spring 229 is permitted to restore the studs 226 into normal engagement with the notches 227.

The validating clutch is rendered effective when the drive shaft 199 for the local printer has been rotated 180° by movement of the roller 800 (Fig. 31) on the pitman 797 in the non-circular portion 801 of the cam groove 799, this portion being designed to operate the pitman 797 and thereby rock the lever 792 clockwise. This movement of the lever 792 raises the pawl 790 out of engagement with the arm 789 (Figs. 35, 36, and 37) to permit the spring 788 (Fig. 37) to rock the shaft 787 and thereby raise the arm 756 out of engagement with the disks 757 and 769 so that the motor circuit may be closed and the validating clutch may be rendered effective to drive the shaft 204 and through the gears 802, 543, and 803 (Figs. 3 and 34) disk 804, plate 806 and coupling lever 808 rotate the drive shaft 348 of the register.

The local clutch is disconnected near the end of the rotation of the disk 799 as the lever 792 and sleeve 793 are rocked still further clockwise by the coöperation of the non-circular portion 813 of the cam groove 799 with the roller 800 so that the stud 812 on the arm 811, fast to the sleeve 793, engages the finger 810 on the arm 771 to move the locking arm 747 (Figs. 3 and 37) slightly past normal and into locking position. As the arm 771 is fast on the sleeve 772 the latter together with the arms 776, 774 and the member 778 (Figs. 35 and 36) are moved also slightly past normal position with the arm 747 and the forward end of the pawl 815 then engages the block 814 on the lever 529 to prevent a second operation of the local clutch. When the lever 529 is restored to normal position near the end of the operation of the register the block 814 slides out of engagement with the end of the pawl 815 and the rear curved edge of the lever 529 moves into engagement with the end of the arm 781 on the member 778.

Near the end of the operation of the register the validating clutch is disconnected by the return of the locking arm 756 (Fig. 37) to normal locking position. Movement of this arm to locking position is effected by the engagement of the stud 823 (Fig. 34) on the disk 824 with the finger 822 on the arm 821 as this engagement causes the arm 821 to rock clockwise and through the engagement of the latter with the arm 820, fast on the shaft 787 rocks this shaft and the arm 747 to normal position. The disk 824 is moved one step in a clockwise direction by the arm 821, when the shaft 787 is rocked counter clockwise, to release the validating clutch. The disk 824 is restored to normal position to disconnect the validating clutch by the coöperation of the pawl 860 with the bottom ratchet tooth 873 on the disk 824. The pawl 860 is pivoted on the arm 862 and is operated by the cam groove 867 into which projects the roller 866 on the arm 863 which is connected to the pawl 860 by the slot and pin connection 864 and 865.

During the operation of the register the driving segments 401 (Fig. 22^A) are rocked clockwise over an arc of about 90° and through the latches 416, the actuators 404

(Fig. 22) for the amount banks are moved with their segments until their latches are disconnected at points determined by the depths of the holes 99 in the inserted destination device. Movement of the actuators 404, through the medium of the levers 426, links 427, arms 428, sleeves 429 (Fig. 22), arms 431 and links 434 (Figs. 5 and 6), impart their movement to the segment gears 436, to move the pairs of bars 444 and 447 downwardly. When a finger 475 on a bar 447 engages the bottom of its hole movement of the bar 447 is arrested and the companion bar 444 is given an additional step of movement. This additional step of movement of the bar 444 through the lever 449, link 455, and arm 457 is sufficient to rock the corresponding sleeve 460 slightly counter clockwise (Fig. 22). Thereupon the finger 462 on the collar 461 fast on the sleeve rocks the lever 464 and through the link 466 moves the lever 468 clockwise to carry its pin 470 into engagement with one of the teeth 421 on the plate 418. Movement of the plate 418 in this manner is arrested and the actuator moves slightly farther to disconnect the latch 416 from the driving segment 401 for the actuator. Before return movement of the actuators 404 to normal position is begun the selected ticket seller's totalizer and the grand totalizer are moved into engagement with the actuating teeth on the actuator by the mechanism shown in Figs. 23 and 28, so that the value of the ticket issued will be entered on the engaged totalizer. Upon return movement of the driving segment 401 to normal position the actuators 404, and therefore the segment gears 436 and the bars 444 and 447 are moved to normal position. After the fingers 475 have been raised out of the holes 99, the destination device and its carrying frame 118 are restored to normal position, as already stated.

The type wheels 438 and 441 (Fig. 29) are fast on the sleeves 437 carrying the segment gears 436 and therefore, are positioned differentially in accordance to the extent of movement of the actuators 404. While the type wheels are in their set positions the printer frame 627 (Figs. 29 and 30) is rocked clockwise so that the platen 625 carries the detail strip 440 against the series of type 622 to take an impression.

The operation of the machine to validate a coupon ticket will now be described. To effect this operation the ticket seller first places the coupon ticket on the table 670 (Fig. 29) in the validating printer, and depresses one of the validating keys. Depression of one of these keys swings the detent 478 (Figs. 26 and 27ᴅ) downwardly and through the engagement of the extension 499 on the arm 479 with the roller 500, swings the arms 497 and 545 (Figs. 22, 27ᴮ, and 27ᴅ) and the rod 496 downwardly to move the rod 496 away from locking engagement with the projections 495 (Fig. 22) on the arms 479 for the detents 478 for the amount key banks to permit depression of the amount keys. After the ticket seller has operated the amount keys, representing the fare to be charged for the ticket, he depresses his key in the ticket seller's key bank.

The shaft 186, lever 529 and arm 841 (Figs. 34 to 37) are rocked clockwise by the spring 534 (Fig. 35) upon depression of a ticket seller's key but the member 778 cannot be moved forwardly as the rear end of the lever 830 has been moved in front of the lug 851 on the member, when the validating key was depressed. This movement of the lever 830 is effected by the engagement of the pin 5049 (Fig. 26) on the arm 5050 with the side 5052 of the slot 5048 formed in the arm 5047 which is fastened by the yoke 5051 to the sleeve 829 carrying the lever 830.

As the rear end of the lever 830 has been moved out of its normal position in front of the lug 831 on the member 832, the spring 837 rocks the arm 836 and shaft 723 clockwise and rocks the member 832 counter clockwise through the medium of the link 835. In this way the stud 854, carried by the arm 853 fast on the shaft 723 rocks the pawl 790 to raise the forward end of the latter out of engagement with the arm 789 on the shaft 787. Thereupon the spring 788 (Fig. 37) rocks the shaft 787 to render the validating clutch effective and permit the closing of the motor circuit. The motor, through the validating clutch, the bevel gears 780 and 785, shaft 204 and the connections between the shafts 204 and 348 shown in Fig. 34 operates the shaft 348.

When the locking plates 510 (Fig. 22) are raised in the same manner as when a local ticket is issued the springs 507 rock the zero stop pawls 486 for the amount key banks into operative position. Depression of a validating key rocks the arm 5046 counter clockwise (Fig. 26) and the slot 5045 in the arm 5046 raises the plate 5041 to permit elevation of the rod 504 and therefore the rocking of the pawls 486 into operative position. Then when a key in an amount key bank is depressed the pawl 480 supporting the lower end of the detent 478 for that bank engages the pin 519 on the zero stop pawl 486 and moves the latter back into inoperative position.

As the local clutch has not been released a destination device is not in operative relation with the fingers 475 (Figs. 5 and 6) and the actuators 404 are controlled by the depressed amount keys which are engaged by the latches 416 to disconnect the actuators 404 from their driving segments 401. The operation of the totalizers during the operation of the machine to validate a coupon ticket is the same as when the machine is operated to issue a local ticket, the keys being employed to control the actuators when a coupon ticket is validated and the destination devices being employed to control the actuators when local tickets are issued.

As the zero stop pawl 487 for the validating key bank is moved out of normal operative position upon depression of a validating key, the differentially movable member 442 (Fig. 28) for the validating bank is moved to an extent determined by the key depressed, the key serving to disconnect the latch 416 from the driving segment 401. The roller 396 on the driving lever 395 carries the link 605 against the stub shaft 394 if the link is not already in engagement therewith and hence the movement of the member 442 is imparted to the disk 824 (Figs. 3 and 34) through the medium of the link 855 (Fig. 28), arm 856, sleeve 779 (Fig. 37), arm 857 and link 858 (Fig. 34).

Upon each rotation of the shaft 204 the pawl 860 is operated by the cam 867 to move the disk 824 one step counter clockwise (Fig. 34) toward normal position. During the last rotation of the shaft 204 the stud 823 on the disk 824 engages the arm 821 and rocks it clockwise. Thereupon the lug 859 on the arm 821 engages the forward edge of the member 832 and moves it rearwardly to normal position. At the same time that the member 832 is restored to normal position the spring 842 rocks the arm 841 upwardly so that the rear curved edge of the arm is again in front of the arm 839 on the member 832 to prevent operation of the member until the machine is again operated. The movement of the arm 821, through the engagement of this arm with the arm 820 rocks the shaft 787 counter clockwise to disconnect the validating clutch and break the motor circuit. When the shaft 787 is rocked in this way the spring 794 rocks the pawl 790 counter clockwise so that its forward end is returned into normal engagement with the rear edge of the arm 789 fast on the shaft 787 to retain the locking arm 756 for the validating clutch in locking position.

As the differential mechanism of the register is to be given but one cycle of operation at each operation of the machine the roller 809 (Fig. 34) is moved out of the notch 805 in the disk 804 near the end of the first rotation of the shaft 204. To accomplish this result the lever 891 is rocked counter clockwise and the stud 888 on the lever 889 pivoted on the lever 891 is carried into engagement with the outer end of the forwardly projecting arm of the coupling lever 808. The member 832 is fast on the sleeve 833 (Fig. 38) and the lever 883, also fast on the sleeve 833, is connected by the link 986 (Fig. 34) to the lever 891 so that when the member 832 is rocked forwardly upon depression of a validating key and a ticket seller's key the lever 891 is rocked counter clockwise. Near the beginning of the rotation of the shaft 348 the outer end of the forwardly extending arm of the coupling lever 808 is carried out of engagement with the stud 888 and the spring 894 rocks the lever 889 to move the stud 888 into the path of this arm. Near the end of the single rotation of the shaft 348 the arm on the lever 808 engages under the stud 888 and thereby the lever 808 is rocked counter clockwise about its pivot to carry the roller 809 out of the notch 805. The gear 803 which is loose on the shaft 348, continues to rotate but as the roller 809 is held out of engagement with the notch 805 until the stud 888 is moved away from over the arm on the lever 808, the shaft 348 will not continue to rotate with the gear 803. Near the end of the last rotation of the shaft 204 the member 832 is restored to normal position so that the stud 888 is carried away from engagement with the arm on the lever 808 to permit the spring 819 to rock the lever 808 and thereby reseat the roller 809 in the notch 805.

The differential movement of the actuators 404 and of the member 442 for the ticket seller's bank of keys is imparted to the type wheels 438 and 441 (Figs. 2 and 29) when a coupon ticket is to be validated in the same manner as when a destination device is employed to print on a local ticket. The printer frame 627 (Figs. 29 and 30) is rocked once by the cam groove 640 during the operation of the register when a coupon ticket is to be validated so that the impression roll 625 carries the detail strip 440 against the series of type 622.

As the arm 884 (Figs. 35 and 38) is fast on the shaft 429 and rigidly connected to the sleeve 833 by the pin 885 and arm 883 forward movement of the member 832, rocks the shaft 429 clockwise as viewed in Fig. 30. This movement of the shaft 429, through the medium of the arm 686, link 685, and arm 684, rocks the arm 683 counter clockwise. As the roller 682 on the arm 683 projects into the slot formed in the arm 678 by the prongs 680 and 681, the latter arm is rocked to move the prong 680 over the pawl 674 on the platen lever 672. When the printer frame 627 is rocked by the cam groove 640 the prong 680 operates the platen lever to take an impression on the back of the coupon 623 (Figs. 32 and 33) from the series of type 621 on the type wheels 433 and 441. As the printer frame 627 is rocked but once because the cam disk 641 is given but one rotation, but one impression will be made from the type wheels on the coupon ticket and on the detail strip 440.

Clockwise movement of the shaft 429 (Fig. 29) also raises the arm 722 and the link 721. The spring 718 rocks the lever 717, as the link 721 is elevated, to move the nose 726 on the rearwardly extending arm of the lever 717 behind the stud 724 on the arm 725. As the arm 725 is rigid with the arm 728 connected by the link 729 to the arm 634, the arm 725 is rocked clockwise when the printer frame is rocked from normal position by the cam groove 640. The stud 724 through its engagement with the nose 726 on the lever 717 rocks the latter counter clockwise until the stud passes out of engagement with the nose whereupon the spring 718 again rocks the lever 717 clockwise this time moving the nose in front of the flat side of the stud 724. When the arm 725 is rocked counter clockwise to normal position after the platen lever 672 has been operated the stud 724 moves the lever 717 and its supporting bar 716 (Figs. 29, 29ᴬ, and 29ᴮ) forwardly thereby extending the pairs of toggle links 712 and 713 to raise the impression rolls 702 and 703 into engagement with their coöperating feed rolls 689 and 692 respectively. It will be remembered that the feed roll 689 is fast on the shaft 204 and that rotation of the shaft 204 is imparted to the feed roll 692 by the intermeshing gears 699, 700, and 701. During the first rotation of the feed rolls their impression rolls are not in engagement with the feed rolls so that the coupon ticket will not be fed forwardly. As the impression rolls, however, are raised near the end of the first rotation of the feed rolls the ticket is fed forwardly the distance of one coupon 688 during each subsequent rotation of the feed rolls. As each of these coupons passes between the impression rolls and feed rolls the date devices 690 and 691 respectively, print the date of expiration and the date of issue upon the back of the coupon. Near the end of the last rotation of the shaft 204 the member 832 and therefore the shaft 429 are moved to normal position as already described, and the link 721 is thereby lowered to rock the lever 717 counter clockwise. In this manner the nose 726 is carried out of engagement with the flat side of the stud 724 and the impression rolls 702 and 703 and their supporting parts are moved downwardly to normal position by the force of gravity, which may be assisted by a spring.

For the purpose of reading or resetting a totalizer the total lever 57 (Fig. 1) is adjusted to the proper position and then a key in the ticket seller's bank is depressed if the total or subtotal is to be printed from a ticket seller's totalizer. If the total or subtotal is to be taken from the grand totalizer a ticket seller's key is not operated and the machine is released by the movement of the total lever as fully described hereinbefore. Movement of the total lever to a total or subtotal printing position rocks the bell crank lever 909 clockwise (Fig. 34) through the mechanism which is not shown or described herein but fully disclosed in the aforesaid Fuller patent. This movement of the lever 909, through the medium of the link 916 rocks the lever 830 counter clockwise to raise the rear end of the lever 830 in front of the lug 851 on the member 778. The pitman 923 is drawn forwardly at the same time to connect the disk 931 to the gear 543 by the plate 933, to move the roller 928 into the cam groove 930 and to rock the link 533 for the purpose of moving the portion 537 (Fig. 35) of the slot 536 in the link away from the roller 538. When the lever 909 is rocked by the positioning of the total lever the link 912 also is lowered to move the end hook 913 over the roller 888 to prevent movement of the latter into the path of movement of the forwardly extending arm of the lever 808 so that the roller 809 on the lever 808 is not raised out of the notch 805 in the disk 804 during a total or subtotal printing operation to permit the shaft 348 to be given two complete rotations so that the register will be given two cycles of operation.

During the first rotation of the shaft 348 the desired totalizer from which a total or subtotal is to be printed is moved into engagement with the actuators, after the latter have been stopped at zero position by the zero stop pawls. When the machine is released in total and subtotal printing operations the plate 5041 (Fig. 26) is raised by the rocking of the arm 5046 whereupon the zero stop pawls 486 for the amount key banks are moved into operative position the lower end of the plate 5041 being raised out of engagement with the rod 504 (Figs. 22, 26, and 27ᶜ). When the shaft 502 is rocked clockwise (Figs. 26, 27ᶜ, and 34) by the cam groove 930 (Fig. 34) the pin 981 on the arm 980 fast on the shaft 502 rocks the arms 505 and rod 504 clockwise to normal position to move the zero stop pawls 478 out of operative position before the actuators begin their upstroke during the second rotation of the shaft 348. During the second rotation of the drive 348 the totalizer pinions are rotated backwardly by the actuators and when the totalizer pinions arrive at zero position their long teeth 592 (Fig. 22) engage the levers 593 and through the links 596 and 598 and the arms 594 move the pins 595 into engagement with the teeth 420 and 421 on the plate 418 to disconnect the actuator from its driving segment 401.

If a total is printed from a totalizer the totalizer is disengaged from the actuators after the driving segments 401 have reached the limit of their clockwise movement (Fig. 22) during the second rotation of the shaft 348 and before the driving segments begin their return movement to normal position thereby leaving the totalizer wheels in zero position. If a subtotal is printed the totalizer is not disengaged from the actuators until after the actuators have been restored to zero position thereby restoring the totalizer wheels to the positions in which they were at the beginning of the operation of the machine. As already stated the means controlling, in total and subtotal printing operations, the mechanism, shown in Fig. 28 for engaging and disengaging the totalizer is not shown or described herein, but reference may be had to the aforesaid Fuller patent for a complete description of the same.

As the actuators 404 are disconnected at zero positions from their driving segments 401 during the first rotation of the shaft 348 in total and subtotal printing operations the type wheels 438, when the printer frame 627 (Fig. 30) is rocked the first time will only print zeros on the detail strip 440. During the second operation of the register the type wheels are differentially positioned by the actuators, as controlled by the totalizer from which the total or subtotal is taken, so that the amount standing on the totalizer at the beginning of the operation will be printed on the record strip 440 when the printer frame is operated during the second rotation of the shaft 348.

Near the end of the first rotation of the shafts 204 and 348, the disk 824 (Fig. 34) is moved counter clockwise to normal position and moves the member 832 and correlated parts to normal position. However, as the arm 841 is not moved in front of the arm 839 on the member 832 until near the end of the second rotation of the shafts, the member 832 is rocked forwardly again when the pawl 860 is disengaged from the bottom ratchet tooth 873 on the disk to permit the motor to give the shafts a second rotation. The arm 841 is not restored to normal position near the end of the first rotation of the shafts as the roller 538 (Fig. 35) which is on the arm 539 operated by the cam groove 542 (Fig. 34) is at this time in engagement with the rear end of the slot 536 in the link 533 so that the roller 538 moves idly in the slot. During the second rotation of the shafts, however, the link 533 is rocked slightly forward by the pitman 923 so that when the arm 539 is operated the second time the roller 538 engages the shoulder 945 (Fig. 35) in the slot 536 and thereby moves the link 533 downwardly to restore the shaft 186 and lever 529 to normal position. Then when the member 832 is restored to normal position near the end of the second operation of the register the spring 842 rocks the arm 841 in front of the arm 839 on the member 832 to prevent the arm from again moving forward, so that the validating clutch locking arm 756 is retained in locking position.

While the form of mechanism herein shown and described, is admirably adapted to fulfil the objects primarily stated, it is to be understood that it is not intended to confine the invention to the one form of embodiment herein disclosed; for it is susceptible of embodiment in various forms all coming within the scope of the claims which follow.

What is claimed is,—

1. In a machine of the class described, the combination with a plurality of destination devices carrying type to print on one style of ticket and employed only when tickets of that style are to be issued, of adjustable printing means controlled by said destination devices when tickets of the one style are issued, and manipulative means employed when another style of ticket is to be issued and constructed to control said printing means for printing on the last mentioned style of ticket.

2. In a machine of the class described, the combination with a printing mechanism, of a plurality of destination devices adapted to coöperate with said printing mechanism to effect the printing of one style of ticket and employed only when tickets of that style are to be issued, adjustable printing mechanism for printing on a record strip and controlled by said destination devices when tickets of the one style are issued, printing mechanism for issuing tickets of another style, and manipulative means for controlling said adjustable printing means when the last mentioned printing mechanism is employed to issue a ticket of the last mentioned style.

3. In a machine of the class described, the combination with an adjustable printing means, of manipulative means and destination devices for controlling said printing means, and devices preventing use of both the manipulative devices and a destination device at the same operation of the machine.

4. In a machine of the class described, the combination with adjustable printing means, of a set of actuators therefor, manipulative means and destination devices for controlling said set of actuators, and interlocking mechanism preventing control of the actuators by both the manipulative means and a destination device at the same operation of the machine.

5. In a machine of the class described, the combination with adjustable printing means, of a set of actuators therefor, means for positively actuating the actuators, manipulative means and destination devices for controlling said set of actuators, and interlocking mechanism preventing control of the actuators by both the manipulative means and a destination device at the same operation of the machine.

6. In a machine of the class described, the combination with adjustable printing means, of a single set of actuators therefor, manipulative means and destination devices for controlling said set of actuators, and means whereby the manipulative and destination devices must be separately and independently employed for said purpose.

7. In a machine of the class described, the combination with a main operating mechanism, of adjustable printing means, a set of actuators therefor, operated by the operating mechanism, manipulative means and destination devices for predetermining the extent of movement of the actuators, and devices preventing use of both the manipulative means and a destination device at the same operation of the machine.

8. In a machine of the class described, the combination with a main operating mechanism, of adjustable printing means, actuating mechanism for the printing means operated by the operating mechanism, manipulative means and destination devices for predetermining the extent of movement of the actuating mechanism, and interlocking mechanism preventing use of both the manipulative means and a destination device at the same operation of the machine.

9. In a machine of the class described, the combination with a plurality of destination devices adapted to print on one style of ticket and employed only when tickets of that style are to be issued, of adjustable printing means for printing on another style of ticket and record material, controlled by said destination devices when tickets of the one style are issued, manipulative means for controlling said adjustable printing means when the latter is employed to print on the second mentioned style of ticket, impression means operable when either the destination devices or the manipulative means are employed for taking an impression on record material from said printing means, impression means operable only when said manipulative means are employed to take an impression from the printing means on the second mentioned style of ticket, means for operating the two impression means and means controlling said operating means so that the latter operates one or both impression means as described.

10. In a machine of the class described, the combination with a main operating mechanism, of adjustable printing means, two separably employed independent classes of means for controlling said printing means, two impression devices, operating means for said impression devices, and means for controlling said operating means so that one impression device is operated when means of either class is employed, and so that the other impression means is operated only when means of one particular class is employed.

11. In a machine of the class described, the combination with a plurality of destination devices, of a printing mechanism for coöperating therewith to issue local tickets, a second printing mechanism for issuing coupon tickets and adapted to receive a varying number of cycles of operation dependent on the number of coupons in the coupon ticket to be issued, operating means common to the two printing mechanisms, and manipulative means for rendering said operating means effective to operate one or the other of the printing mechanisms as desired.

12. In a machine of the class described, the combination with a plurality of destination devices, of a printing mechanism for coöperating therewith to issue local tickets, a second printing mechanism for issuing coupon tickets and adapted to receive a varying number of cycles of operation dependent upon the number of coupons in the coupon ticket to be issued, operating means common to the two printing mechanisms, manipulative means for controlling the number of cycles of operation of the second printing mechanism, other manipulative means and means controlled by the operation of the last mentioned manipulative means for rendering the operating means effective to operate only the first mentioned printing mechanism when the first mentioned manipulative means is not operated and to render the operating means effective to operate only the said second printing mechanism when both of said manipulative means are operated.

13. In a machine of the class described, the combination with a plurality of destination devices, of a printing mechanism for coöperating therewith to issue local tickets, a second printing mechanism for issuing coupon tickets and adapted to receive a varying number of cycles of operation dependent upon the number of coupons in the coupon ticket to be issued, operating mechanism common to the two printing mechanisms, a group of keys for controlling the number of cycles of operation of the second printing mechanism, and a group of keys and connections so constructed that operation of any one of the last mentioned group of keys renders the operating mechanism effective to operate only the first mentioned printing mechanism when no key in the first mentioned group is operated, and so that operation of any one of the last mentioned keys renders the operating mechanism effective to operate said second printing mechanism when a key in the first mentioned group is also operated.

14. In a machine of the class described, the combination with a plurality of destination devices, of a printing device for coöperating therewith to issue local tickets, a second printing device for issuing coupon tickets and capable of having a varying number of cycles of operation, operating means common to said printing devices, manipulative means and connections for rendering said operating means effective to give the first mentioned printing device one cycle of operation, and manipulative means and connections controlling the rendering of the operating means effective to operate said second printing device and for controlling the number of cycles of operations of the second printing device dependent on the number of coupons in the coupon ticket to be issued.

15. In a machine of the class described, the combination with an adjustable electro for printing one or two portions of a ticket, of a plurality of destination devices for printing on the tickets, a platen for coöperating with said destination device, means for operating said platen to print from the destination devices on one or both portions of a ticket, and means for adjusting said electro to prepare it for printing on one or both portions of a ticket as desired and for preparing said platen operating means for operating said platen to print from the destination devices on one or both portions of the tickets in accordance to the position of the electro.

16. In a machine of the class described, the combination with an operating mechanism, of an adjustable electro having a plurality of printing surfaces for making a varying number of impressions on tickets at a single operation of the machine, a plurality of destination devices for printing on the tickets printed by said electro, a platen for carrying said tickets against said destination devices, means operated by the operating mechanism for operating said platen a number of times in accordance with the position of the electro, and means for adjusting said electro and for preparing said platen for operation in accordance to the position of the electro.

17. In a machine of the class described, the combination with an operating mechanism, of an adjustable electro for making one or two impressions at a single operation of the operating mechanism, a plurality of normally detached destination devices separably insertible into the machine for printing the place of destination with each impression made by the electro, a platen for coöperating with said destination devices when in the machine, means for operating the platen to make one or two impressions from the inserted destination device, and means for adjusting said electro to prepare it for making one or two impressions and for preparing said operating means for the platen to operate the platen once or twice in accordance to the number of impressions to be made by the electro.

18. In a machine of the class described, the combination with an operating mechanism, of an adjustable electro for making one or two impressions at a single operation, destination devices for printing the place of destination with each impression made by the electro, a platen for coöperating with said destination devices, means for actuating the platen, two cams, one for operating the actuating means once, and the other for operating the actuating means twice, an arm connecting either one of said cams with the actuating means, and means for adjusting the electro to prepare it for making one or two impressions and for connecting said actuating means with the cam for operating the platen in accordance to the number of impressions made by the electro.

19. In a machine of the class described, the combination with a main operating mechanism, of an adjustable electro for making one or two impressions, a plurality of normally detached destination devices separably insertible into the machine for printing the names of the stations with the impressions made by the electro, a movable frame normally in position to receive one of said destination devices, a platen for coöperating with said destination devices, means for operating the platen to make one or two impressions from the inserted destination device, means for adjusting said electro and preparing said operating means for the platen for making one or two impressions, and means, operated by the main operating mechanism, for moving said movable frame for the purpose of carrying the inserted destination device into printing relationship with said platen.

20. In a machine of the class described, the combination with a main operating mechanism, of an adjustable electro for making one or two impressions, destination devices each provided with one set of type for printing the destination and a consecutive numbering device, a platen for coöperating with said destination device, means for operating said platen once or twice to print the place of destination and the consecutive number with the impression or impressions made by the electro, and means for adjusting said electro and preparing said operating means for the platen to make one or two impressions from one of the destination devices as desired in accordance to the position of the electro.

21. In a machine of the class described, the combination with operating mechanism, of an adjustable electro for making one or two impressions, a plurality of destination devices for printing the names of stations with the impressions made by the electro, a platen for coöperating with said destination devices, means for operating said platen to make one or two impressions from the destination devices, a cam for adjusting said electro to prepare it for making one or two impressions and for preparing the operating means for the platen to operate the latter in accordance to the number of impressions to be made by the electro, and manipulative means for adjusting said cam.

22. In a machine of the class described, the combination with operating mechanism, of an adjustable electro for making one or two impressions at a single operation of the machine, a plurality of normally detached destination devices separately insertible into the machine for printing the place of destination with the impressions made by the electro, a platen for coöperating with said destination devices when in the machine, means for operating the platen to make one or two impressions from the inserted destination devices and means for adjusting said electro to prepare it for making one or two impressions and for preparing said operating means for the platen to operate the platen once or twice in accordance to the number of impressions to be made by the electro, and means for locking said adjusting means against operation during the operation of the machine.

23. In a machine of the class described, the combination with a main operating mechanism, of an adjustable electro for making one or two impressions, a plurality of normally detached destination devices separably insertible into the machine for printing the names of the stations with the impressions made by the electro, a movable frame, normally in position to receive one of said destination devices, a platen for coöperating with said destination devices, means for operating the platen to make one or two impressions from the inserted destination devices, means for adjusting said electro and preparing said operating means for the platen for making one or two impressions from the inserted destination device, means operated by the main operating mechanism for moving said moving frame for the purpose of carrying the inserted destination device into printing relationship with said platen, and means for locking said manipulative means against operation during the operation of the operating mechanism.

24. In a machine of the class described, the combination with a main operating mechanism, of an adjustable electro for printing a one way or a round trip ticket, destination devices provided with one set of type for printing the place of destination on the one way tickets or on the two portions of round trip tickets, a platen for carrying the ticket once or twice against the type of the destination devices, means for adjusting the electro and preparing the platen for the desired operation, and means for moving the tickets on the platen after an impression is made from the destination devices on one portion of round trip tickets so that the other portion will be in position to receive an impression.

25. In a machine of the class described, the combination with a main operating mechanism, of an adjustable electro for printing a one way or a round trip ticket, destination devices, each provided with a consecutive numbering device and a printing block for printing the place of destination and the consecutive number on the tickets, a platen adapted to be operated twice for carrying the round trip tickets against the destination devices employed, and means for moving the tickets after they have been carried by the platen once against the destination devices to print on one portion of the round trip tickets so that the other portion of the tickets will receive impressions at the second operation of the platen.

26. In a machine of the class described, the combination with a plurality of normally detached destination devices separately insertible into the machine, of a chute in the machine for receiving one destination device at a time, means normally preventing the previously inserted destination device from passing out of the machine and for preventing the destination device to be next employed from entering said chute, and a device for moving said means out of preventing position.

27. In a machine of the class described, the combination with a main operating mechanism, of normally detached destination devices, separately insertible into the machine. means normally preventing insertion of the device into the machine, and manipulative means for operating said preventing means to permit insertion of a destination device.

28. In a machine of the class described, the combination with a plurality of normally detached destination devices separately insertible into the machine, of a frame for carrying the inserted destination device, a chute leading to said frame, means retaining the previously inserted destination device in said frame, means normally preventing the insertion of a destination device into said frame, and a manipulative device for operating said retaining and preventing means to release the previously inserted destination device and permit the insertion of another destination device.

29. In a machine of the class described, the combination with a plurality of normally detached destination devices separately insertible into the machine, of a frame for carrying the inserted destination device, a chute leading to said frame, means for retaining the previously inserted destination device in said frame, means normally preventing the insertion of a destination device into said chute, a device for operating said retaining means and preventive means to release the previously inserted destination device and to permit the insertion of another destination device into the chute, and means moved by said operating device into the path of the destination device last inserted in the chute to prevent its movement into said frame before said retaining means is returned to retaining position.

30. In a machine of the class described, the combination with a plurality of normally detached destination devices separately insertible into the machine, of a frame for carrying the inserted destination device, a chute leading to said frame, a bar for retaining the inserted destination device in said frame, a movable plate for moving said bar out of retaining position, a member having a slot, a pin on said plate operating in said slot, and a manipulative device having a projection normally preventing the insertion of a destination device into said chute and constructed to operate said plate so that the bar is moved out of and back into retaining position and so that said member is moved into the path of the destination device inserted in the chute so that the destination device will not enter said frame before the bar is returned to retaining position.

31. In a machine of the class described, the combination with an operating mechanism, of a plurality of normally detached destination devices separately insertible into the machine, a chute in the machine for receiving one destination device at a time, means normally preventing the insertion into or the passage out of the chute of a destination device, manipulative means for operating said preventive means to permit the insertion into or passage out of the chute of a destination device preliminarily to the operation of the operating mechanism, and means controlled by the operating mechanism for preventing operation of the manipulative means during an operation of the operating mechanism.

32. In a machine of the class described, the combination with a plurality of normally detached destination devices separately insertible into the machine, of an operating mechanism, a frame for carrying the inserted destination device, a chute leading to said frame, means for retaining the previously inserted destination device in said frame, means normally preventing the insertion of a destination device into said chute, a manipulative device for operating said retaining means and preventive means to release the previously inserted destination device and to permit the insertion of another destination device into the chute, means moved by said manipulative device into the path of the destination device last inserted in the chute to prevent its movement into said frame until after said retaining means is returned to retaining position, and means for locking the manipulative device against operation during the operation of the operating mechanism.

33. In a machine of the class described, the combination with a plurality of normally detached destination devices separately insertible into the machine, of an operating mechanism, a frame for carrying the inserted destination device, a chute leading to said frame, a bar for retaining the inserted destination device in said frame, a movable plate for moving said bar out of retaining position, a member having a slot, a pin on said plate operating in said slot, a manipulative device having a projection normally preventing the insertion of a destination device into said chute and constructed to operate said plate so that the bar is moved out of and back into retaining position and so that said member is moved into the path of the destination device inserted in the chute so that the destination device will not enter said frame before the bar is returned to retaining position, and a member moved into the path of movement of said plate to prevent operation of the manipulative device during operation of the operating mechanism.

34. In a machine of the class described, the combination with a main operating mechanism, of a plurality of normally detached destination devices, insertible into the machine for printing on tickets, a platen for carrying tickets against the inserted destination devices once or twice as desired for printing one way or round trip tickets, means for operating said platen, and a device for controlling said platen operating means to cause it to operate the platen once or twice.

35. In a machine of the class described, the combination with a main operating mechanism, of a plurality of normally detached destination devices, insertible into the machine for printing on tickets, a platen for carrying the tickets against the inserted destination devices once or twice as desired, for printing on one way or round trip tickets, means for operating said platen, a device for controlling said platen operating means to cause it to operate the platen once or twice, and means for moving the tickets after one impression has been made thereon so that they are in position to receive a second impression.

36. In a machine of the class described, the combination with a main operating mechanism, of a plurality of normally detached destination devices, separately insertible into the machine for printing on tickets, a platen for carrying a ticket against the inserted destination device once or twice as desired for printing on a one way or round trip ticket, means operated by the operating mechanism for moving said platen, and a device operable preliminarily to the operating mechanism for preparing said platen moving means for moving the platen once or twice as desired.

37. In a machine of the class described, the combination with a main operating mechanism, of a plurality of normally detached destination devices separately insertible into the machine for printing on tickets, a platen for carrying a ticket against the inserted destination device once or twice as desired for printing on a one way or round trip ticket, means operated by the operating mechanism for moving said platen, a device operable preliminarily to the operating mechanism for preparing said platen moving means for moving the platen once or twice as desired, and means for preventing the operation of said device during the operation of the machine.

38. In a machine of the class described, the combination with a main operating mechanism, of a plurality of normally detached destination devices separately insertible into the machine for printing on tickets, a platen, two cams for operating the platen once or twice to carry the tickets once or twice against the inserted destination device, and means for rendering one or the other of said cams effective for operating said platen.

39. In a machine of the class described, the combination with a main operating mechanism, of a plurality of normally detached destination devices separately insertible into the machine for printing on tickets, a platen, two cams for operating the platen once or twice to carry the tickets once or twice against the inserted destination device, means for rendering one or the other of said cams effective for operating said platen, and means for moving the ticket after one impression has been taken so that it is in position to receive a second impression.

40. In a machine of the class described, the combination with a plurality of normally detached destination devices separately insertible into the machine for printing on tickets, of a frame in the machine for receiving a destination device, means for moving the frame so that the destination device carried thereby is in printing position, a platen for carrying the ticket, means for operating said platen, and a device for controlling the operation of said platen operating means so that the platen may carry the ticket once or twice against the destination device to print on a one way or round trip ticket.

41. In a machine of the class described, the combination with a plurality of normally detached destination devices separately insertible into the machine for printing on tickets, of a frame in the machine for receiving a destination device, means for moving the frame so that the destination device carried thereby is in printing position, a platen for carrying a ticket, means for moving the platen to carry a ticket into printing relationship with the inserted destination device, and independent means for then operating the platen to carry the ticket against the destination device to print the place of destination on the ticket.

42. In a machine of the class described, the combination with a plurality of normally detached destination devices separately insertible into the machine for printing on tickets, of a frame in the machine for receiving a destination device, means for moving the frame so that the destination device carried thereby is in printing position, a platen for carrying a ticket, means for moving the platen so that the ticket is in printing relationship with the inserted destination device, independent means for then operating the platen to carry the ticket against the destination device to print the place of destination on the ticket, and a device for controlling said independent means so that the latter may operate the platen once or twice to carry the ticket once or twice against the inserted destination device.

43. In a machine of the class described, the combination with a plurality of normally detached destination devices, of a main operating mechanism, a frame for receiving any one of the destination devices and movable into printing position during the operation of the machine, a platen for carrying a ticket and movable into printing relationship with the destination device in said frame, means for actuating the platen after it has been moved into printing relationship to carry the ticket against the destination device to print the place of destination on the ticket, and means for alining the frame in printing position during the printing movement of said platen.

44. In a machine of the class described, the combination with a plurality of normally detached destination devices, of a main operating mechanism, a frame for receiving an inserted destination device and movable into printing position during the operation of the machine, a platen for carrying a ticket and movable in printing relationship with the destination device in said frame, means for actuating the platen after it has been moved into printing relationship to carry the ticket against the destination device to print the place of destination on the ticket, and means for alining said frame in normal position and in printing position.

45. In a machine of the class described, the combination with a plurality of destination devices, of a platen for carrying a ticket against a destination device to print the destination on a ticket, means for feeding the ticket from a ticket roll to said platen, a severing mechanism for severing the ticket from the roll after it has been fed to said platen, and operating means for moving the platen into position to receive the ticket and for then carrying the platen against the destination device.

46. In a machine of the class described, the combination with two printing mechanisms, of setting elements of different classes, and connections controlled by the latter whereby both of said mechanisms are operated when elements of certain of said classes are operated and only one of said mechanisms is operated when elements of all of said classes are operated.

47. In a machine of the class described, the combination with two printing mechanisms, of a plurality of groups of manipulative devices, and means controlled by the manipulative devices whereby both of the printing mechanisms may be operated when manipulative devices of one group are employed, or only one of said mechanisms operated when manipulative devices in each group are employed.

48. In a machine of the class described, the combination with printing means for printing on tickets, of impression means comprising two relatively movable parts, and means for operating the two parts of said impression means to receive and clamp a ticket between the parts, then carry the ticket against the printing means and finally release the ticket.

49. In a machine of the class described, the combination with a ticket feeding device, of printing means, impression means comprising two relatively movable frames adapted to receive a ticket from the feeding device, but normally out of receiving position, and mechanism for operating the impression means first to move the latter into receiving position, then clamp the ticket between the frames and carry it against the printing means and finally separate the frames to release the ticket.

50. In a machine of the class described, the combination with a main operating mechanism, of printing means adapted to print on tickets, impression means comprising two relatively movable frames adapted to receive a ticket, and means constructed to operate the two relatively movable frames so that they successively grip the ticket carry it against the printing means, and permit movement of the same therebetween a plurality of times during an operation of the machine.

51. In a machine of the class described, the combination with a main operating mechanism, of printing means adapted to print on tickets, impression means comprising two relatively movable frames adapted to receive a ticket, and means constructed to operate the two relatively movable frames so that they successively grip the ticket, carry it against the printing means, and permit movement of the same therebetween a varying number of times during an operation of the machine.

52. In a machine of the class described, the combination with a main operating mechanism, of a feeding device for tickets, printing means adapted to print on the tickets, impression means comprising two relatively movable frames adapted to receive a ticket therebetween but normally out of receiving position, and means constructed to operate the two relatively movable frames so that the latter are moved into receiving position and then successively grip the ticket, move it against the printing means and permit movement of the same therebetween a plurality of times during an operation of the machine.

53. In a machine of the class described, the combination with a main operating mechanism, of a feeding device for tickets, printing means adapted to print on the tickets, impression means comprising two relatively movable frames adapted to receive a ticket therebetween but normally out of receiving position, means constructed to operate the two relatively movable frames so that the latter are moved into receiving position and then successively grip the ticket, move it against the printing means and permit movement of the same therebetween a varying number of times during an operation of the machine, and devices for controlling said means.

54. In a machine of the class described, the combination with a main operating mechanism, of printing means adapted to print on tickets, impression means comprising two relatively movable frames adapted to receive a ticket, means constructed to operate the two relatively movable frames so that they successively grip the ticket, carry it against the printing means, and permit movement of the same therebetween a varying number of times during an operation of the machine, and manipulative means for determining the number of times the tickets are to be carried against the printing means.

55. In a machine of the class described, the combination with a main operating mechanism, of a feeding device for tickets, printing means adapted to print on the tickets, impression means comprising two relatively movable frames adapted to receive a ticket therebetween but normally out of receiving position, means constructed to operate the two relatively movable frames so that the latter are moved into receiving position and then successively grip the ticket, move it against the printing means, and permit movement of the same therebetween a plurality of times during an operation of the machine, and manipulative means for determining the number of times a ticket is to be moved against the printing means.

56. In a machine of the class described, the combination with a main operating mechanism, of printing means adapted to print on tickets, impression means comprising two relatively movable frames adapted to receive a ticket, means constructed to operate the two relatively movable frames so that they successively grip the ticket, carry it against the printing means, and permit movement of the same therebetween a plurality of times during an operation of the machine, and means for insuring movement of the ticket after the first impression has been made thereon.

57. In a machine of the class described, the combination with a main operating mechanism, of printing means adapted to print on tickets, impression means comprising two relatively movable frames adapted to receive a ticket, means constructed to operate the two relatively movable frames so that they successively grip the ticket, carry it against the printing means and permit movement of the same therebetween a varying number of times during an operation of the machine, and means insuring movement of the ticket between impressions.

58. In a machine of the class described, the combination with a ticket feeding device, of printing means, impression means comprising two relatively movable frames adapted to receive a ticket from the feeding device, but normally out of receiving position, mechanism for operating the impression means first to move the latter into receiving position, then clamp the ticket between the frames and carry it against the printing means and finally separate the frames to release the ticket, and means for insuring movement of the ticket after an impression is made thereon.

59. In a machine of the class described, the combination with a printing mechanism, of impression means including two relatively movable parts, means for operating said parts so that they grip and carry the ticket once or twice against the printing means to take one or two impressions the parts being separated after each impression to permit movement of the ticket by gravity, and manipulative means for predetermining the number of impressions to be made on the ticket.

60. In a machine of the class described, the combination with a printing mechanism, of impression means including two relatively movable parts, means for operating said parts so that they grip and carry the ticket once or twice against the printing means to take one or two impressions, the parts being separated after each impression to permit movement of the ticket by gravity, and means insuring movement of the ticket after the single or first impression is made thereon.

61. In a machine of the class described, the combination with a platen, of operating means, means for operating the platen twice for making two impressions on the ticket, means for retaining the ticket in position to be printed upon and adapted to permit movement of the ticket by gravity between impressions, and means for engaging said ticket after the first impression to move the ticket if the ticket has not been moved already by gravity.

62. In a machine of the class described, the combination with printing means for printing on tickets, of impression means including two relatively movable parts, and means for operating said parts so that they grip and carry the ticket against the printing means to take two impressions the parts being separated after each impression to permit movement of the ticket by gravity.

63. In a machine of the class described, the combination with printing means for printing on tickets, of impression means including two relatively movable parts, means for operating said parts so that they grip and carry the ticket against the printing means to take two impressions the parts being separated after each impression to permit movement of the ticket by gravity, and stop means for engaging and limiting movement of the ticket by gravity said operating means being constructed to move the impression means so that a ticket is moved out of engagement with the stop means to permit movement of the ticket.

64. In a machine of the class described, the combination with a main operating mechanism, of printing mechanism including a manually adjustable electro, and means whereby adjustment of the electro actuates means for preventing operation of the operating mechanism during the manual adjustment of the electro.

65. In a machine of the class described, the combination with a main operating mechanism, of printing mechanism including a manually adjustable electro, and means movable independently of the operating mechanism for preventing adjustment of the electro during the operation of the operating mechanism.

66. In a machine of the class described, the combination with a main operating mechanism, of printing mechanism including a manually adjustable electro, and means movable independently of the operating mechanism for preventing operation of the operating mechanism during the manual adjustment of the electro and for preventing manual adjustment of the electro during the operation of the operating mechanism.

67. In a machine of the class described, the combination with a main operating mechanism, of a printing mechanism including impression means capable of a variable number of operations upon different operations of the machine, a manually adjustable lever for determining the number of operations of the impression means, and means for locking the lever against adjustment during the operation of the machine.

68. In a machine of the class described, the combination with a main operating mechanism, of printing mechanism, including impression means capable of a variable number of operations upon different operations of the machine, a manually adjustable lever for determining the number of operations of the impression means, and means for locking the machine against operation during the manual adjustment of the lever.

69. In a machine of the class described, the combination with a main operating mechanism, of operating mechanism including impression means capable of having a variable number of operations upon different operations of the machine, a manually adjustable lever for determining the number of operations of the impression means, and means for locking the lever against adjustment during the operation of the operating mechanism and for locking the operating mechanism against operation during the adjustment of the lever.

70. In a machine of the class described, the combination with a main operating mechanism, of a plurality of normally detached destination devices separably insertible into the machine, means normally preventing the previously inserted destination device from passing out of the machine and for preventing the destination device to be employed next from entering the machine, a manipulative device for moving said means out of preventing position, and means preventing operation of said manipulative device during the operation of the operating mechanism.

71. In a machine of the class described, the combination with a main operating mechanism, of a plurality of normally detached destination devices separably insertible into the machine, means normally preventing the previously inserted destination device from passing out of the machine and for preventing the destination device to be employed next from entering the machine, a manipulative device for moving said means out of preventing position, and means preventing operation of the operating mechanism during the adjustment of said manipulative device.

72. In a machine of the class described, the combination with a main operating mechanism, of a plurality of normally detached destination devices separably insertible into the machine, means normally preventing the previously inserted destination device from passing out of the machine and for preventing the destination device to be employed next from entering the machine, a manipulative device for moving said means out of preventing position, and means preventing operation of the operating mechanism during the adjustment of said manipulative device and for preventing operation of the manipulative device during the operation of the operating mechanism.

73. In a machine of the class described, the combination with a main operating mechanism, of normally detached destination devices separably insertible into the machine, means normally preventing insertion of a destination device into the machine, a manipulative device for operating said preventing means to permit insertion of a destination device, and means for preventing operation of said manipulative device during the operation of the machine.

74. In a machine of the class described, the combination with a main operating mechanism, of normally detached destination devices separably insertible into the machine, means normally preventing insertion of a destination device into the machine, a manipulative device for operating said preventing means to permit insertion of a destination device, and means preventing operation of the machine during the operation of the manipulative device.

75. In a machine of the class described, the combination with a main operating mechanism, of normally detached destination devices separably insertible into the machine, means normally preventing insertion of a destination device into the machine, a manipulative device for operating said preventing means to permit insertion of a destination device, and means preventing operation of the machine during the operation of the manipulative device and preventing operation of the manipulative device during the operation of the machine.

76. In a machine of the class described, the combination with a main operating mechanism adapted to have a varying number of cycles of movement upon different operations of said mechanism, of printing mechanism operated by the operating mechanism and including impression means, and means operated by the operating mechanism for operating the impression means during only the first cycle of movement of the operating mechanism.

77. In a machine of the class described, the combination with a main operating mechanism adapted to have a plurality of cycles of movement upon different operations of said mechanism, of printing mechanism operated by the operating mechanism and including impression means, and means operated by the operating mechanism for operating the impression means during only the first cycle of movement of the operating mechanism.

78. In a machine of the class described, the combination with a main operating mechanism adapted to have a varying number of cycles of operation upon different operations of the machine, of printing mechanism operated by the operating mechanism and including impression means, means operated by the operating mechanism for operating the impression means during only the first cycle of operation of the operating mechanism, and manipulative means for determining the number of cycles of operation of the machine.

79. In a machine of the class described, the combination with a main operating mechanism, adapted to have a plurality of cycles of operations, of printing mechanism operated by the operating mechanism and including a platen, a member for operating said platen, and means controlling said member so that it operates the platen during only the first cycle of operation of the operating mechanism.

80. In a machine of the class described, the combination with a main operating mechanism, adapted to have a varying number of cycles of operations upon different operations of the machine, of printing mechanism operated by the operating mechanism a varying number of times and including a platen, a member for operating said platen, and means controlling said member so that the latter operates the platen during only the first cycle of operation of the operating mechanism.

81. In a machine of the class described, the combination with a main operating mechanism adapted to have a varying number of cycles of operation upon different operations of the machine, of two impression means, one of which is operated a varying number of times by the operating mechanism, means including a clutch and operated by the main operating mechanism for operating the other impression means, and means for disabling said clutch during the first cycle of operation of the operating mechanism so that the last mentioned impression means is operated but once during each operation of the machine.

82. In a machine of the class described, the combination with a main operating mechanism adapted to have a varying number of cycles of operation upon different operations of the machine, of two impression means, one of which is operated a varying number of times by the operating mechanism, means including a clutch and operated by the main operating mechanism for operating the other impression means, means for disabling said clutch during the first cycle of operation of the operating mechanism so that the last mentioned impression means is operated but once during each operation of the machine, and manipulative means for determining the number of cycles of operation of the operating mechanism.

83. In a machine of the class described, the combination with a main operating mechanism, adapted to have a varying number of cycles of operation upon different operations of the machine, of two impression means one of which is operated a varying number of times by the operating mechanism, and means controlled by the operating mechanism for operating the other impression means but once upon each operation of the machine.

84. In a machine of the class described, the combination with a main operating mechanism adapted to have a varying number of cycles of operation upon different operations of the machine, of impression means normally out of effective position and operated a varying number of times by the operating mechanism, a second impression means, and means controlled by the operating mechanism for moving the first mentioned impression means into effective position and for operating the second mentioned impression means but once upon each operation of the machine.

85. In a machine of the class described, the combination with a main operating mechanism adapted to have a varying number of cycles of operation upon different operations of the machine, of impression and feeding rollers normally out of feeding position and operated by the main operating mechanism a varying number of times, impression means, and means controlled by the operating mechanism for moving the impression and feeding rollers into feeding position and for operating said impression means but once upon each operation of the machine.

86. In a machine of the class described, the combination with a main operating mechanism adapted to have a varying number of cycles of operation upon different operations of the machine, of impression and feeding rollers normally out of feeding position and operated by the main operating mechanism a varying number of times, impression means, means controlled by the operating mechanism for moving the impression and feeding rollers into feeding position and for operating the second mentioned means but once upon each operation of the machine, and means controlling the operating mechanism so that the latter may be caused to operate the last mentioned impression means without operating the impression and feeding rollers.

87. In a machine of the class described, the combination with a main operating mechanism, adapted to have a varying number of cycles of operation upon different operations of the machine, of two impression means one of which is operated a varying number of times by the operating mechanism, means controlled by the operating mechanism for operating the other impression means but once upon each operation of the machine, and means controlling the operating mechanism so that the latter may be caused to operate only the last mentioned impression means.

88. In a machine of the class described, the combination with a main operating mechanism adapted to have a varying number of cycles of operation upon different operations of the machine, of impression and feeding rollers normally out of feeding position and operated by the operating mechanism a varying number of times, an impression means, means controlled by the operating mechanism and including a clutch for moving said rollers into feeding position and for operating the impression means but once upon each operation of the machine, and means for disabling said clutch during the first cycle of operation of the operating mechanism so that the impression means is operated but once.

89. In a machine of the class described, the combination with a main operating mechanism, adapted to have a varying number of cycles of operation upon different operations of the machine, of printing mechanism operated by the operating mechanism and including impression means, means including a clutch and operated by the operating mechanism for operating the impression means during only the first cycle of operation of the operating mechanism, and means for disabling said clutch during the first cycle of operation of the operating mechanism so that said impression means will be operated but once.

90. In a machine of the class described, the combination with a main operating mechanism adapted to have a varying number of cycles of operation upon different operations of the machine, of two impression means one of which is operated a varying number of times by the operating mechanism, means including a clutch and controlled by the operating mechanism for operating the other impression means but once during each operation of the machine, and means for disabling said clutch during the first cycle of operation of the machine so that the last mentioned impression means is operated but once.

91. In a machine of the class described, the combination with a printing mechanism including a rotary electro cylinder, of printing means mounted within the cylinder and rotatable therewith, and means for shifting the electro cylinder independently of the printing means.

92. In a machine of the class described, the combination with a printing mechanism including a rotary electro cylinder, of a shaft for rotating said cylinder, printing wheels mounted within the cylinder and rotatable with the shaft, and means for shifting the cylinder independently of the printing wheels.

93. In a machine of the class described, the combination with a printing mechanism including a rotary electro cylinder, of printing means mounted within the cylinder and rotatable therewith, means for shifting the electro cylinder independently of the printing means, and manipulative means for shifting said electro cylinder.

94. In a machine of the class described, the combination with a main operating mechanism, of printing mechanism including a rotary electro cylinder, printing means mounted within the cylinder and rotatable therewith, manipulative means for shifting the electro cylinder independently of the printing means, and means for locking the manipulative means against adjustment during the operation of the operating mechanism.

95. In a machine of the class described, the combination with a main operating mechanism, of printing mechanism including a rotary electro cylinder, printing means mounted within the cylinder and rotatable therewith, manipulative means for shifting the electro cylinder independently of the printing means, and means for locking the operating mechanism against operation during the operation of the manipulative means.

96. In a machine of the class described, the combination with a main operating mechanism, of printing mechanism including a rotary electro cylinder, printing means mounted within the cylinder and rotatable therewith, manipulative means for shifting the electro cylinder independently of the printing means, and means for locking the operating mechanism against operation during the operation of the manipulative means and for preventing operation of the manipulative means during the operation of the operating mechanism.

97. In a machine of the class described, the combination with a main operating mechanism, of a set of differentially operable actuators, type carriers operatively connected to the actuators, latches operable to connect and disconnect the actuators and the main operating mechanism, a plurality of destination devices normally detached but separately insertible into the machine, and means whereby the inserted destination device controls the aforesaid latches.

98. In a machine of the class described, the combination with type carriers, of differentially movable actuators controlling the type carriers, normally detached destination devices separately insertible into the machine, and means for positively moving the actuators differentially under the control of the inserted destination device.

99. In a machine of the class described, the combination with type carriers, of reciprocatory actuators controlling the type carriers, normally detached destination devices separately insertible into the machine, and means controlled by the inserted destination device for positively driving the actuators in both directions of their reciprocatory movements.

100. In a machine of the class described, the combination with a main operating mechanism, of a set of differentially operable actuators, type carriers operatively connected to the actuators, latches operable to connect and disconnect the main operating mechanism and the actuators, a plurality of destination devices separately insertible into the machine, and means whereby the inserted destination device controls the aforesaid latches.

101. In a machine of the class described, the combination with a driving device, of differentially movable members, latches for positively connecting and disconnecting said members and the driving device, type carriers controlled by said members, destination devices insertible into the machine, and connections whereby the aforesaid latches are controlled by the destination devices.

102. In a machine of the class described, the combination with a type carrier, of a differentially movable actuator controlling the type carrier, a stop operable to limit positively and differentially the movements of the actuator, selectively insertible destination devices, and means controlled by the inserted destination device for operating the aforesaid stop.

103. In a machine of the class described, the combination with a main operating mechanism, of a set of differentially operable actuators, type carriers operatively connected to the actuators, latches normally connecting the actuators and the main operating mechanism, manipulative devices, a plurality of destination devices normally detached but separately insertible into the machine, and mechanism whereby the latches may be controlled by either the manipulative devices or the destination devices.

104. In a machine of the class described, the combination with a main operating mechanism, of a set of differentially operable actuators, type carriers operatively connected to the actuators, latches normally and positively connecting the actuators and the main operating mechanism, a keyboard, a plurality of destination devices normally detached but separately insertible into the machine, and means for positively operating the aforesaid latches under the control of either the keyboard or the destination devices to disconnect the actuators from the main operating mechanism.

105. In a machine of the class described, the combination with a main operating mechanism, of a set of differentially operable actuators, type carriers operatively connected to the actuators, latches normally and positively connecting the actuators and the main operating mechanism, a keyboard, a plurality of destination devices normally detached but separately insertible into the machine, connections for positively operating the aforesaid latches under the control of either the keyboard or the destination devices to disconnect the actuators from the main operating mechanism, and interlocking devices preventing the use of the keyboard and the destination devices to control the latches at the same operation of the machine.

106. In a machine of the class described, the combination with ticket strip feeding rollers having a constant extent of movement and constructed to feed tickets during a part only of said movement, of a main driving mechanism, and transmission gearing connecting the main driving mechanism and the feeding rollers, said gearing comprising elliptical gears constructed to drive the rollers at a varying speed reaching its maximum during the time the rollers are feeding the ticket strip.

107. In a machine of the class described, the combination with mechanism for feeding tickets, printing invariable matter thereon and severing the tickets from a ticket strip; of devices for printing variable matter on the tickets; a common operating mechanism; a system of constantly intermeshed gears connecting both the aforesaid mechanism and the variable printing devices to the common operating mechanism, said system of gears comprising elliptical gears constructed to drive said mechanism at a speed varying at different points in the operation of the common operating mechanism.

In testimony whereof I affix my signature in the presence of two witnesses.

HAAKON A. MARTIN.

Witnesses:
F. E. HAMILTON,
J. B. RICKETTS.